US011186697B2

(12) United States Patent
Fishman et al.

(10) Patent No.: US 11,186,697 B2
(45) Date of Patent: Nov. 30, 2021

(54) COMPOSITE PARTICLES, COMPOSITION AND FOAM COMPOSITIONS CONTAINING COMPOSITE PARTICLES, ARTICLES, AND METHODS OF MAKING AND USING SAME

(71) Applicant: 3M INNOVATIVE PROPERTIES COMPANY, St. Paul, MN (US)

(72) Inventors: Joshua M. Fishman, Minneapolis, MN (US); Ying Lin, Woodbury, MN (US); Hassan Sahouani, Hastings, MN (US); Caitlin E. Meree, St. Paul, MN (US); Jeffrey P. Kalish, St. Paul, MN (US); Aaron T. Hedegaard, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 57 days.

(21) Appl. No.: 16/760,472

(22) PCT Filed: Dec. 14, 2018

(86) PCT No.: PCT/US2018/065613
§ 371 (c)(1),
(2) Date: Apr. 30, 2020

(87) PCT Pub. No.: WO2019/125931
PCT Pub. Date: Jun. 27, 2019

(65) Prior Publication Data
US 2020/0347202 A1   Nov. 5, 2020

Related U.S. Application Data

(60) Provisional application No. 62/607,985, filed on Dec. 20, 2017.

(51) Int. Cl.
*C08J 9/32* (2006.01)
*B01J 13/04* (2006.01)
*C08J 5/18* (2006.01)

(52) U.S. Cl.
CPC .............. *C08J 9/32* (2013.01); *B01J 13/043* (2013.01); *C08J 5/18* (2013.01); *C08J 2201/032* (2013.01);
(Continued)

(58) Field of Classification Search
CPC . C08J 9/32; C08J 5/18; C08J 2201/032; C08J 2203/22; C08J 2205/052; C08J 2207/02; B01J 13/043
See application file for complete search history.

(56) References Cited

U.S. PATENT DOCUMENTS

| 5,234,963 A | 8/1993 | Garcia |
| 5,252,694 A | 10/1993 | Willett |

(Continued)

FOREIGN PATENT DOCUMENTS

| EP | 2204428 | 7/2010 |
| EP | 2615130 | 7/2013 |

(Continued)

OTHER PUBLICATIONS

Hu, "Synthesis and Characterization of Thermally Expandable Microcapsules by Suspension Polymerization", Pigment & Resin Technology, 2009, vol. 38, No. 5, pp. 280-284.

(Continued)

*Primary Examiner* — Kara B Boyle
(74) *Attorney, Agent, or Firm* — Adrian L. Pishko

(57) ABSTRACT

Composite particles are provided including a chemical blowing agent particle encapsulated within a shell including an uncrosslinked thermoplastic material. The uncrosslinked thermoplastic material exhibits at least a certain minimum (Continued)

50.0μm complex viscosity at a decomposition temperature of the chemical blowing agent particle. Also described are compositions and foam compositions containing the composite particles. Further, articles are provided including the foam compositions, such as a sheet, tape, or hearing protection article. Methods of making and using the foam compositions are additionally described herein.

20 Claims, 20 Drawing Sheets

(52) U.S. Cl.
CPC ...... *C08J 2203/22* (2013.01); *C08J 2205/052* (2013.01); *C08J 2207/02* (2013.01)

(56) References Cited

U.S. PATENT DOCUMENTS

| | | | |
|---|---|---|---|
| 5,585,412 | A | 12/1996 | Natoli |
| 5,609,892 | A | 3/1997 | Garcia |
| 5,611,962 | A | 3/1997 | Garcia |
| 5,621,015 | A | 4/1997 | Garcia |
| 6,586,483 | B2 | 7/2003 | Kolb |
| 7,501,184 | B2 | 3/2009 | Leir |
| 8,158,731 | B2 | 4/2012 | Stefanisin |
| 8,377,245 | B2 | 2/2013 | Bauer |
| 8,765,881 | B2 | 7/2014 | Hays |
| 8,875,472 | B2 | 11/2014 | Korwin-Edson |
| 8,916,267 | B2 | 12/2014 | Bauer |
| 2011/0039997 | A1 | 2/2011 | Papon |
| 2011/0224317 | A1 | 9/2011 | O'Leary |
| 2014/0015157 | A1 | 1/2014 | Endle |
| 2017/0313912 | A1 | 11/2017 | Zhou |

FOREIGN PATENT DOCUMENTS

| | | |
|---|---|---|
| WO | WO 2004-045319 | 6/2004 |
| WO | WO 2016-105997 | 6/2016 |
| WO | WO 2017-222891 | 12/2017 |

OTHER PUBLICATIONS

Li, "A Highly Expandable and Tough Polyacrylamide-Alginate Microcaspule", RSC Advances, 2016, vol. 6, p. 44896-44901.

Mcdonald, "Hollow Latex Particles: Synthesis and Applications", Advances in Colloid and Interface Science, 2002, vol. 99, pp. 181-213.

Vericella, "Encapsulated Liquid Sorbents for Carbon Dioxide Capture", Nature Communications, Feb. 2015, vol. 6:6124, pp. 1-7.

Wang, "The Influence of Expandable Graphite on Double-Layers Microcapsules in Intumescent Flame-Retardent Natural Rubber Composites", Journal of Thermal Analysis and Calorimetry, 2016, vol. 123, pp. 1239-1251.

International Search Report for PCT International Application No. PCT/US2018/065613, dated Feb. 27, 2019, 4 pages.

500μm

500μm

500μm

500μm

COMPOSITE PARTICLES, COMPOSITION AND FOAM COMPOSITIONS CONTAINING COMPOSITE PARTICLES, ARTICLES, AND METHODS OF MAKING AND USING SAME

CROSS REFERENCE TO RELATED APPLICATIONS

This application is a national stage filing under 35 U.S.C. 371 of PCT/US2018/065613, filed Dec. 14, 2018, which claims the benefit of U.S. Application No. 62/607,985, filed Dec. 20, 2017, the disclosure of which is incorporated by reference in its/their entirety herein.

FIELD

The present disclosure relates to composite particles containing chemical blowing agents, compositions and foam compositions including the composite particles, articles, and methods of forming and using the foam compositions.

BACKGROUND

Foams are porous materials that are composed of gas filled networks or chambers segmented by a solid matrix. The properties of foamed materials are governed by the composition of the matrix material and the morphology of its cellular structure. Chemical blowing agents, physical blowing agents, and expandable microspheres have all been employed to assist in forming foamed materials.

SUMMARY

Composite particles, compositions, foam compositions and articles containing composite particles, and methods of making foam compositions are provided. The composite particles include an encapsulated chemical blowing agent particle. Use of the composite particles tends to lead to a decrease in foam cell size and a concomitant increase in foam cell density and homogeneity, as compared to materials foamed with the same chemical blowing agent that is not encapsulated.

In a first aspect, a composite particle is provided. The composite particle includes a chemical blowing agent particle encapsulated within a shell including an uncrosslinked thermoplastic material. The uncrosslinked thermoplastic material exhibits a complex viscosity of 3,700 Pascal seconds (Pa·s) or greater at a decomposition temperature of the chemical blowing agent particle.

In a second aspect, a composition is provided. The composition includes an uncrosslinked thermoplastic matrix material and a plurality of composite particles distributed in the uncrosslinked thermoplastic matrix material. The composition exhibits an elastic modulus of 0.5 megaPascals (MPa) or greater. The composite particles each include a chemical blowing agent particle encapsulated within a shell including an uncrosslinked thermoplastic material. The uncrosslinked thermoplastic material exhibits a complex viscosity of 3,700 Pa·s or greater at a decomposition temperature of the chemical blowing agent particle.

In a third aspect, a foam composition is provided. The foam composition includes a closed cell foam thermoplastic matrix material and a plurality of composite particles distributed in the closed cell foam thermoplastic matrix material. The composite particles each include a chemical blowing agent particle encapsulated within a shell including an uncrosslinked thermoplastic material. The uncrosslinked thermoplastic material exhibits a complex viscosity of 3,700 Pa·s or greater at a decomposition temperature of the chemical blowing agent particle.

In a fourth aspect, a foam sheet is provided. The foam sheet includes the foam composition according to the third aspect.

In a fifth aspect, a hearing protection article is provided. The hearing protection article includes the foam composition according to the third aspect.

In a sixth aspect, a tape is provided. The tape includes a substrate and a foam composition according to the third aspect disposed on the substrate.

In a seventh aspect, a method of making a foam composition is provided. The method includes compressing a mixture and heating the compressed mixture, thereby forming the foam composition. The mixture includes an uncrosslinked thermoplastic matrix material and a plurality of composite particles distributed in the uncrosslinked thermoplastic matrix material. The mixture exhibits an elastic modulus of 0.5 megaPascals (MPa) or greater. The composite particles each include a chemical blowing agent particle encapsulated within a shell including an uncrosslinked thermoplastic material. The uncrosslinked thermoplastic material exhibits a complex viscosity of 3,700 Pa·s or greater at a decomposition temperature of the chemical blowing agent particle.

In an eighth aspect, a method of making a foam composition is provided. The method includes casting a mixture in a mold and heating the cast mixture, thereby forming the foam composition. The mixture includes an uncrosslinked thermoplastic matrix material and a plurality of composite particles distributed in the uncrosslinked thermoplastic matrix material. The mixture exhibits an elastic modulus of 0.5 megaPascals (MPa) or greater. The composite particles each include a chemical blowing agent particle encapsulated within a shell including an uncrosslinked thermoplastic material. The uncrosslinked thermoplastic material exhibits a complex viscosity of 3,700 Pa·s or greater at a decomposition temperature of the chemical blowing agent particle.

In a ninth aspect, a process is provided. The process includes providing at least one hearing protection article according to the fifth aspect and interposing the hearing protection article between an acoustic source and an acoustic receiver in the form of a human ear.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION

Composite Particles

Figure 1A:
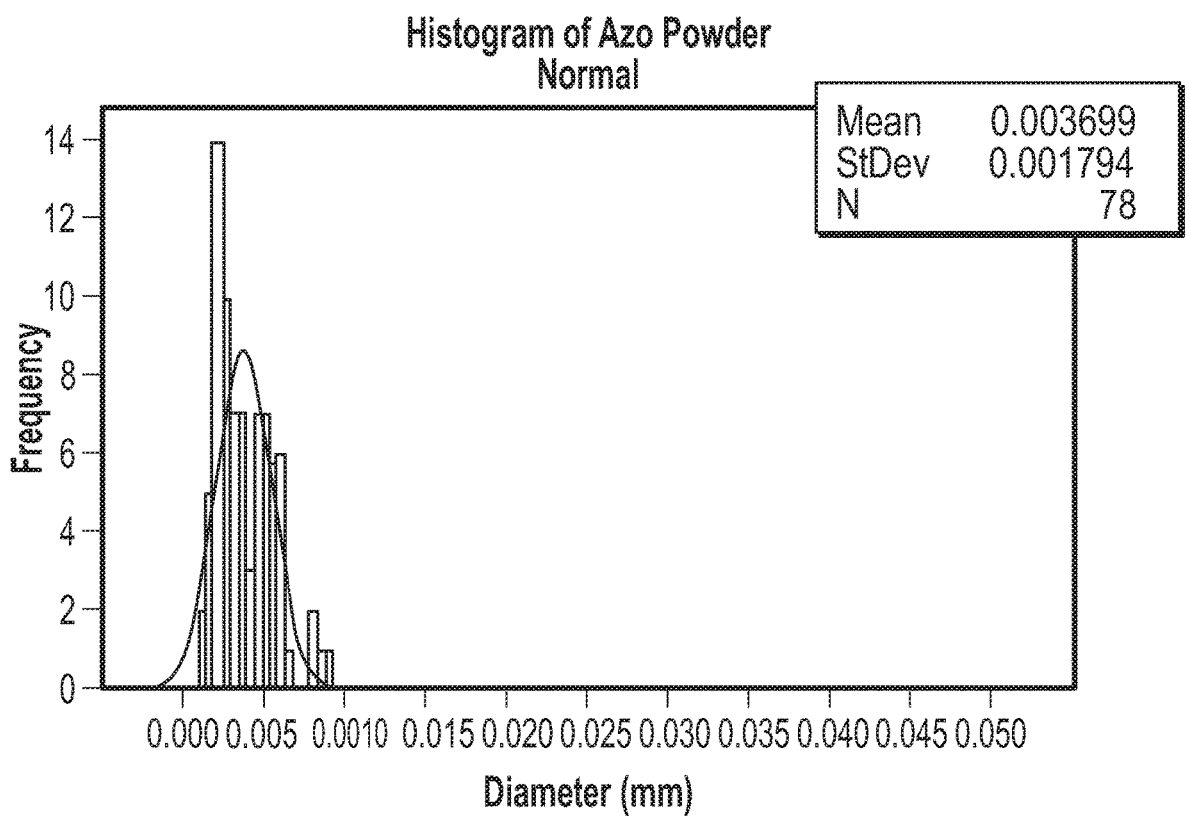
FIG. 1A is a histogram of 1,1-Azodicarbamide (AZO) particles.
Figure 1B:
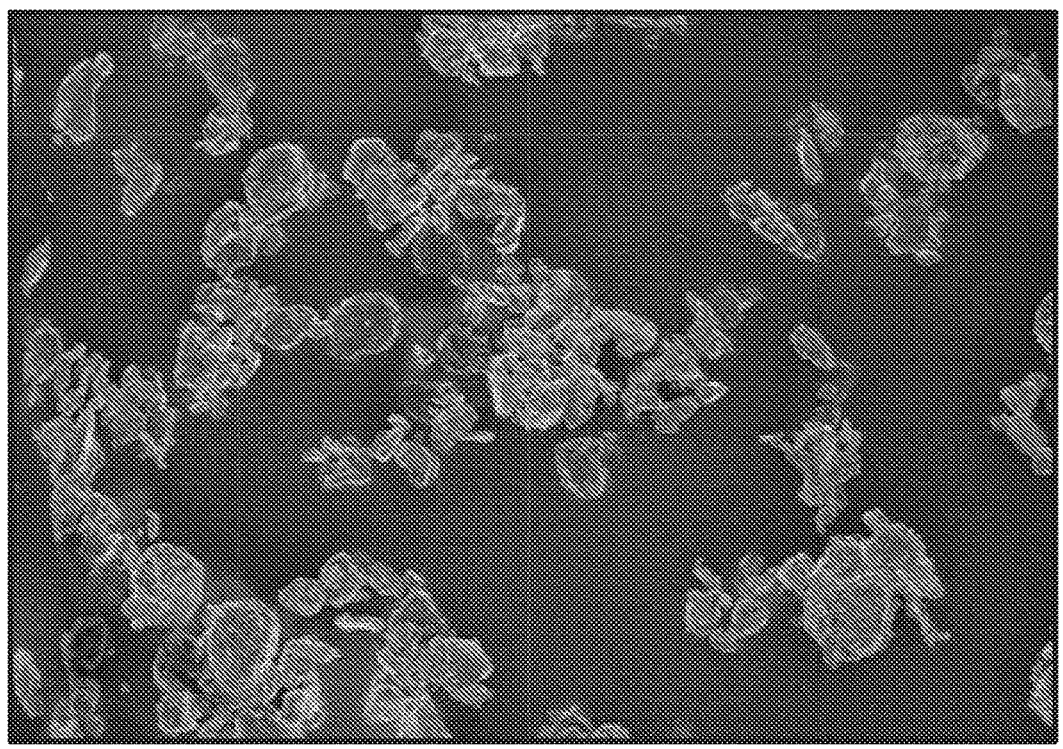
FIG. 1B is a scanning electron microscope (SEM) image of AZO particles of FIG. 1A.
Figure 1C:
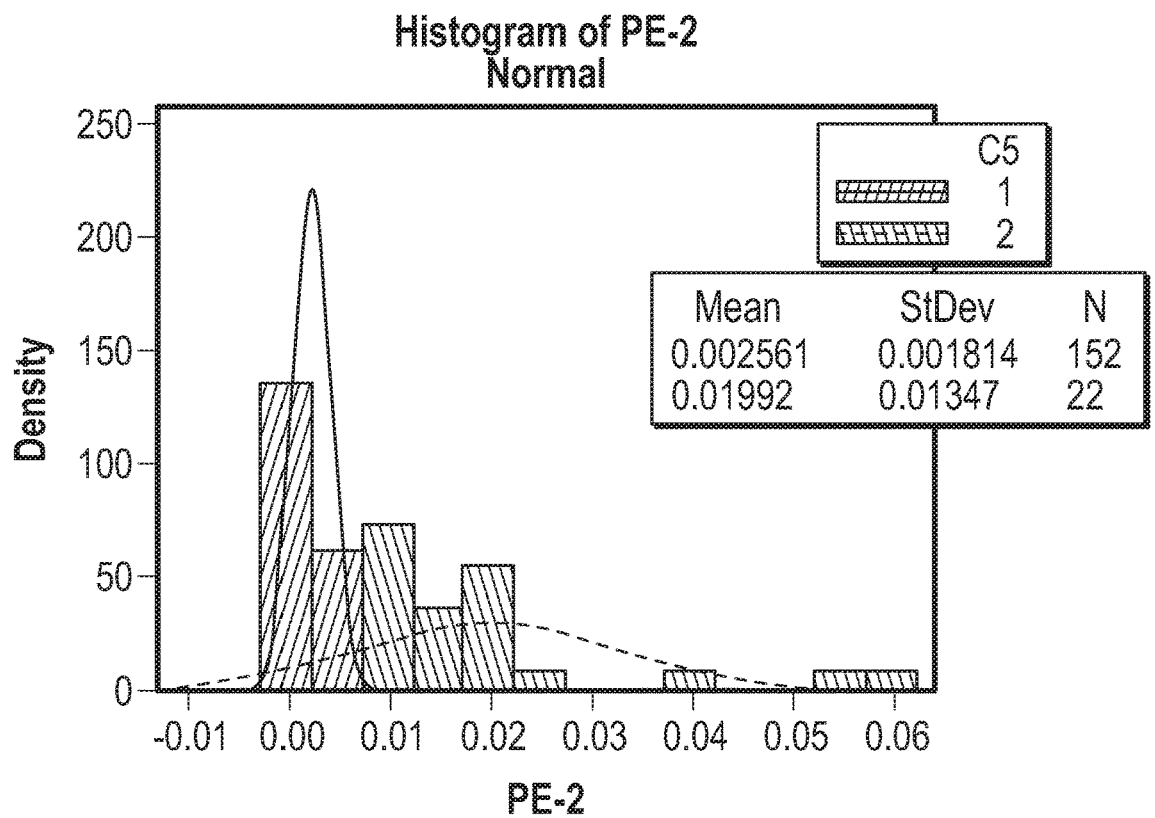
FIG. 1C is a histogram of the composite particles of Preparative Example 2.
Figure 1D:
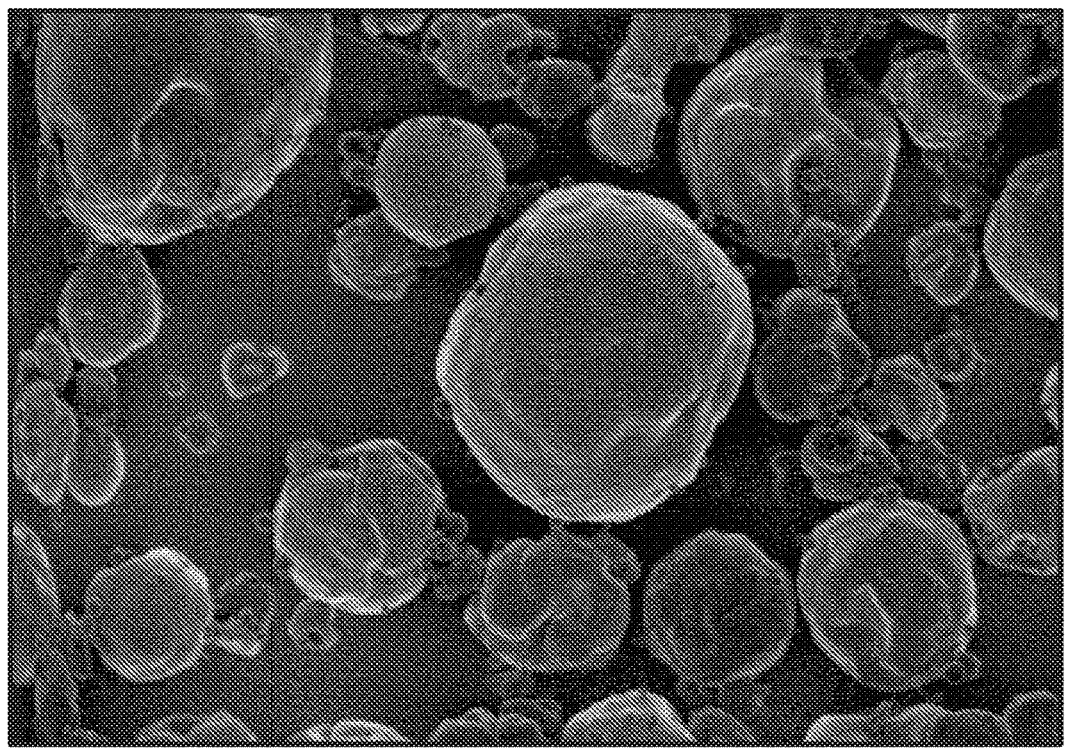
FIG. 1D is an SEM image of the composite particles of FIG. 1C.
Figure 1E:
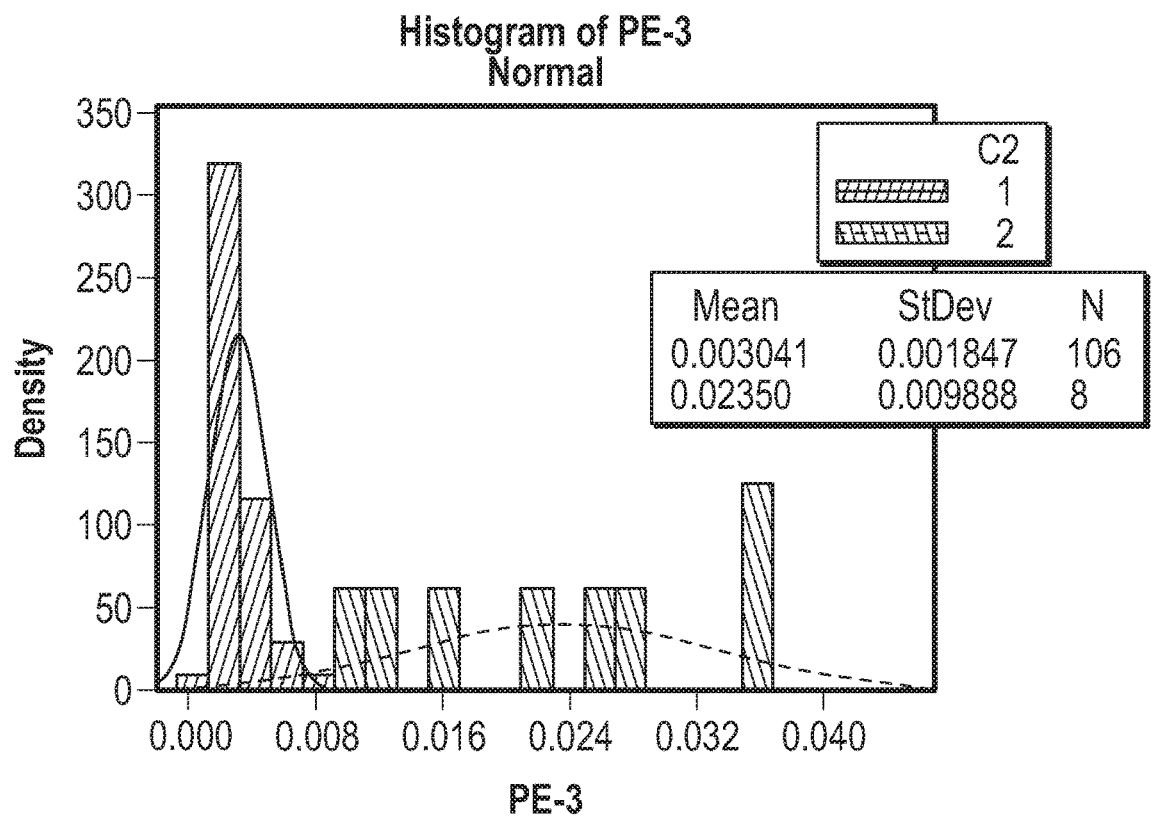
FIG. 1E is a histogram of the composite particles Preparative Example 3.
Figure 1F:
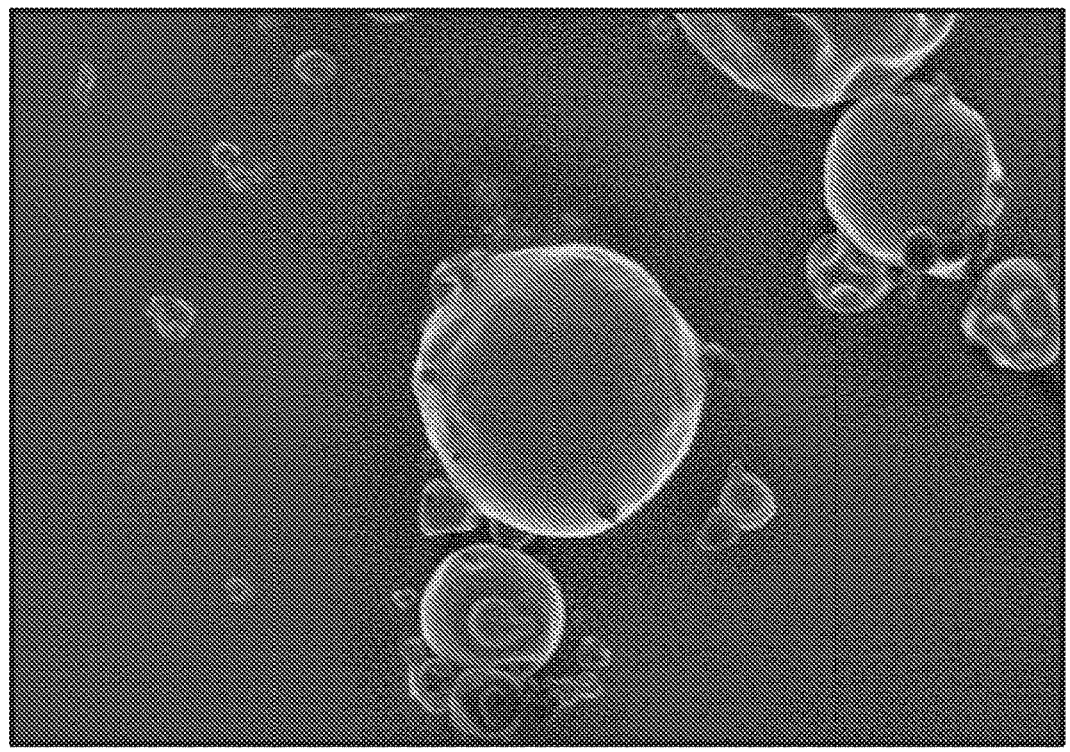
FIG. 1F is an SEM image of the composite particles of FIG. 1E.
Figure 1G:
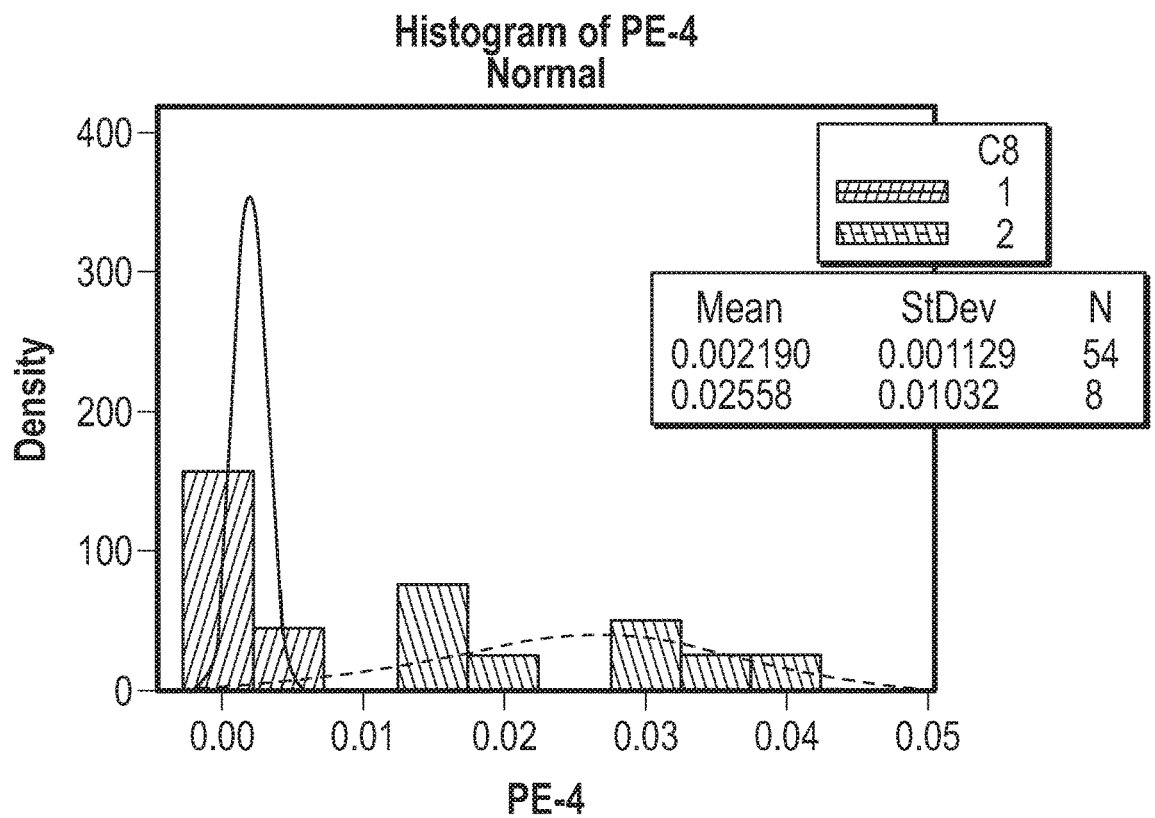
FIG. 1G is a histogram of the composite particles Preparative Example 4.
Figure 1H:
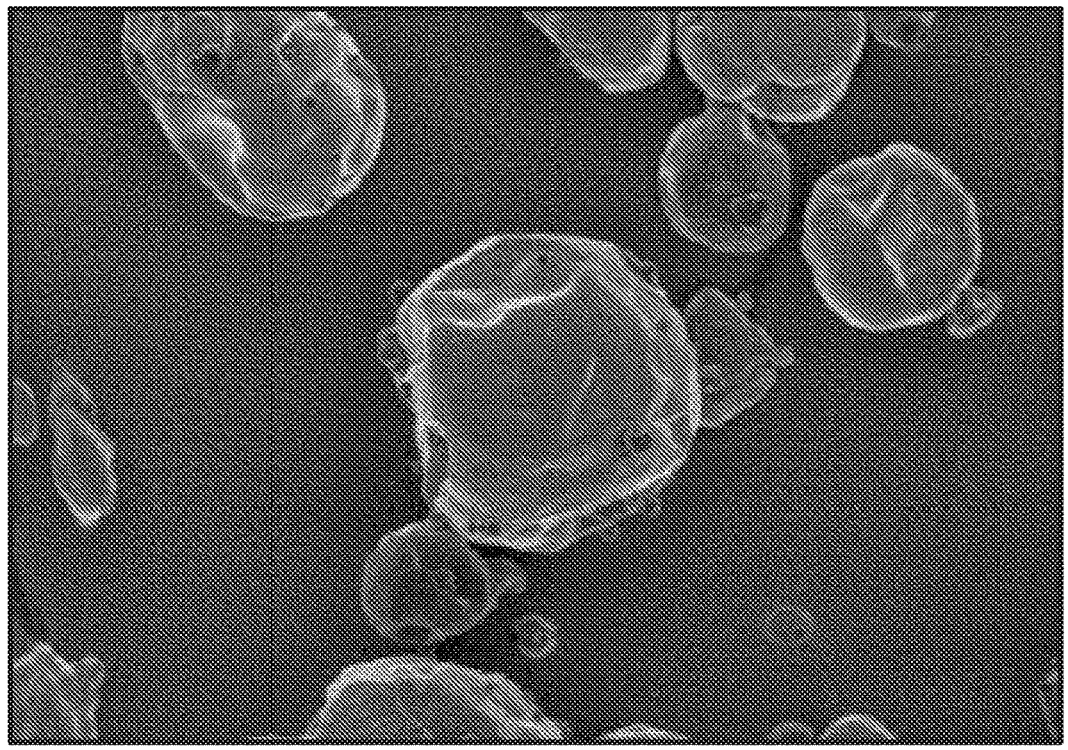
FIG. 1H is an SEM image of the composite particles of FIG. 1G.
Figure 2A:
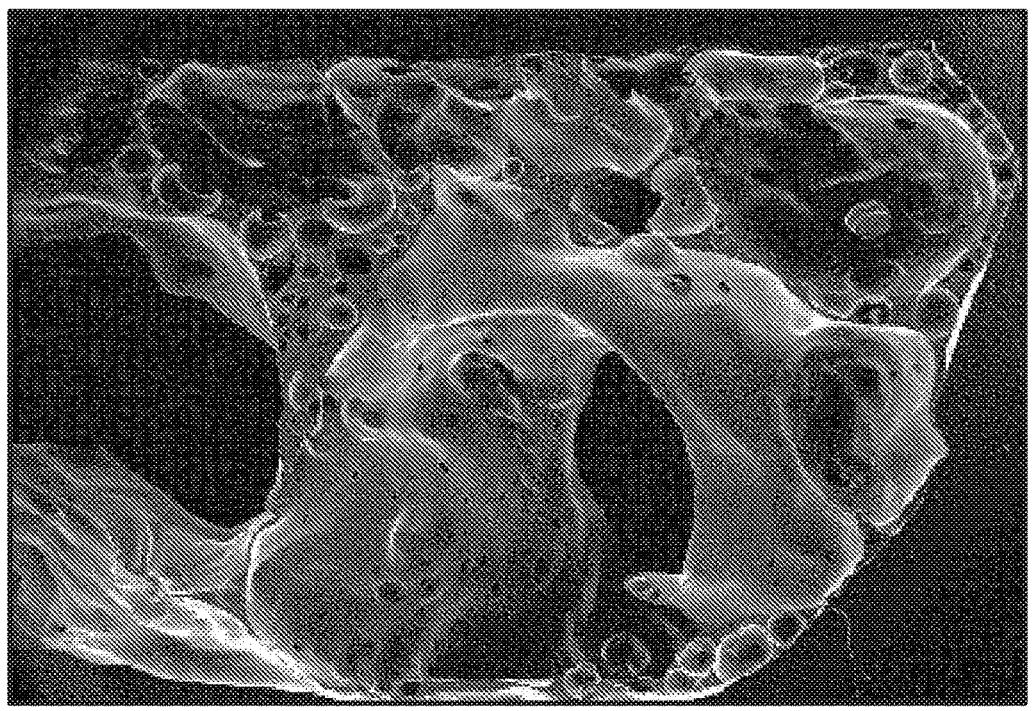
FIG. 2A is an SEM image of the foam composition of Comparative Example 1 foamed at 210° C.
Figure 2B:
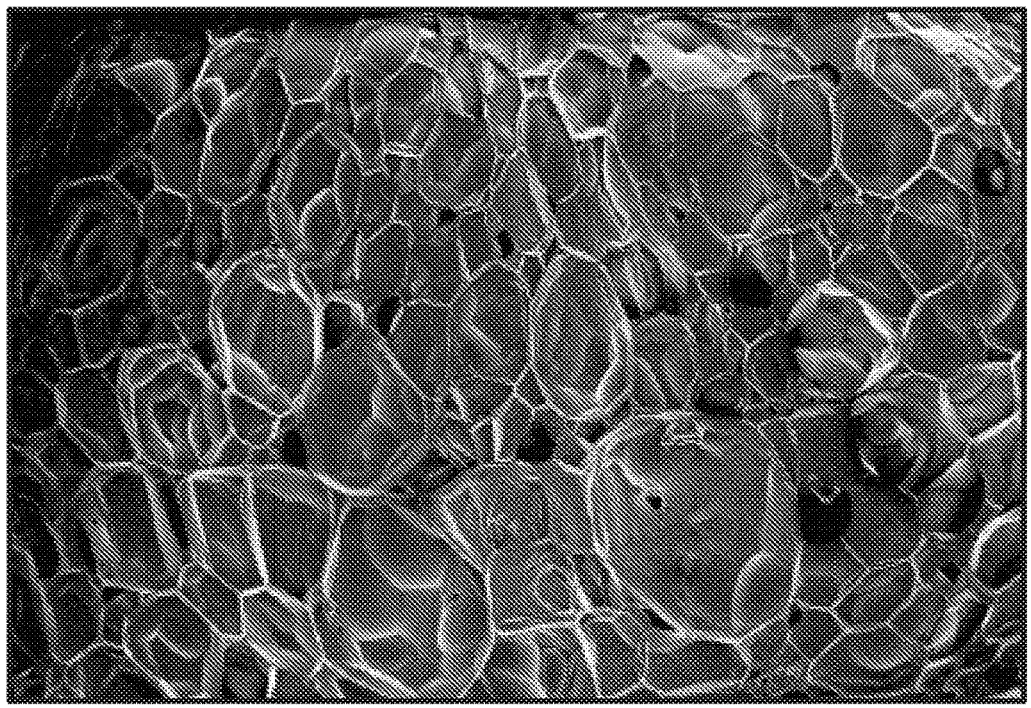
FIG. 2B is an SEM image of the foam composition of Comparative Example 2 foamed at 210° C.
Figure 2C:
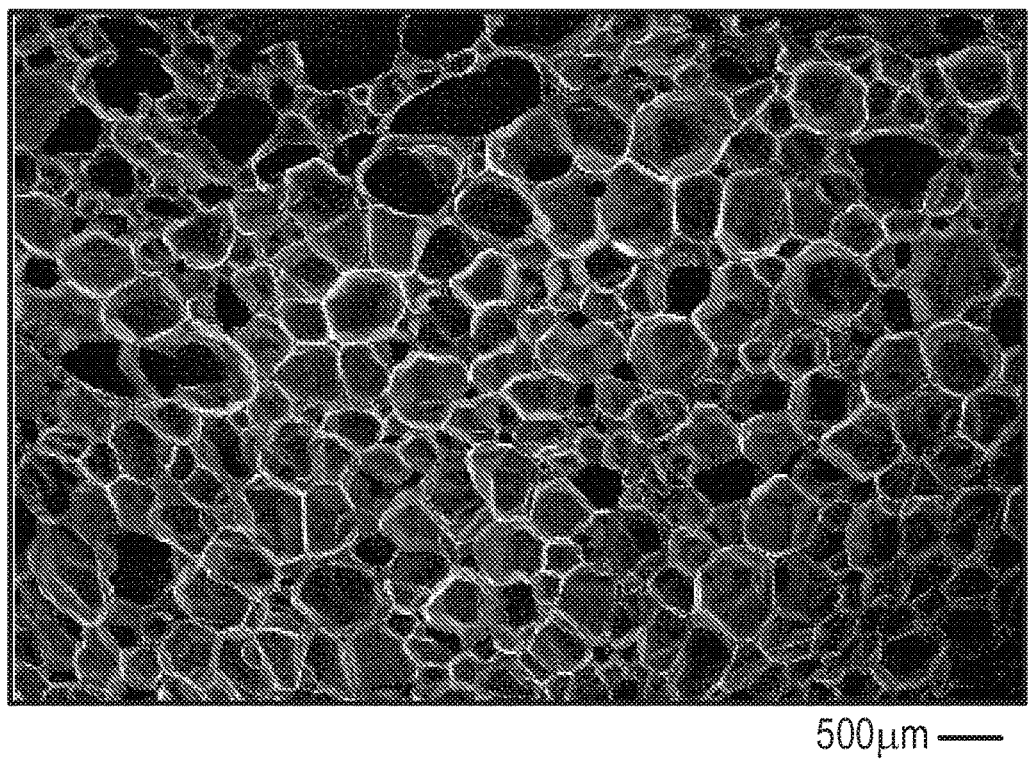
FIG. 2C is an SEM image of the foam composition of Example 5 foamed at 210° C.
Figure 2D:
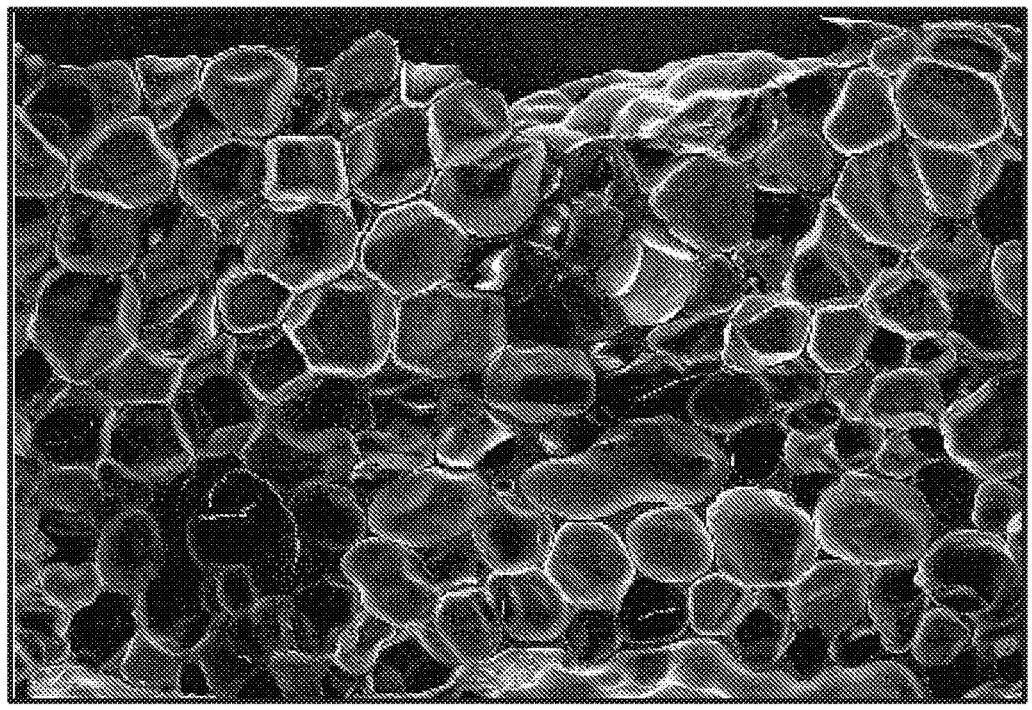
FIG. 2D is an SEM image of the foam composition of Comparative Example 3 foamed at 210° C.
Figure 2E:
FIG. 2E is an SEM image of the foam composition of Example 6 foamed at 210° C.
Figure 2F:
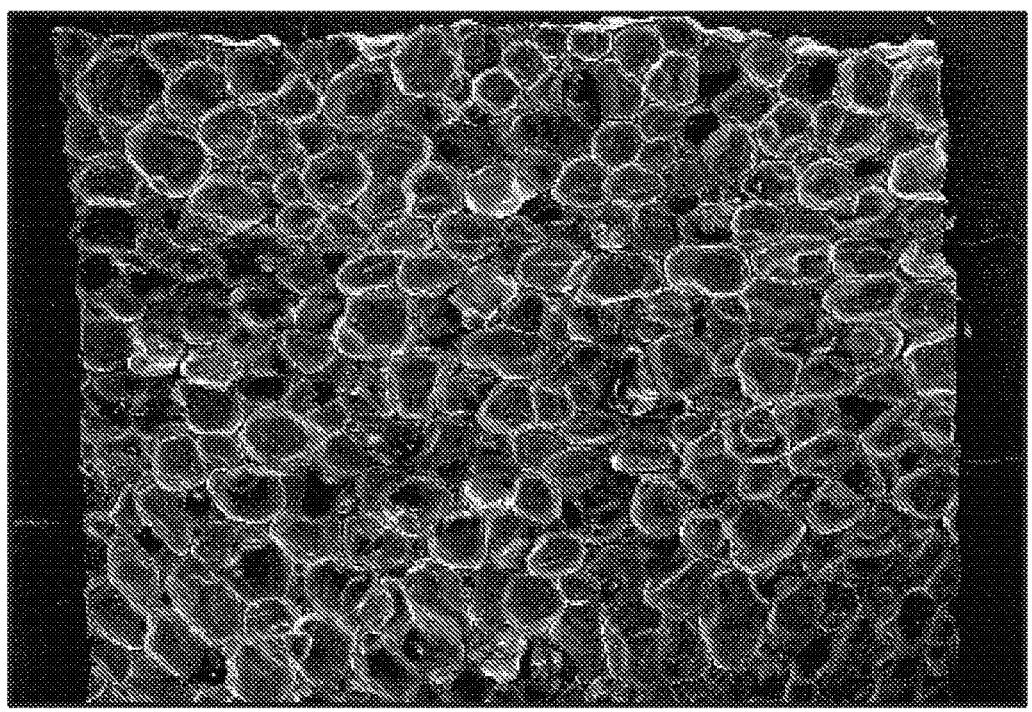
FIG. 2F is an SEM image of the foam composition of Example 7 foamed at 210° C.
Figure 2G:
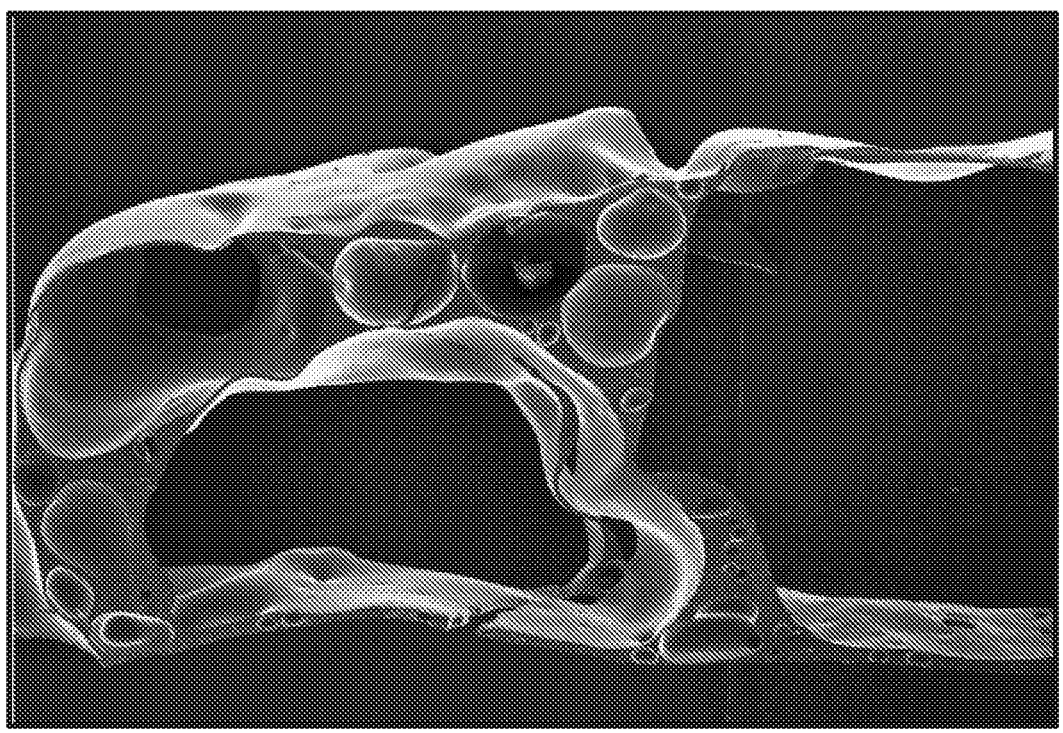
FIG. 2G is an SEM image of the foam composition of Comparative Example 4 foamed at 210° C.
Figure 3A:
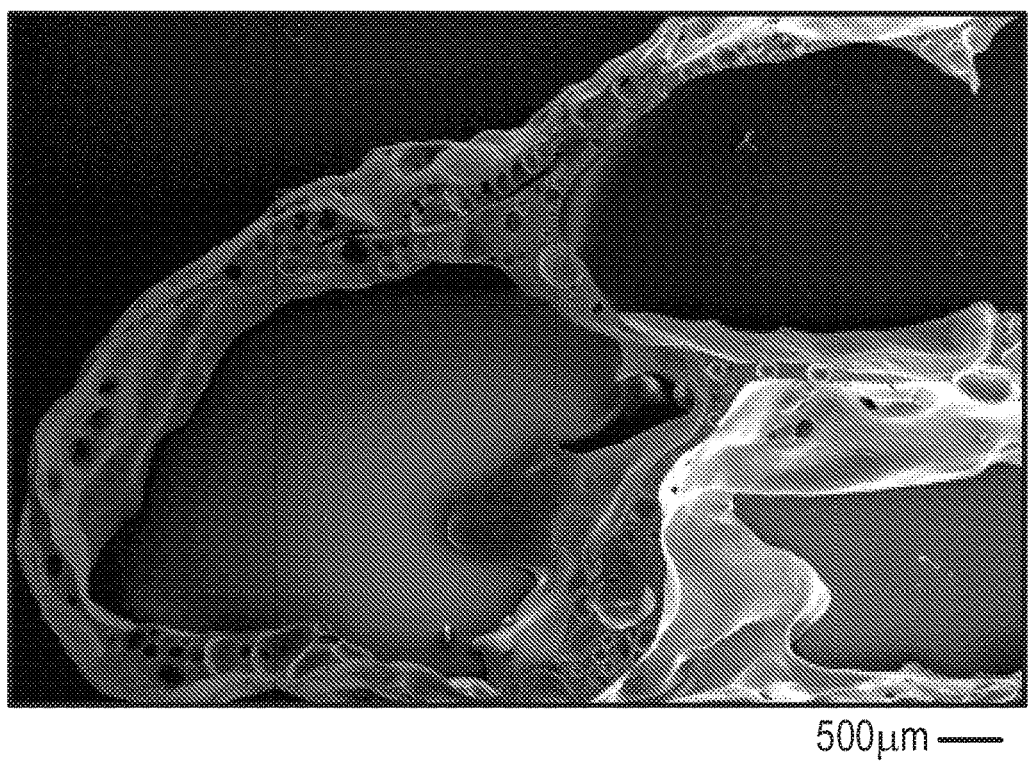
FIG. 3A is an SEM image of the foam composition of Comparative Example 1 foamed at 230° C.
Figure 3B:
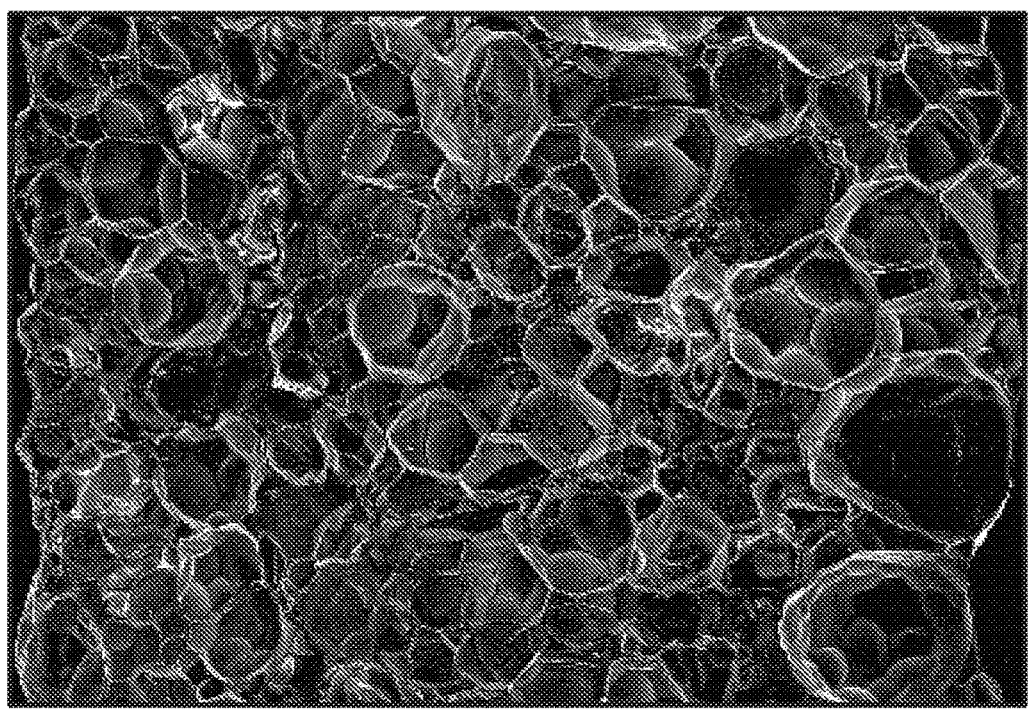
FIG. 3B is an SEM image of the foam composition of Comparative Example 2 foamed at 230° C.
Figure 3C:
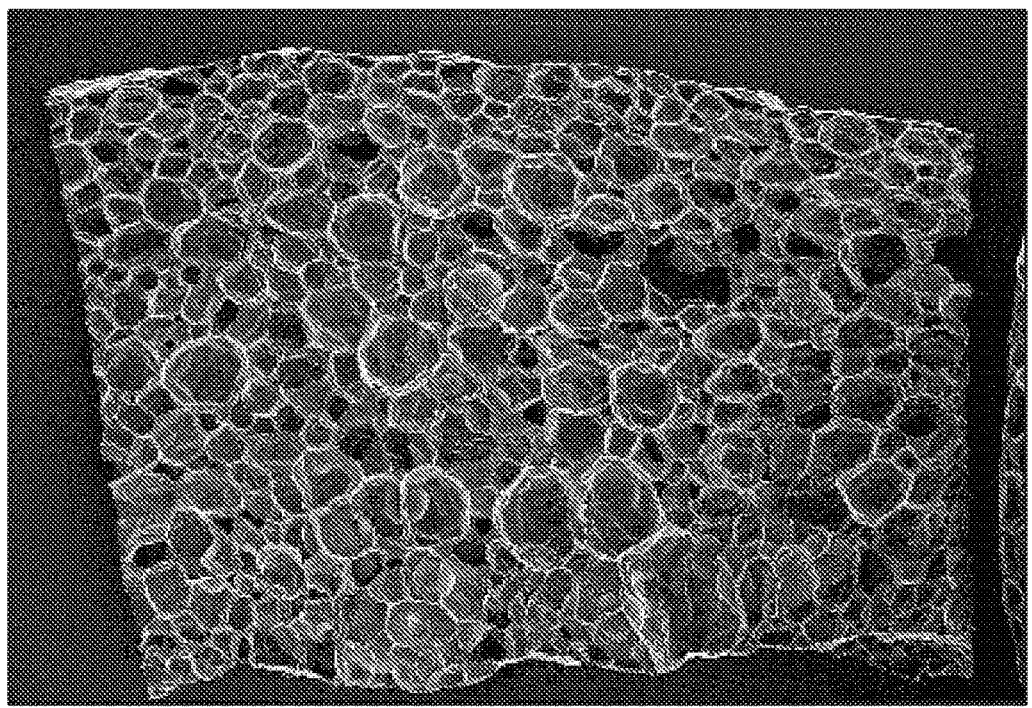
FIG. 3C is an SEM image of the foam composition of Example 5 foamed at 230° C.
Figure 3D:
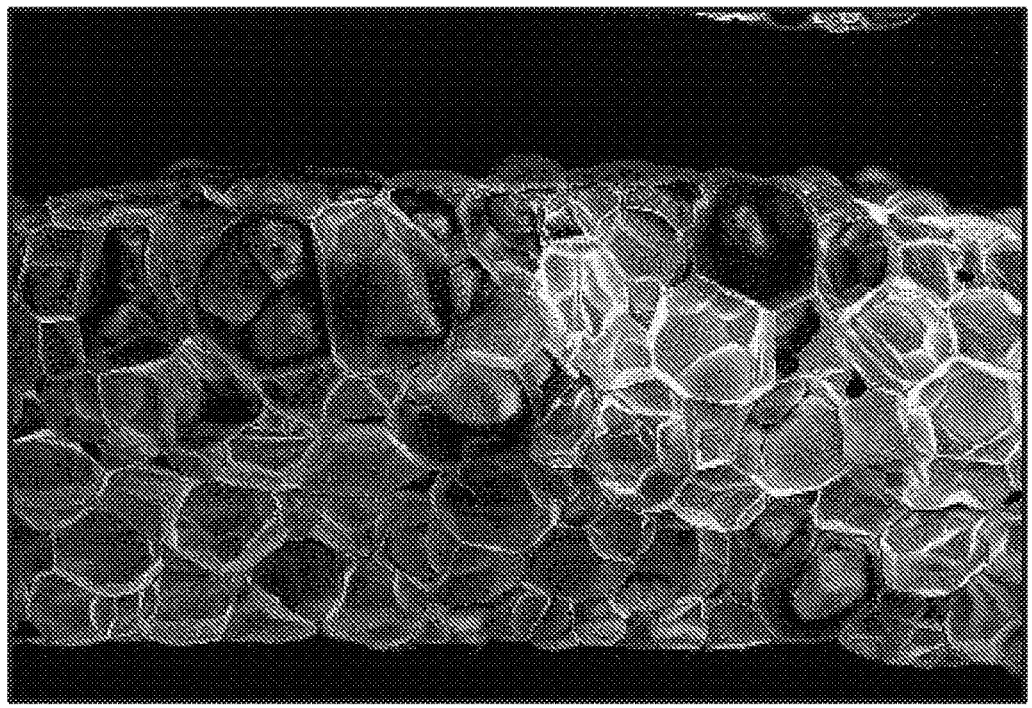
FIG. 3D is an SEM image of the foam composition of Comparative Example 3 foamed at 230° C.
Figure 3E:
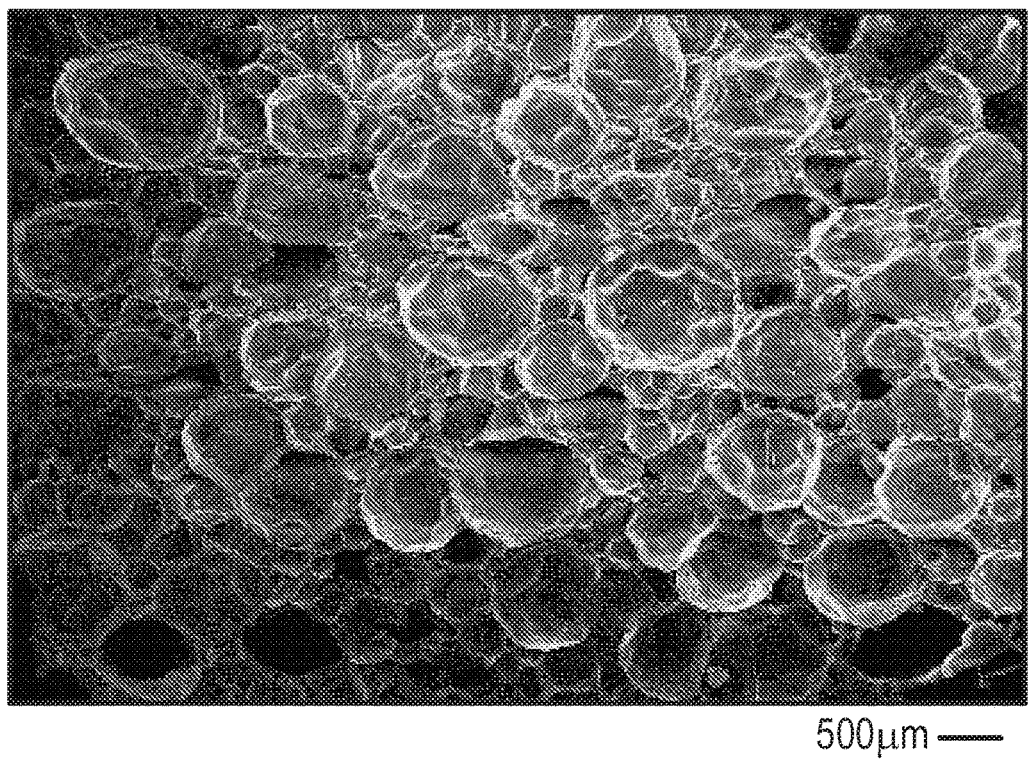
FIG. 3E is an SEM image of the foam composition of Example 6 foamed at 230° C.
Figure 3F:
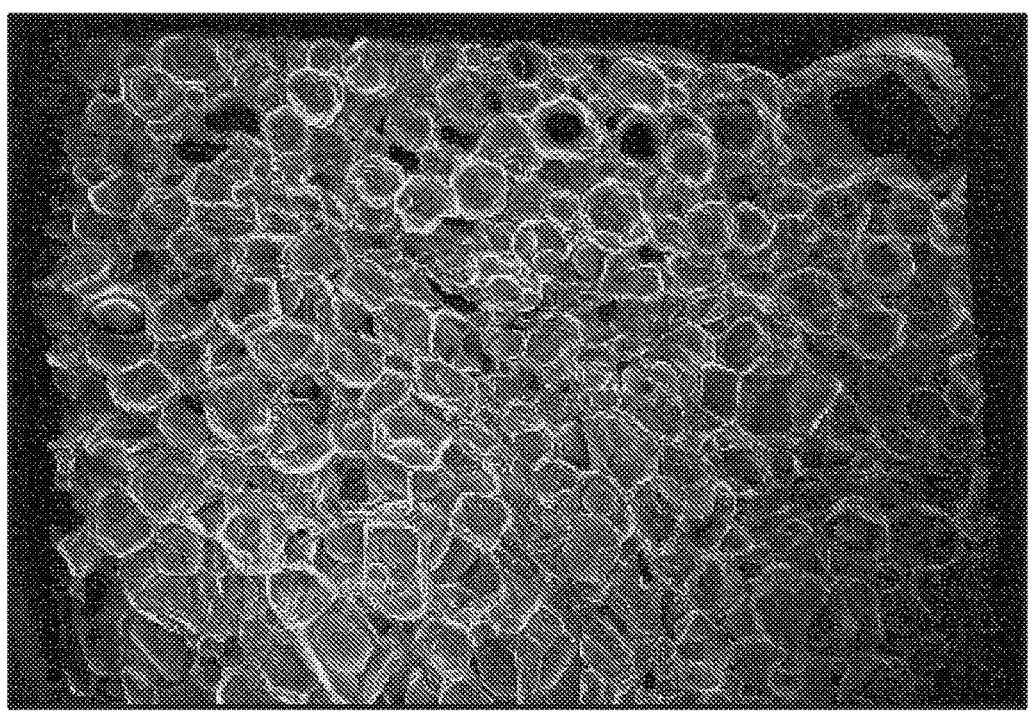
FIG. 3F is an SEM image of the foam composition of Example 7 foamed at 230° C.
Figure 4A:
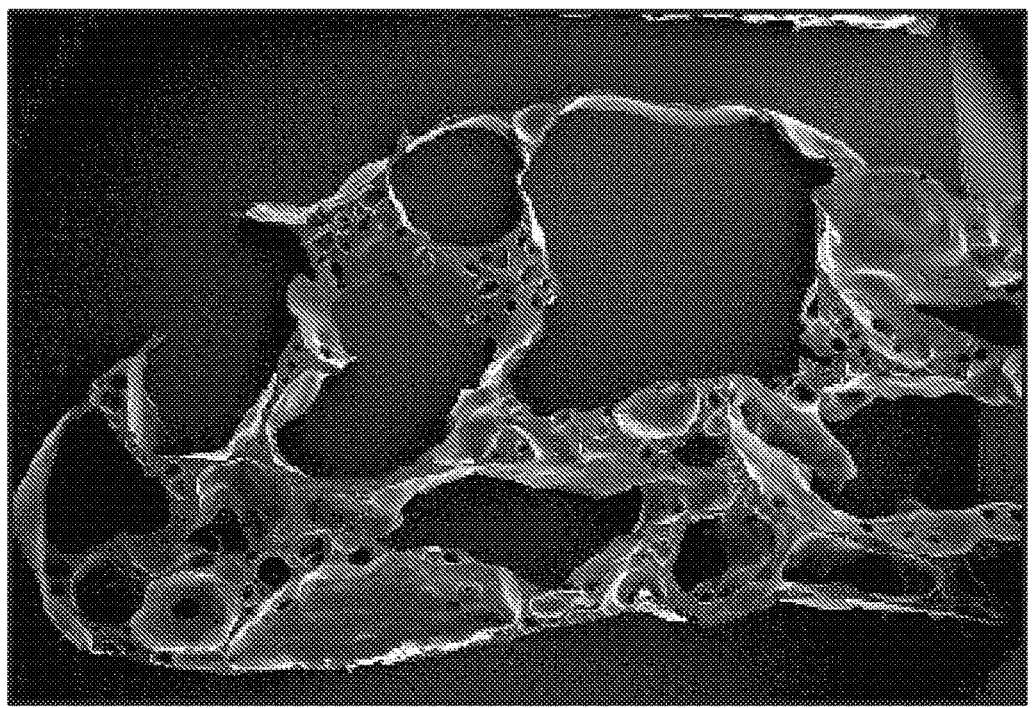
FIG. 4A is an SEM image of the foam composition of Comparative Example 10 foamed at 230° C.
Figure 4B:
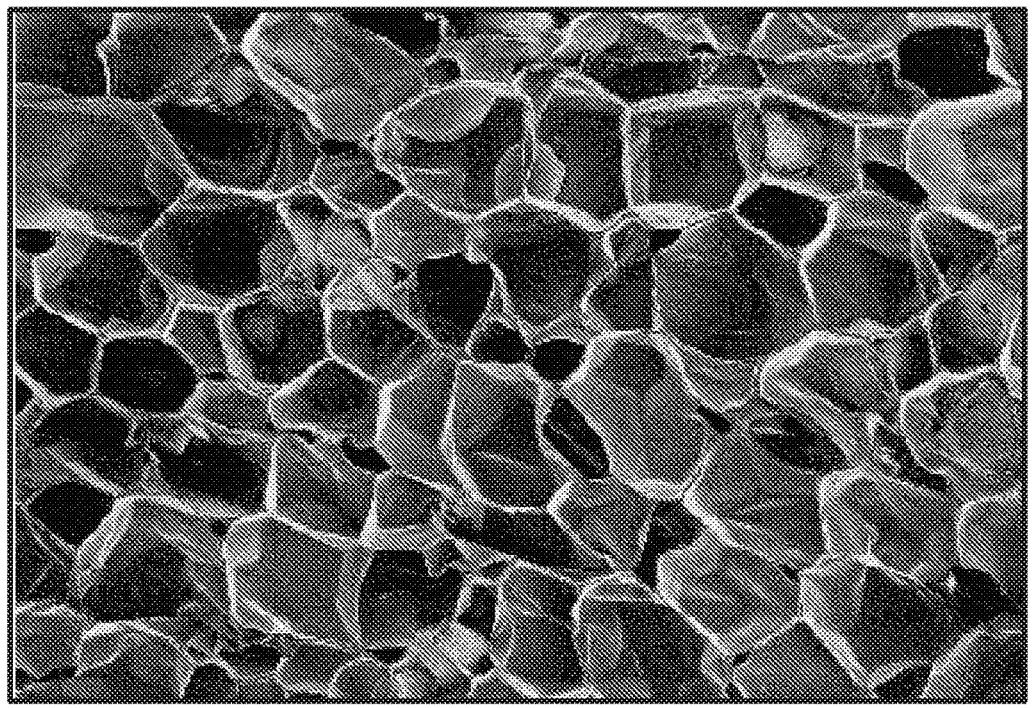
FIG. 4B is an SEM image of the foam composition of Comparative Example 11 foamed at 230° C.
Figure 4C:
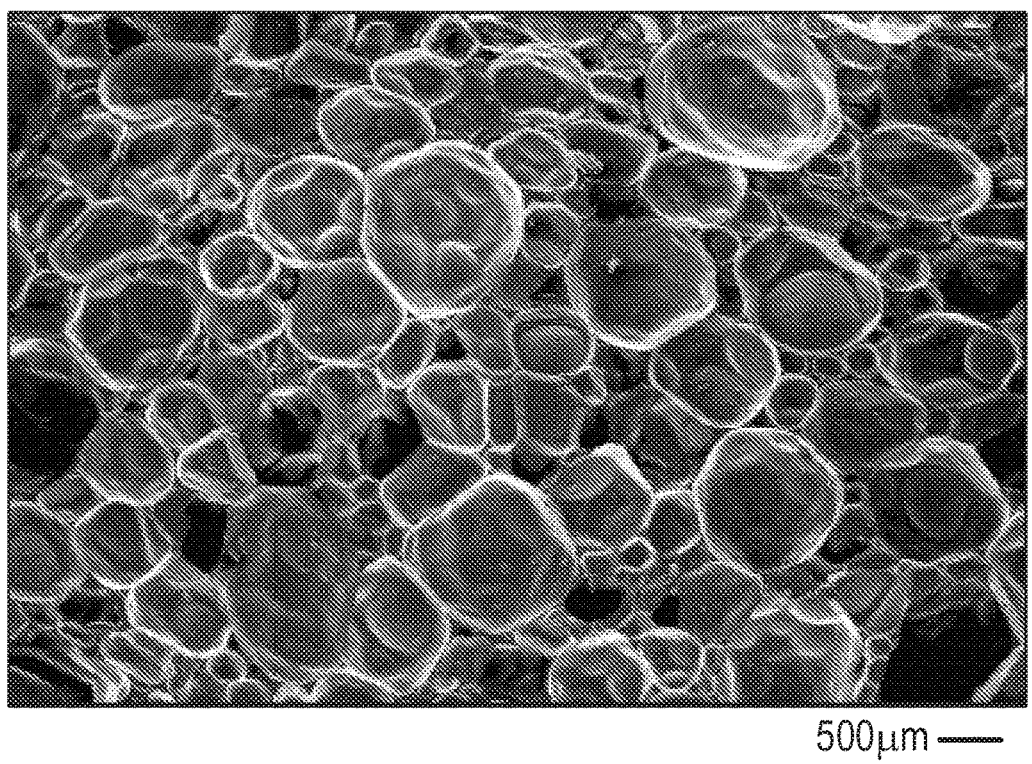
FIG. 4C is an SEM image of the foam composition of Example 8 foamed at 230° C.
Figure 4D:
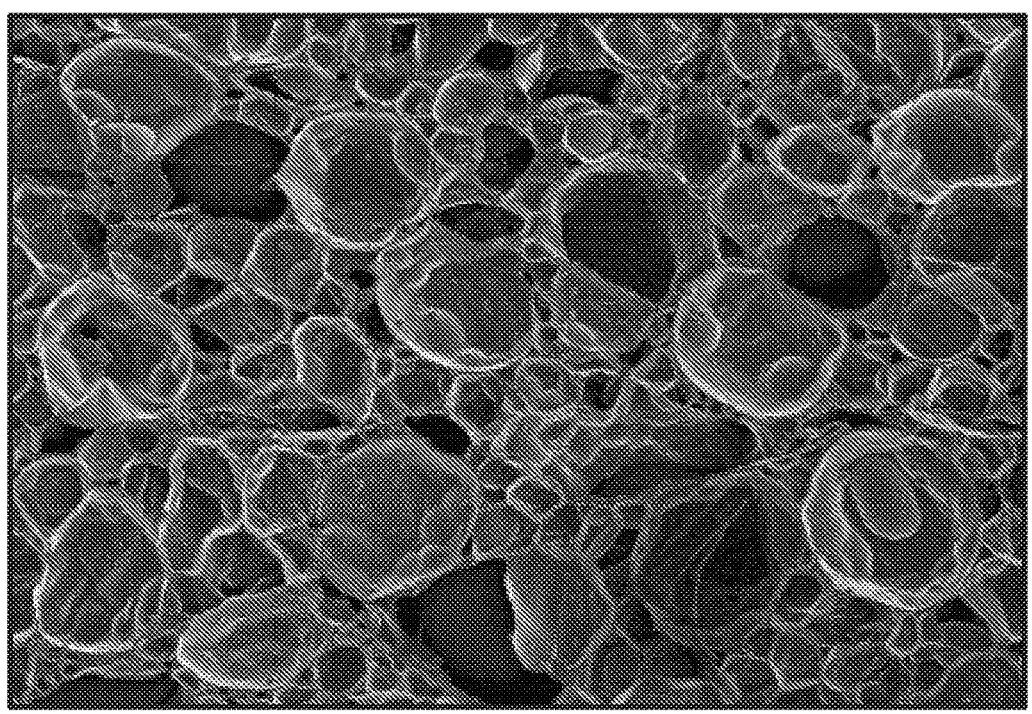
FIG. 4D is an SEM image of the foam composition of Example 9 foamed at 230° C.

In a first aspect, a composite particle is provided. The composite particle comprises: a chemical blowing agent particle encapsulated within a shell comprising an uncrosslinked thermoplastic material, wherein the uncrosslinked thermoplastic material exhibits a complex viscosity of 3,700 Pascal seconds (Pa·s) or greater at a decomposition temperature of the chemical blowing agent particle.

The composite particle may be useful in forming a polymeric foam. Foams are porous materials that are composed of gas filled networks or chambers segmented by a solid matrix. The properties of foamed materials are governed by the composition of the matrix material and the morphology of its cellular structure. For certain applications, the properties of foamed materials improve as the cells in the matrix decrease in size and increase in density and homogeneity. Therefore, optimization of the foam structure can be desirable when designing foam articles.

Control over the morphology of a foam's cell structure is often governed by the foaming method to which the matrix material is subjected. Historically, foaming has been achieved using either physical blowing agents (PBAs), which take advantage of the change in volume that occurs during first order phase transitions such as evaporation and sublimation or when a gas experiences a decrease in pressure; or chemical blowing agents (CBAs), which are molecules that decompose to gaseous species when heated. One's choice in PBAs and CBAs has remained relatively unchanged since the 1950's; however, some disadvantages are associated with each. For instance, hydrocarbon PBAs are considered volatile organic chemicals (VOCs); this designation is becoming increasingly undesirable for many applications. Further, when gases such as nitrogen or carbon dioxide are used as PBAs, specialty high pressure rated reaction vessels and extruders are needed to create the pressure drop necessary to foam the matrix resin. On the other hand, CBAs often face compatibility issues and/or undesirable side reactivity with the matrix materials. Therefore, new blowing agent innovations would be desirable.

An advance in blowing agent technology has been the expandable microsphere (EMS), sold by AkzoNobel and Henkel. These materials are composed of gas or liquid hydrocarbon PBAs inside a crosslinked polymer shell. When heated past the glass transition temperature ($T_g$) of the shell, the shell becomes malleable and expands due to the internal pressure of the heated PBA inside. The thickness of the shell and the quantity of PBA encapsulated is tuned to enable isotropic expansion rather than shell rupture, leading to an increase in volume. This process leads to a syntactic foam filled with polymer shells. EMSs lead to foams with very uniform cell sizes. However, the use of hydrocarbons and their residuals after use can still be an issue for applications that have stringent low VOC requirements. Additionally, the remnant hard shells tend to act as tougheners and also decrease tack if used in foamed adhesives, effects which can be undesirable for tape or damping applications. Finally, the hydrocarbon in the core of the microsphere can diffuse out of the particle over time, which limits this product's shelf life.

The materials described herein aim to address at least certain disadvantages of one or more of the classic physical and chemical blowing agents and expandable microspheres. It has been discovered that encapsulation of CBAs in uncrosslinked (e.g., thermoplastic) polymer shells can lead to foam structures with decreased cell size and increased cell density and homogeneity as compared to unencapsulated CBAs. Encapsulation of a chemical blowing agent by a polymer shell provides a composite particle, in which the coating layer surrounds the core particle as a shell layer. Stated differently, such composite particles are core-shell particles. Additional benefits of these composite particles include that many CBAs do not give off VOCs during use, the shell material can be selected to be compatible with the foam matrix, and CBA particles will not diffuse through the shell wall or degrade at room temperature and pressure thus enabling a long shelf life for the composite particles.

The chemical blowing agent is a solid particulate blowing agent and is typically selected from a diazocompound, a sulfonyl hydrazide, a tetrazole, a nitrosocompound, an acyl sulfonyl hydrazide, hydrazones, thiatriazoles, azides, sulfonyl azides, oxalates, thiatrizene dioxides, or any combination thereof. Examples of suitable chemical blowing agents include for instance and without limitation, 1,1-azodicarboxamide (AZO), p-toluene sulfonyl hydrazide (Hydrazine), and 5H-phenyl tetrazole. AZO is one of the most common CBAs due to its high gas yield upon degradation and low cost. AZO decomposes when heated at or above 190° C. (with optimal temperatures between 190° C. and 230° C.), and gives off 220 mL/g nitrogen and carbon monoxide in the process. Hydrazine is another common CBA, and decomposes when heated at or above 150° C. (with optimal temperatures between 165° C. and 180° C.), and gives off 120 to 130 mL/g of ammonia, hydrogen, and nitrogen in the process. 5H-phenyl tetrazole is also a suitable CBA, and decomposes when heated at or above 215° C. (with optimal temperatures between 240° C. and 250° C.), and gives off 195 to 215 mL/g of nitrogen in the process. An additional suitable CBA is isatoic anhydride, and decomposes when heated at or above 210° C. (with optimal temperatures between 230° C. and 250° C.), and gives off 115 mL/g of carbon dioxide in the process.

Optionally, one or more additional materials may be co-encapsulated with the CBA. In some embodiments, the additional material comprises a metal oxide or metal salt, or combinations thereof. The metal oxide can be zinc oxide, calcium oxide, or a barium-cadmium complex, for example. In some embodiments, the metal salt can be of the form $M(X)_2$, wherein M is zinc, calcium, barium, or cadmium, and wherein X is an organic ligand containing a carboxylic acid moiety. Examples of suitable metal salts include for instance, zinc stearate, calcium stearate, barium-cadmium stearate, zinc 2-ethyl hexanoate, calcium 2-ethyl hexanoate, barium-cadmium 2-ethyl hexanoate, zinc acetate, calcium acetate, barium-cadmium acetate, zinc malonate, calcium malonate, barium-cadmium malonate, zinc benzoate, calcium benzoate, barium-cadmium benzoate, zinc salicylate, calcium salicylate, and barium-cadmium salicylate. Typically, the metal oxide and/or metal salt is present in the composite particle in an amount of 100 wt. % or less of the amount of the chemical blowing agent. In select embodiments, a metal oxide or metal salt is co-encapsulated in the composite particle when the chemical blowing agent is 1,1-azodicarboxamide or p-toluene sulfonyl hydrazide. It has been discovered that the metal oxide or metal salt can alter the decomposition temperature of the CBA.

Similarly, in some embodiments, the one or more additional materials co-encapsulated with the CBA comprises a polyhydroxyl compound, an amine containing compound, or a carboxylic acid containing compound. Examples of suitable polyhydroxyl compounds include for instance, glycerol, ethylene glycol, diethylene glycol, triethylene glycol, and combinations thereof. Examples of suitable carboxylic acid containing compounds include for instance, stearic acid, 2-ethylhexanoic acid, acetic acid, palmitic acid, and combinations thereof. Examples of suitable amine containing compounds include primary amines, for instance, monoethanolamine, diglycolamine, urea, biurea, cyanuric acid, guanidine, or combinations thereof. In select embodiments, an amine containing compound is co-encapsulated in the composite particle when the chemical blowing agent is p-toluene sulfonyl hydrazide.

The composite particle further includes a shell encapsulating the chemical blowing agent. It has been discovered that the use of an uncrosslinked thermoplastic material that has at least a certain minimum complex viscosity at the degradation temperature of the CBA alters the foaming process, as compared to the same CBA that is either not encapsulated or is encapsulated in an uncrosslinked thermoplastic material having a complex viscosity below the minimum amount at the degradation temperature of the CBA. Accordingly, the specific shell material selected will depend on the decomposition temperature of the CBA to be used. In many embodiments, the uncrosslinked thermoplastic material is selected from a starch, polyvinyl pyrollidinone (PVP), a copolymer of vinylpyrrolidone and vinyl acetate, a polypropylene-based elastomer, a styrene-isoprene-styrene copolymer, a (C1-C3)alkyl cellulose, a hydroxyl (C1-C3) alkylcellulose; carboxy methylcellulose, sodium carboxymethyl cellulose, a polyoxazoline, a silicone-based thermoplastic polymer, an olefin-based thermoplastic polymer, a phenoxy resin, a polyamide, or combinations thereof.

Water soluble starches are typically prepared by partial acid hydrolysis of starch. Examples of water soluble starches include those, for example, that are commercially available under the trade designation LYCOAT from Roquette (Lestrem, France). Examples of water soluble celluloses include, but are not limited to, alkyl cellulose (e.g., methyl cellulose, ethyl cellulose, ethyl methyl cellulose), hydroxylalkyl cellulose (e.g., hydroxymethyl cellulose, hydroxyethyl cellulose, hydroxypropyl cellulose, hydroxypropyl methyl cellulose, hydroxyethyl methyl cellulose, and hydroxyethyl ethyl cellulose), and carboxylalkyl cellulose (e.g., carboxymethyl cellulose).

Examples of suitable uncrosslinked thermoplastic materials include for instance and without limitation, hydroxylated starch, carboxylated starch, methyl cellulose, propyl cellulose, ethyl cellulose, hypromellose, hydroxypropylmethyl cellulose, hydroxypropyl cellulose, hydroxyethyl cellulose, or combinations thereof. In certain embodiments, the uncrosslinked thermoplastic material is selected from hydroxypropyl starch, PVP, a polyamide, a styrenic copolymer, or a combination thereof, preferably hydroxypropyl starch.

The weight average molecular weight of the uncrosslinked thermoplastic material is often at least 1,000 Daltons, at least 2,000 Daltons, at least 5,000 Daltons, or at least 10,000 Daltons. The weight average molecular weight can be up to 500,000 Daltons or higher. For example, the weight average molecular weight can be up to 300,000 Daltons, up to 200,000 Daltons, up to 100,000 Daltons, up to 50,000 Daltons, up to 20,000 Daltons. Some such uncrosslinked thermoplastic polymers can be obtained, for example, from Polysciences, Inc. (Warrington, Pa., USA).

The uncrosslinked thermoplastic material can have a higher complex viscosity than 3,700 Pa·s, for instance exhibiting a complex viscosity of 4,000 Pa·s or greater, 4,500 Pa·s or greater, 5,000 Pa·s or greater, 5,500 Pa·s or greater, or 6,000 Pa·s or greater at a decomposition temperature of the chemical blowing agent particle. Unexpectedly, although the uncrosslinked thermoplastic materials typically have glass transition temperatures below the decomposition temperature of the CBA, the shell can decrease diffusion of the gaseous CBA, affecting the foam formation. Without wishing to be bound by theory, it is believed that the viscous uncrosslinked thermoplastic material assists in preventing cell ripening, by minimizing the amount of gas that diffuses preferentially into a previously nucleated cell, but rather nucleates a new cell. This is based on the observed decreased cell size and increased cell density and homogeneity upon foaming with composite particles according to at least certain embodiments of the present disclosure, as compared to the cell size, density, and homogeneity upon foaming with unencapsulated CBAs.

Any suitable method can be used to deposit a coating of uncrosslinked thermoplastic material (i.e., shell) around the chemical blowing agent (e.g., core particle). Typically, an aqueous coating composition (e.g., coating solution or coating dispersion) is mixed with the CBA particles. Such mixture (i.e., a slurry) is then subjected to conditions effective to form dried composite particles as described herein.

In many techniques, the slurry can be formed into particles (e.g., by atomization), and then the particles can be dried (e.g., in a spray chamber). In other techniques, the slurry can be dried (e.g., in a tray), and then formed into particles (e.g., by crushing or milling). A suitable method for forming composite particles of the present disclosure is via spray drying. For instance, a slurry of chemical blowing agent solid particles and uncrosslinked thermoplastic material can be prepared, followed by spray drying using commercially available spray drying systems. Preparation of several (e.g., representative) composite particles using spray drying techniques are described in the Examples below.

For many embodiments of the composite particles, the coating layer surrounds the core particle as a shell layer. Stated differently, such composite particles are core-shell particles. Prior to release of the chemical blowing agent, the composite particles have a core-shell structure with the core particles fully containing the chemical blowing agent. In some embodiments, the shell layer (coating layer) surrounds a single core particle (plus optional co-encapsulant(s), if present). In other embodiments, however, the shell surrounds multiple core particles (i.e., an agglomerate of core particles). That is, the particle contains multiple core particles within a common shell layer (coating layer). The core particles are not tacky. This increases the likelihood that multiple core particles will not adhere together before or during application of the coating layer. That is, the lack of tackiness of the core particles increases the likelihood that the coating layer will be positioned around a single core particle rather than around multiple core particles.

The coating layer is typically formed by mixing an aqueous coating composition (e.g., coating solution or coating dispersion) with the core particle. The coating composition can have any desired percent solids that allow good mixing with the core particles. In many embodiments, the maximum percent solids often correspond to the coating composition (e.g., solution or dispersion) having the highest viscosity that can be pumped. High solids can be desirable because less water needs to be removed during the process of forming the coating layer. If the percent solids value is too high, however, it is more likely that the coating layer will surround multiple core particles. In many embodiments, dilute coating compositions are used to increase the likelihood of forming particles containing a single core particle.

The coating composition often contains at least 5 wt. %, at least 10 wt. %, at least 15 wt. %, or at least 20 wt. % solids. The weight percent solids corresponds to the weight percent thermoplastic material and chemical blowing agent particles in the coating composition. The weight percent solids can be up to 70 wt. % or even higher, up to 60 wt. %, up to 50 wt. %, up to 40 wt. %, or up to 30 wt. %.

Spray drying (spray coating and drying) or similar processes such as fluidized bed coating and drying that can result in the formation of a coating layer with relatively uniform thickness around the core particles is often considered to be preferable. If conditions are selected appropriately, these processes can be used to provide particles having a single rather than multiple core particles. That is, the composite particles have a core-shell arrangement with a coating layer around a single core particle.

With spray drying, the core particles are mixed with the coating composition (e.g., coating solution or coating dispersion) to form a slurry. This slurry is then pumped to a drying chamber that contains an atomizer (to form droplets) and a drying gas. Some common types of atomizers include a rotary wheel (centrifugal) atomizer, a single-fluid/pressure nozzle (hydraulic) atomizer, a two-fluid nozzle (pneumatic) atomizer, and an ultrasonic atomizer. The product, which is the dried composite particles, can be collected by various means such as by gravity or by using a cyclone, filter and bag, electrostatic separation, or the like.

Although a variety of suitable atomization processes can be used, two-fluid nozzle atomizers are often used. With these atomizers, a primary fluid (e.g., the slurry) is pumped through a small orifice and a second fluid, which is typically air or nitrogen but could be any suitable gas, is supplied near the small orifice to further atomize the primary fluid. Increasing the ratio of the secondary fluid to the primary fluid usually decreases the slurry droplet size and increases the likelihood of having a single core particle within the coating layer. The two-fluid system may have either internal mixing (the second fluid is introduced into the primary fluid before exiting the final orifice) or external mixing (the second fluid is introduced after the primary fluid exits the final orifice). Multiple different configurations can be used for introducing the second fluid relative to the primary fluid. For example, the configuration can be a round spray (concentric ring of the second fluid surrounding the primary fluid orifice), conical/hollow spray, angle/flat spray, swirl spray, or the like. Atomizers with these different configurations are available from various suppliers such as Spraying Systems Co. (Wheaton, Ill.).

Numerous options can be used for the flow of the bulk drying gas into and out of the drying chamber. To maintain sufficient thermal energy and to provide a drying gas with sufficient drying capacity (e.g., low dew point), the drying gas is usually continuously cycled through the drying chamber. The main classes of flow patterns of the drying gas relative to the atomized droplets (input material) are co-current flow, counter-current flow, and mixed flow. Co-current flow involves the input material travelling in the same direction as the bulk drying gas; this is often embodied as input material travelling downward immediately after atomization (e.g., being sprayed downward) along with the downward-travelling bulk drying gas. Co-current is usually good for temperature-sensitive systems because the hot drying gas is cooled by the drying droplets, so the solid materials never experience the temperature of the hot incoming drying gas. Counter-current flow involves the input material travelling in the opposite direction to the bulk drying gas; this is often embodied as input material travelling downward immediately after atomization (e.g., being sprayed downward) while the bulk drying gas is travelling upward. This flow is often used for the most efficient drying. Mixed flow is a combination of co- and counter-current flow, where the input material is travelling in the same direction as the bulk drying gas in some regions, but in the opposite direction in other regions. Most often this flow pattern is seen when the input material is being atomized in an upward direction, where the input material initially travels upward from the energy imparted on it by atomization, but is subsequently pulled downward by gravity. Because the input material travels in two directions, the bulk drying gas will travel with the input material in some places and against the input material in others, regardless of whether the bulk drying gas is traveling downward or upward. Mixed flow can be advantageous because of the higher residence times in the drying chamber it provides to the drying solids.

The drying temperature is usually selected based on the composition of the core particles and the aqueous coating composition. In many embodiments, the bulk drying gas at the outlet of the drying chamber has a temperature near the boiling point of the dispersion medium (i.e., water) used in the slurry (in the coating composition) to ensure that adequate drying occurs. This does result, however, in the dried solids reaching a temperature that is near the boiling point of the water. In most instances, this can be beneficial because it minimizes residual liquids, which can lead to improved flowability, and reduction of unnecessary mass. For some particles, however, it may be undesirable to use such a high drying temperature. This can be the situation, for example, where any component of the particles has a decomposition temperature near the boiling point of the water contained in the slurry. In particular, care must be taken to prevent or minimize release of the chemical blowing agent from the particle. In such a situation, the drying temperature is typically reduced below that where any undesirable alteration of the chemical blowing agent particle can occur. Drying can be accomplished at lower temperatures, for example, by increasing the residence time in the drying chamber, increasing the flow rate of the drying gas, decreasing the evaporative load, or modifying the various flow patterns.

Multiple coating layers can be positioned around the core particle. Often, multiple layers are added to provide a thicker coating layer or to alter the release characteristics of the chemical blowing agent from the composite particle. If multiple coating layers are used, they are usually selected to be compatible with each other. In many embodiments, the same uncrosslinked thermoplastic material is used to form the multiple coating layers.

Typically, the composite particle comprises a diameter of 1 micrometer or greater, 2 micrometers or greater, 4 micrometers or greater, 6 micrometers or greater, 8 micrometers or greater, 10 micrometers or greater, 14 micrometers or greater, 17 micrometers or greater, or 20 micrometers or greater; and 60 micrometers or less, 55 micrometers or less, 50 micrometers or less, 45 micrometers or less, 40 micrometers or less, 37 micrometers or less, 33 micrometers or less, 30 micrometers or less, 27 micrometers or less, or 23 micrometers or less. Stated another way, the composite particle can comprise a diameter of 1 to 60 micrometers, inclusive. An (e.g., average) diameter of the composite particles can be determined using scanning electron microscopy (SEM).

In certain embodiments, the chemical blowing agent is present in a composite particle in an amount of at least 10 wt. %, at least 20 wt. %, at least 30 wt. %, at least 40 wt. %, at least 50 wt. %, or at least 60 wt. %, based on total weight of the composite particle. In certain embodiments, the chemical blowing agent is present in a composite particle in an amount of up to 80 wt. %, up to 75 wt. %, up to 70 wt. %, or up to 65 wt. %, based on the total weight of the composite particle.

In certain embodiments, the shell is present in a composite particle in an amount of at least 20 wt. %, at least 30 wt. %, at least 40 wt. %, at least 50 wt. %, or at least 60 wt. %, based on the total weight of the composite particle. In certain embodiments, the shell is present in a composite particle in an amount of up to 90 wt. %, up to 80 wt. %, or up to 70 wt. %, based on the total weight of the composite particle.

Compositions

Composite particles according to at least certain embodiments of the disclosure can be incorporated into (e.g., polymeric) compositions. In a second aspect, a composition is provided. The composition comprises: an uncrosslinked thermoplastic matrix material and a plurality of composite particles distributed in the uncrosslinked thermoplastic matrix material, wherein the composition exhibits an elastic modulus of 0.5 megaPascals (MPa) or greater. Elastic modulus of the composition can be determined experimentally, such as using dynamic mechanical analysis (DMA). The elastic modulus of the compositions is 0.5 MPa or greater, 0.75 MPa or greater, 1.0 MPa or greater, 1.25 MPa or greater, or 1.50 MPa or greater. At such elastic moduli, the compositions are suitable for casting or compressing in a foaming process, as opposed to spray foaming.

Composite Particles

The plurality of composite particles of the composition each comprises: a chemical blowing agent particle encapsulated within a shell comprising an uncrosslinked thermoplastic material, wherein the uncrosslinked thermoplastic material exhibits a complex viscosity of 3,700 Pa·s or greater at a decomposition temperature of the chemical blowing agent particle. The composite particles are as described in detail above with respect to the first aspect. Typically, the composite particles are present in an amount of 0.5 wt. % or greater of the total composition, 1 wt. % or greater, 2 wt. % or greater, 4 wt. % or greater, 6 wt. % or greater, 8 wt. % or greater, or 10 wt. % or greater; and 20 wt. % or less, 17 wt. % or less, 15 wt. % or less, or 12 wt. % or less of the total composition. Stated another way, in some embodiments the composite particles are present in an amount of 0.5 wt. % to 20 wt. %, inclusive; or 10 wt. % to 17 wt. %, inclusive, of the total composition.

Uncrosslinked Thermoplastic Matrix Materials

In some embodiments, the uncrosslinked thermoplastic matrix material is selected from a polyorganosiloxane, a styrenic block copolymer, a polyolefin, a polyolefin copolymer, polyvinyl chloride (PVC), ethylene vinyl acetate, polyacrylate, polymethacrylate, an acrylate copolymer, and an acrylic block copolymer. Alternatively, the uncrosslinked thermoplastic matrix material can comprise a polylactic acid (PLA), in which case the composition further comprises: a polymer having a $T_g$ of 25 degrees Celsius or greater; a crosslinking agent; and a crosslink catalyst. The polymer having a $T_g$ of 25 degrees Celsius or greater is often polyvinyl acetate. In some embodiments, the crosslink catalyst comprises an alkyl or alkenyl ammonium, phosphonium, or imidazolium salt. The composition usually also comprises a plasticizer. One or more additional components can be included, such as a crystallization nucleating agent, an antiblock additive, a cell stabilizer, a surfactant, or any combination thereof.

Suitable polyorganosiloxanes are described, for instance, in co-owned U.S. Pat. No. 7,501,184 (Leir et al.) and U.S. Pat. No. 8,765,881 (Hays et al.), incorporated herein by reference in their entireties. Polyvinyl chloride (PVC) is a polymer made up of a majority (e.g., at least 50%) vinyl chloride, and has been used as a matrix for foam products for years. A suitable PVC includes a PVC compound (e.g., suitable for extrusion processing) available under the trade designation GE FE1456CPF from Mexichem Specialty Compounds (Leominster, Mass.).

Suitable ethylene vinyl acetates (EVAs—copolymers of ethylene with vinyl acetate) include, for example, resins from DuPont (Wilmington, Del.) available under the trade designation ELVAX. ELVAX resins are copolymers of ethylene and vinyl acetate. Typical grades range in vinyl acetate content from 9 to 40 weight percent and in melt index from 0.3 to 500 dg/min. (per ASTM D1238). Suitable ELVAX resins include grades 770, 760, 750, 670, 660, 650, 565, 560, 550, 470, 460, 450, 360, 350, 310, 265, 260, 250, 240, 220, 210, 205, 150, 140 and 40. Suitable EVAs also include high vinyl acetate ethylene copolymers from LyondellBasell (Houston, Tex.) available under the trade designation ULTRATHENE. ULTRATHENE materials are copolymers of ethylene and vinyl acetate. Typical grades range in vinyl acetate content from 7 to 29 weight percent. Suitable ULTRATHENE grades include UE 630, 632, 634, 635, 637, 646-04, 648, 652, 655, 656, 657, 662, 685-009, 688, 672, and 757-026. Suitable EVAs also include EVA copolymers from Celanese EVA (Dallas, Tex.) available under the trade designation ATEVA. Typical grades range in vinyl acetate content from 7 to 23 weight percent. Suitable ATEVA grades include 1030, 1081, 1070, 1211, 1221, 1231, 1240A, 1609, 1615, 1641, 1645, 1711, 1807, 1815, 1821, 1825A, 1841, 1941C, 2306E, 2911M, and 3211.

As used herein, polyacrylates refer to polymeric materials generally prepared by polymerizing acrylate monomers, and polymethacrylates refer to polymeric materials generally prepared by polymerizing methacrylate monomers. Acrylate and methacrylate monomers are referred to collectively herein as "(meth)acrylate" monomers. Polymers prepared from one or more of acrylate monomers, will be referred to collectively as "polyacrylates", while polymers prepared from one or more of methacrylate monomers, will be referred to collectively as "polymethacrylates". The polymers can be homopolymers or copolymers, optionally in combination with other, non-acrylate, e.g., vinyl-unsaturated, monomers. The copolymers of polyacrylates are acrylate copolymers, useful as uncrosslinked thermoplastic matrix material. Example suitable non-acrylate functional groups in acrylate copolymers include for instance, ethylene, acrylamides, acrylonitriles, methacrylonitriles, vinyl esters, vinyl ethers, vinyl pyrrolidinone, vinyl caprolactam, vinyl aromatic, dioxepines. Hence, the polyacrylate or polymethacrylate is polymerized prior to being combined with monomer having functional groups that copolymerize with the polyacrylate or polymethacrylate component. Specific examples of polyacrylate and polymethacrylate polymers include those prepared from free-radically polymerizable (meth)acrylate monomers or oligomers, such as described in U.S. Pat. No. 5,252,694 (Willett et al.) at col. 5, lines 35-68.

As used herein, "block copolymers" refer to elastomeric components in which chemically different blocks or sequences are covalently bonded to each other. Block copolymers include at least two different polymeric blocks that are referred to as the A block and the B block. The A block and the B block may have different chemical compositions and different glass transition temperatures. Block copolymers of the present disclosure can be divided into four main classes: di-block ((A-B) structure), tri-block ((A-B-A) structure), multi-block (-(A-B)$_n$-structure), and star block copolymers ((A-B)$_n$-structure). Di-block, tri-block, and multi-block structures may also be classified as linear block copolymers. Star block copolymers fall into a general class of block copolymer structures having a branched structure. Star block copolymers are also referred to as radial or palmtree copolymers, as they have a central point from which branches extend. Block copolymers herein are to be distinguished from comb-type polymer structure and other branched copolymers. These other branched structures do not have a central point from which branches extend.

Suitable acrylic block copolymers comprise at least one acrylic monomer. Exemplary acrylic block copolymer may comprise monomer units including: alkyl ester methacrylates such as, e.g., methyl methacrylate, ethyl methacrylate, n-propyl methacrylate, isopropyl methacrylate, n-butyl methacrylate, isobutyl methacrylate, s-butyl methacrylate, t-butyl methacrylate, n-hexyl methacrylate, cyclohexyl methacrylate, 2-ethyl hexyl methacrylate, n-octyl methacrylate, lauryl methacrylate, tridecyl methacrylate, stearyl methacrylate, isobornyl methacrylate, benzyl methacrylate, or phenyl methacrylate; alkyl ester acrylate such as, e.g., n-hexyl acrylate, cyclo hexyl acrylate, 2-ethyl hexyl acrylate, n-octyl acrylate, lauryl acrylate, tridecyl acrylate, stearyl acrylate, n-butyl acrylate, isobutyl acrylate, sec-butyl acrylate, tert-butyl acrylate, or 2-octylacrylate; (meth)acrylate esters such as, e.g., those having the following ester groups: methoxy ethyl(meth)acrylate, ethoxy ethyl(meth)acrylate, diethyl amino ethyl meth)acrylate, 2-hydroxy ethyl (meth)acrylate, 2-amino ethyl(meth)acrylate, glycidyl (meth)acrylate, tetrahydro furfuryl(meth)acrylate; isobornyl (meth)acrylate, and combinations thereof. The acrylic block copolymer may comprise additional monomer units, for example, vinyl group monomers having carboxyl groups such as, e.g., (meth)acrylic acid, crotonic acid, maleic acid, maleic acid anhydride, fumaric acid, or (meth)acryl amide; aromatic vinyl group monomers such as, e.g., styrene, α-methyl styrene, or p-methyl styrene; conjugated diene group monomers such as, e.g., butadiene or isoprene; olefin group monomers such as, e.g., ethylene, or propylene; or lactone group monomers such as, e.g., ε-caprolactone or valero lactone; and combinations thereof. One representative acrylic block copolymer is available from Kuraray (Tokyo, Japan), as the trade designation KURARITY LA2330.

Suitable styrenic block copolymers include for instance, styrene-isoprene-styrene copolymers, acrylonitrile-butadiene-styrene copolymers, styrene-butadiene-styrene copolymers, styrene-diene block copolymers, and styrene-ethylene-butylene-styrene copolymers. Example styrenic block copolymers may include linear, radial, star and tapered styrene-isoprene block copolymers such as KRATON D1107P, available from Kraton Polymers (Houston, Tex.), and EUROPRENE SOL TE 9110, available from EniChem Elastomers Americas, Inc. (Houston, Tex.), linear styrene-(ethylene/butylene) block copolymers such as KRATON G1657 available from Kraton Polymers, linear styrene-(ethylene/propylene) block copolymers such as KRATON G1657X available from Kraton Polymers, styrene-isoprene-styrene block copolymers such as KRATON D1119P available from Kraton Polymers, acrylonitrile-butadiene-styrene copolymers such as LUSTRAN ABS 348 available from INEOS (London, UK), linear, radial, and star styrene-butadiene block copolymers such as KRATON D1118X, available from Kraton Polymers, and EUROPRENE SOL TE 6205 available from EniChem Elastomers Americas, Inc., or styrene-ethylene-butylene-styrene copolymers, such as, for example the polymer KRATON G4609H, commercially available from Kraton Polymers.

Suitable polyolefin polymers include for instance and without limitation, semicrystalline polymer resins such as polyolefins and polyolefin copolymers (e.g., based upon monomers having between 2 and 8 carbon atoms such as low density polyethylene, high density polyethylene, polypropylene, ethylene-propylene copolymers, etc.), polyesters and co-polyesters, fluorinated homopolymers and copolymers, polyalkylene oxides (e.g., polyethylene oxide and polypropylene oxide), polyvinyl alcohol, ionomers (e.g., ethylene-methacrylic acid copolymers neutralized with base), and cellulose acetate and combinations thereof.

Suitable polylactic acid ("PLA") polymers are described, for instance, in co-owned U.S. Application Publication No. 2017/0313912 (Zhou et al.), incorporated herein by reference. When PLA is included, the PLA can comprise an amorphous PLA polymer alone, a semicrystalline PLA polymer alone, or both in combination. Suitable examples of semicrystalline PLA include NATUREWORKS INGEO 4042D and 4032D. These polymers have been described in the literature as having molecular weight Mw of about 200,000 g/mole; Mn of about 100,000 g/mole; and a polydispersity of about 2.0. Another suitable semicrystalline PLA is available as "SYNTERRA PDLA". A suitable amorphous PLA includes NATUREWORKS INGEO 4060D grade. This polymer has been described in the literature to have a molecular weight Mw of about 180,000 g/mole.

When the uncrosslinked thermoplastic matrix comprises PLA, the composition further comprises a second polymer, such as polyvinyl acetate polymer. The second polymer can improve the compatibility of the PLA with a plasticizer such that the plasticizer concentration can be increased without plasticizer migration. The second (e.g., polyvinyl acetate) polymer has a $T_g$ of at least 25° C., 30° C., 35° C. or 40° C. The $T_g$ of the second (e.g., polyvinyl acetate) polymer is typically no greater than 80° C., 75° C., 70° C., 65° C., 60° C., 55° C., 50° C. or 45° C. Polyvinyl acetate polymers are commercially available from various suppliers including Wacker Chemie AG (Munich, Germany) under the trade designation VINNAPAS and from Vinavil Americas Corporation (West Chicago, Ill.) under the trade designation VINAVIL. A single second (e.g., polyvinyl acetate) polymer may be utilized or a combination of two or more second (e.g., polyvinyl acetate) polymers. The total amount of second (e.g., polyvinyl acetate) polymer present in the composition described herein is at least about 10 wt.-% and typically no greater than about 50, 45, or 40 wt. %, based on the total weight of the foam composition. In some embodiments, the concentration of second (e.g., polyvinyl acetate) polymer is present in an amount of at least 15 or 20 wt. %.

Typically, the composition further comprises a plasticizer. The total amount of plasticizer in the composition typically ranges from about 5 wt.-% to about 35, 40, 45 or 50 wt. %, based on the total weight of the composition. Various plasticizers that are capable of plasticizing PLA have been described in the art. The plasticizers are generally a liquid at 25° C. and typically have a molecular weight ranging from about 200 g/mol to 10,000 g/mol. Various combinations of plasticizers may be utilized.

The plasticizer preferably comprises one or more alkyl or aliphatic esters or ether groups. Multi-functional esters and/or ethers are typically preferred. These include alkyl phosphate esters, dialkylether diesters, tricarboxylic esters, epoxidized oils and esters, polyesters, polyglycol diesters, alkyl alkylether diesters, aliphatic diesters, alkylether monoesters, citrate esters, dicarboxylic esters, vegetable oils and their derivatives, and esters of glycerine. Such plasticizers generally lack aromatic groups and halogen atoms and are anticipated to be biodegradable. Such plasticizers commonly further comprise linear or branched alkyl terminal group groups having a carbon chain length of $C_2$ to $C_{10}$.

Representative citrate-based plasticizers include for example, triethyl citrate, acetyl triethyl citrate, tributyl citrate, acetyl tributyl citrate, trihexyl citrate, acetyl trihexyl citrate, trioctyl citrate, acetyl trioctyl citrate, butyryl trihexyl citrate, acetyl tris-3-methylbutyl citrate, acetyl tris-2-methylbutyl citrate, acetyl tris-2-ethylhexyl citrate, and acetyl tris-2-octyl citrate.

In another embodiment, the plasticizer comprises a polyethylene glycol backbone and ester alkyl terminal groups. The molecular weight of the polyethylene glycol segment is typically at least 100, 150 or 200 g/mole and no greater than 1,000 g/mole. In some embodiments, the polyethylene glycol segment has a molecular weight no greater than 900, 800, 700, or 600 g/mole. Examples include polyethylene glycol (400) di-ethylhexonate available from Hallstar, Chicago, Ill. under the trade designation "TEGMER 809" ("TegMeR™ 809") and tetraethylene glycol di-ethylhexonate available from Hallstar, Chicago, Ill. under the trade designation "TEGMER 804" ("TegMeR™ 804").

In another embodiment, the plasticizer is a substituted or unsubstituted aliphatic polyester, such as described in U.S. Pat. No. 8,158,731 (Stefanisin et al.); incorporated herein by reference. In some embodiments, the aliphatic polyester plasticizer comprises repeating units derivable from succinic acid, glutaric acid, adipic acid, and/or sebacic acid. In some embodiments, the polyesters of the polymer blends disclosed herein comprise repeating units derivable from 1,3-propanediol and/or 1,2-propanediol. In some embodiments, the polyesters of the polymer blends disclosed herein comprise one or two terminator units derivable from 1-octanol, 1-decanol, and/or mixtures thereof. In some embodiments, the polyesters of the polymer blends disclosed herein comprise repeating units derivable from succinic acid, glutaric acid, adipic acid, and/or sebacic acid; repeating units derivable from 1,3-propanediol and/or 1,2-propanediol; and one or two terminator units derivable from 1-octanol, 1-decanol, and/or mixtures thereof. One representative aliphatic polyester plasticizer is available from Hallstar, Chicago, Ill., as the trade designation HALLGREEN R-8010. In some embodiments, the plasticizer compound typically has little or no hydroxyl groups. In some embodiments, the wt.-% percent of hydroxyl groups relative to the total weight of the plasticizer compound is no greater than 10, 9, 6, 7, 6, 5, 4, 3, 2, 1 wt. %. In some embodiments, the plasticizer compound contains no hydroxyl groups. Thus, in this embodiment, the plasticizer is not glycerol or water.

The properties of foam compositions based on PLA can be further controlled through the addition of one or more of crosslinking agents, crosslink catalysts, nucleating agents, and/or cell stabilizers, which assist in forming a foam composition using low melt viscosity PLA as the uncrosslinked thermoplastic matrix material in a composition. Once modified, at least some of these foam systems can be extruded or molded into parts with desired properties.

Suitable crosslinking agents (e.g., crosslinkers) are often low molecular weight polymers that contain multiple acid or alcohol reactive functionality, such as reactive polymers comprising a functional group selected from epoxide, anhydride, oxazoline, isocyanate, azlactone, aziridine, and combinations thereof. When used, the crosslinking agent is present in an amount of at least 0.005 wt. %, at least 0.01, at least 0.025, at least 0.05, at least 0.1, at least 0.25, at least 0.5, at least 1.0, or at least 2.0 wt. %, based on the total weight of the composition; and up to 5.0 wt. %, up to 4.5, up to 4.0, up to 3.5, up to 3.0, or up to 2.5, or up to 1.0, or up to 0.5 wt. %, based on the total weight of the composition. Useful crosslinking agents (e.g., crosslinkers) include for instance and without limitation the "JONCRYL ADR" chain extenders available from BASF Corporation (Sturtevant, Wis.), for example under the trade designations "JONCRYL ADR 4300", "JONCRYL ADR 4370", "JONCRYL ADR 4380", "JONCRYL ADR 4385", and "JONCRYL ADR 4368"; and an oxazoline functionalized polymer available from Nippon Shokubai (Osaka, Japan) under the trade designation "EPOCROS RPS-1005".

In certain embodiments, the foam composition further comprises a crosslink catalyst to increase the rate of crosslinking as compared to the rate of crosslinking in the absence of the crosslink catalyst. In some embodiments, the crosslink catalyst is present in an amount of at least 0.005 wt. %, at least 0.01, at least 0.025, at least 0.05, at least 0.1, at least 0.25, at least 0.5, or at least 0.75 wt. %, based on the total weight of the composition; and up to 2.50 wt. %, up to 2.25, up to 2.0, up to 1.75, up to 1.5, up to 1.25, or up to 1.0 wt. %, based on the total weight of the composition.

In certain embodiments, the crosslink catalyst comprises an alkyl or alkenyl ammonium, phosphonium, or imidizolium salt. Useful crosslink catalysts include for instance and without limitation crosslink catalysts of formula (I), (II), (III), or (IV):

$$Q(R^1)_4X \quad (I);$$

$$QR^1(R^2)_3X \quad (II);$$

$$QR^3(R^2)_3X \quad (II);$$

$$Q(R^3)_3R'X \quad (IV);$$

wherein Q is nitrogen or phosphorous; $R^1$ is a $C_1$-$C_{20}$ alkyl or alkenyl group; $R^2$ is a $C_1$-$C_8$ alkyl or alkenyl group; $R^3$ is a phenyl group, a benzyl group, or a polycyclic aromatic hydrocarbon group; and X is an anion selected from bromide, iodide, chloride, acetate, sulfate, carbonate, phosphate, tosylate, or hexafluorophosphase. In certain embodiments, Q is N; R' is a $C_1$-$C_{12}$ alkyl group; $R^2$ is a $C_1$-$C_8$ alkyl group; $R^3$ is a phenyl group; and X is an anion selected from bromide, iodide, or chloride. Some suitable crosslink catalysts include, for example, dodecyltrimethylammonium bromide, tetrabutylammonium bromide, tetrabutylammonium iodide, tetraoctylammonium bromide, tetrabutylammonium chloride, and triphenyl monoalkyl phosphonium salts.

Such PLA crosslink catalysts as described above assist in causing the composition to crosslink at least partially concurrently with the foaming of the composition when it comprises PLA.

Additives

In certain embodiments, the composition further comprises a blowing agent comprising a plurality of expandable microspheres. The blowing agent is present in an amount ranging from 0.1 to 10 weight percent, inclusive, based on the total weight of the composition. An "expandable microsphere" refers to a microsphere that includes a polymer shell and a core material in the form of a gas, liquid, or combination thereof, which expands upon heating. Expansion of the core material, in turn, causes the shell to expand, at least at the heating temperature. An expandable microsphere is one where the shell can be initially expanded or further expanded without breaking. Some microspheres may have polymer shells that only allow the core material to expand at or near the heating temperature. Hence, during the formation of the foam composition, at least some of the expandable microspheres will expand and form cells in the foam. Suitable expandable microspheres include for instance and without limitation, those available from Pierce Stevens (Buffalo, N.Y.) under the designations "F30D", "F80SD", and "F100D"; and from Akzo-Nobel (Sundsvall, Sweden) under the designations "Expancel 551", "Expancel 461", "Expancel 091", and "Expancel 930". Each of these microspheres features an acrylonitrile-containing shell.

Optionally, one or more unencapsulated chemical blowing agents are also included in the composition. As described above, suitable chemical blowing agents include solid particulate blowing agents such as a diazocompound, a sulfonyl hydrazide, a tetrazole, a nitrosocompound, an acyl sulfonyl hydrazide, hydrazones, thiatriazoles, azides, sulfonyl azides, oxalates, thiatrizene dioxides, isatoic anhydride, or any combination thereof.

To facilitate the rate of crystallization when an unencapsulated chemical blowing agent is present, a crystallization nucleating agent may also be present in the composition. A crystallization nucleating agent generally enhances the initiation of crystallization sites and induces crystallization of the polymeric material, thereby increasing the rate of crystallization. Additionally, a cell nucleating agent generally provides initiating sites at which a blowing agent forms voids in a foam composition. By selection of the cell nucleating agent, void sizes in the foam are better controlled (e.g., made smaller or larger), as compared to without including the nucleating agent. Typically, when used, the one or more nucleating agents (e.g., crystallization and/or cell nucleating agents) are present in an amount ranging from 0.1 to 15 weight percent, inclusive, based on the total weight of the composition.

Suitable nucleating agent(s) include for example inorganic minerals, organic compounds, salts of organic acids and imides, finely divided crystalline polymers with a melting point above the processing temperature of the uncrosslinked thermoplastic matrix material, and combinations of two or more of the foregoing. Combinations of two or more different nucleating agents may also be used.

Examples of useful crystallization nucleating agents include, for example, talc (hydrated magnesium silicate—$H_2Mg_3(SiO_3)_4$ or $Mg_3Si_4O_{10}(OH)_2$), silica ($SiO_2$), titania ($TiO_2$), alumina ($Al_2O_3$), zinc oxide, sodium salt of saccharin, calcium silicate, sodium benzoate, calcium titanate, aromatic sulfonate derivative, boron nitride, copper phthalocyanine, phthalocyanine, sodium salt of saccharin, isotactic polypropylene, polybutylene terephthalate, and the like.

When an organic crystallization nucleating agent is present, the nucleating agent is typically at a concentration of at least 0.01, 0.02, 0.03, 0.04, 0.05, 0.1, 0.15 or 0.2 wt.-% ranging up to about 1, 2, 3, 4 or 5 wt.-% based on the total weight of the composition. When the nucleating agent is an inorganic oxide filler such as silica, alumina, zinc oxide, and talc, the concentration can be higher.

In one embodiment, the crystallization nucleating agent may be characterized as a salt of a phosphorous-containing aromatic organic acid such as zinc phenylphosphonate, magnesium phenylphosphonate, disodium 4-tert-butylphenyl phosponate, and sodium diphenylphosphinates.

One favored crystallization nucleating agent is zinc phenylphosphonate having the following chemical formula:

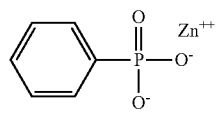

available from Nissan Chemical Industries, Ltd under the trade designation "Ecopromote".

Examples of useful cell nucleating agents include, for example, talc, silica, silica particles functionalized with organic groups (e.g., an octyl silane, a polyethylene glycol silane), glass beads, polymer particles (e.g., starch (such as hydroxypropyl starch), polystyrene, polyvinyl pyrollidone (PVP)), mica, alumina, clay, calcium silicate, calcium titanate, calcium carbonate, and titania.

The compositions and articles may optionally contain one or more conventional additives. Additives include, for example, antiblock additives, cell stabilizers, surfactants, antioxidants, ultraviolet absorbers, lubricants, processing aids, antistatic agents, colorants, impact resistance aids, fillers, matting agents, flame retardants (e.g. zinc borate), pigments, and the like. Suitable cell stabilizers include for instance and without limitation erucamide (i.e., (Z)-13-Docosenamide), and surface modified silica nanoparticles. Surface modified silica nanoparticles may be functionalized with an octyl silane or a polyethylene glycol silane, for example. In certain embodiments, additional suitable surface modified silica nanoparticles include those described in U.S. Pat. No. 6,586,483 (Kolb et al.).

In some embodiments, inorganic fillers may be used as antiblock additives to prevent blocking or sticking of layers or rolls of foam compositions during storage and transport. Inorganic fillers include clays and minerals, either surface modified or not. Examples include talc, diatomaceous earth, silica, mica, kaolin, titanium dioxide, perlite, and wollastonite.

Hence, certain materials may potentially act as more than one of a crystallization nucleating agent, a cell nucleating agent, an antiblock additive, a cell stabilizer, etc., in a composition.

Organic biomaterial fillers include a variety of forest and agricultural products, either with or without modification. Examples include cellulose, wheat, starch, modified starch, chitin, chitosan, keratin, cellulosic materials derived from agricultural products, gluten, flour, and guar gum. The term "flour" concerns generally a composition having protein-containing and starch-containing fractions originating from one and the same vegetable source, wherein the protein-containing fraction and the starch-containing fraction have not been separated from one another. Typical proteins present in the flours are globulins, albumins, glutenins, secalins, prolamins, glutelins. In typical embodiments, the composition comprises little or no organic biomaterial fillers such a flour. Thus, the concentration of organic biomaterial filler (e.g. flour) is typically less than 10, 9, 8, 7, 6, 5, 4, 3, 2, or 1 wt.-% of the total foam composition.

Foam Compositions

In a third aspect, a foam composition is provided. The foam composition comprises: a closed cell foam thermoplastic matrix material and a plurality of composite particles distributed in the closed cell foam thermoplastic matrix material, wherein the plurality of composite particles each comprises: a chemical blowing agent particle encapsulated within a shell comprising an uncrosslinked thermoplastic material, wherein the uncrosslinked thermoplastic material exhibits a complex viscosity of 3,700 Pa·s or greater at a decomposition temperature of the chemical blowing agent particle. The composite particle is described in detail above with respect to the first aspect. The closed cell foam thermoplastic matrix material is formed by foaming the uncrosslinked thermoplastic matrix material described above with respect to the second aspect.

The foam composition comprises a closed cell foam, which means that the foam contains substantially no connected cell pathways that extend from one outer surface through the material to another outer surface. A closed cell foam can include up to about 10% open cells, within the meaning of "substantially" no connected cell pathways. Stated another way, the foam composition comprises 90% or greater closed cells, 92% or greater closed cells, 95% or greater closed cells, or 98% or greater closed cells.

As mentioned above, it has been discovered that the preparation of foam compositions including composite particles according to at least certain embodiments of the present disclosure resulted in decreased cell size and increased cell density and homogeneity upon foaming, as compared to the cell size, density, and homogeneity upon foaming with unencapsulated CBAs. Foam cells can be characterized by image analysis of a cross-section using scanning electron microscopy (SEM). In some embodiments, the foam composition comprises an average cell homogeneity of 3.0 or greater, 4.0 or greater, 5.0 or greater, 6.0 or greater, 7.0 or greater, or 8.0 or greater. As used herein, cell homogeneity is determined using the formula that the cell homogeneity is equal to $1/\sigma_{cell\ diameter}$ in units of inverse millimeters. Various properties of the foam compositions, as determined by the test methods set forth in the examples, can include cell size and homogeneity compression modulus, and max torque (e.g., extent of crosslinking).

In certain embodiments, the foam composition comprises an average cell size of 350 micrometers or less, 300 micrometers or less, 250 micrometers or less, 300 micrometers or less, 150 micrometers or less, or 100 micrometers or less. Further, in some embodiments, the foam composition comprises an average cell density of 11 cells per square millimeter (cell/mm$^2$) or greater, 12 cell/mm$^2$ or greater, 13 cell/mm$^2$ or greater, 14 cell/mm$^2$ or greater, 15 cell/mm$^2$ or greater, or 16 cell/mm$^2$ or greater.

In certain embodiments, 0.05 wt. % or more, 0.1 wt. % or more, 0.15 wt. % or more, 0.25 wt. % or more, 0.5 wt. % or more, 0.75 wt. % or more, 1 wt. % or more, 1.5 wt. % or more, or 2 wt. % or more of the composite particles remain (e.g., intact) following foaming of the composition to form the foam composition; and 10 wt. % or less, 9.5 wt. % or less, 9 wt. % or less, 8.5 wt. % or less, 8 wt. % or less, 7.5 wt. % or less, 7 wt. % or less, 6.5 wt. % or less, 6 wt. % or less, 5.5 wt. % or less, 5 wt. % or less, 4.5 wt. % or less, 4 wt. % or less, 3.5 wt. % or less, 3 wt. % or less, or 2.5 wt.

% or less of the composite particles remain in the foam composition. Stated another way, the amount of composite particles remaining in the foam composition following foaming can range from 0.05 to 10 wt. % or 0.05 to 2.5 wt. %, of the total foam composition.

Advantageously, foam compositions according to at least certain embodiments of the present disclosure provide a more compressible foam than the same foam compositions prepared using unencapsulated chemical blowing agents or expandable microspheres at equivalent weight percent of blowing agent. Hence, in certain embodiments, the foam composition exhibits a maximum compressive force of 1,000 grams per square millimeter ($g/mm^2$) or less, 900 $g/mm^2$ or less, 850 $g/mm^2$ or less, 800 $g/mm^2$ or less, 750 $g/mm^2$ or less, 700 $g/mm^2$ or less, 650 $g/mm^2$ or less, 600 $g/mm^2$ or less, 550 $g/mm^2$ or less, 500 $g/mm^2$ or less, 450 $g/mm^2$ or less, or 400 $g/mm^2$ or less.

Process of Making a Foam Composition

In a seventh aspect, a method of making a foam composition is provided. The method comprises compressing a mixture; and heating the compressed mixture, thereby forming the foam composition, for instance by using extrusion. The mixture comprises an uncrosslinked thermoplastic matrix material and a plurality of composite particles distributed in the uncrosslinked thermoplastic matrix material, wherein the mixture exhibits an elastic modulus of 0.5 megaPascals (MPa) or greater, and wherein the plurality of composite particles each comprises: a chemical blowing agent particle encapsulated within a shell comprising an uncrosslinked thermoplastic material, wherein the uncrosslinked thermoplastic material exhibits a complex viscosity of 3,700 Pa·s or greater at a decomposition temperature of the chemical blowing agent particle.

In an eighth aspect, another method of making a foam composition is provided. The method comprises casting a mixture in a mold; and heating the case mixture, thereby forming the foam composition. The mixture comprises an uncrosslinked thermoplastic matrix material and a plurality of composite particles distributed in the uncrosslinked thermoplastic matrix material, wherein the mixture exhibits an elastic modulus of 0.5 megaPascals (MPa) or greater, and wherein the plurality of composite particles each comprises: a chemical blowing agent particle encapsulated within a shell comprising an uncrosslinked thermoplastic material, wherein the uncrosslinked thermoplastic material exhibits a complex viscosity of 3,700 Pa·s or greater at a decomposition temperature of the chemical blowing agent particle.

In preparing a composition as described herein, the components (e.g., uncrosslinked thermoplastic matrix material, composite particles, and other optional components) are heated (e.g., subjected to a temperature ranging from 90° C.-125° C., inclusive) and thoroughly mixed using any suitable means known by those of ordinary skill in the art. For example, the composition may be mixed by use of a (e.g., Brabender) mixer, extruder, kneader or the like.

In certain embodiments, the mixture may be prepared into the form of pellets, such as by extruding and pelletizing at least a portion of the mixture. One advantage to the mixture comprising a plurality of pellets is a greater ease of handling the mixture than certain alternate forms of mixtures.

Upon heating the mixture, the chemical blowing agent of the composite particle assists in generating voids to form the foam composition. In some embodiments, more than one blowing agent may be used in certain foam compositions, and in addition to the composite particles, the blowing agent may comprise an unencapsulated chemical blowing agent, an unencapsulated physical blowing agent, expandable microspheres, or a combination thereof. Useful categories of blowing agents include, for instance, a volatile liquid, a gas, a chemical compound, and a plurality of expandable microspheres. Volatile liquid and gas blowing agents tend to escape from the mixture, leaving voids behind, to form the foam composition. Chemical compound blowing agents decompose and at least a portion of the decomposition product(s) escape from the mixture, leaving voids behind. In some embodiments, the blowing agent comprises a plurality of expandable microspheres, which are described above.

Suitable unencapsulated chemical blowing agents include for instance and without limitation, a synthetic azo-based compound, a carbonate-based compound, a hydrazide-based compound, and combinations thereof. Useful specific compounds include, for example, 1,1-azodicarbonamide, azodi-isobutyro-nitrile, benzenesulfonhydrazide, and hydrazo dicarbonamide.

Various methods for preparing foam compositions are suitable for at least certain embodiments of the method. More particularly, the method may include compressing the mixture in a melt press and/or an extruder, and may include heating the compressed mixture in a mold, an oven, and/or an extruder. In certain embodiments, the mixture is compressed in an extruder, heated in an extruder, or both compressed and heated in an extruder. In certain embodiments, the compressed mixture is heated at ambient pressure. The compressed mixture is heated, typically by subjection to a temperature of at least 130° C., at least 140° C., at least 150° C., at least 160° C., or at least 170° C.; and up to 250° C., up to 230° C., up to 210° C., up to 200° C., up to 190° C., or up to 180° C.; such as ranging from 130° C. and 250° C., inclusive.

Optionally, the mixture further comprises at least one physical blowing agent, such as a volatile liquid and/or expandable microspheres.

Articles

In a fourth aspect, a foam sheet is provided. The foam sheet includes the foam composition according to the third aspect (e.g., closed cell foam) described in detail above. Preparing a foam composition in the form of a sheet provides for use of the foam composition in thermal and acoustic insulation applications, for instance.

When the foam composition is a monolithic sheet, the thickness of the sheet is typically at least 25, 50, or 100 micrometers (μm) (4 mils) to 500 μm (20 mils) thickness. In some embodiments, the thickness of the foam sheet is no greater than 10 mm, 5 mm, 2 mm, 400 μm, 300 μm, or 200 μm. The foam may be in the form of individual sheets, particularly for a thickness of greater than 20 mils. The (e.g., thinner) foam may be in the form of a roll-good.

In a fifth aspect, a hearing protection article is provided. The hearing protection article includes the foam composition according to the third aspect described in detail above.

In a sixth aspect, a tape is provided. The tape includes a substrate and a foam composition according to the third aspect described in detail above, the foam composition disposed on the substrate.

Process of Protecting Hearing

In a ninth aspect, a process is provided. The process includes providing at least one hearing protection article according to the fifth aspect; and interposing the hearing protection article between an acoustic source and an acoustic receiver in the form of a human ear.

Hearing protection articles suitable for use in the process of the ninth aspect include those that comprise at least one hearing protection article (e.g., earplug). In certain embodiments, the hearing protection articles further comprise at least one casing that at least partially encloses the sound barrier and is adapted for contact (direct or indirect) with the human ear. For instance, the hearing protection device can be an acoustic earmuff or an acoustic earplug. Various configurations of earplugs are known, that could be made employing foam compositions according to the present disclosure, for instance, suitable earplugs include those illustrated in FIGS. 9A-11B.

Figure 9A:
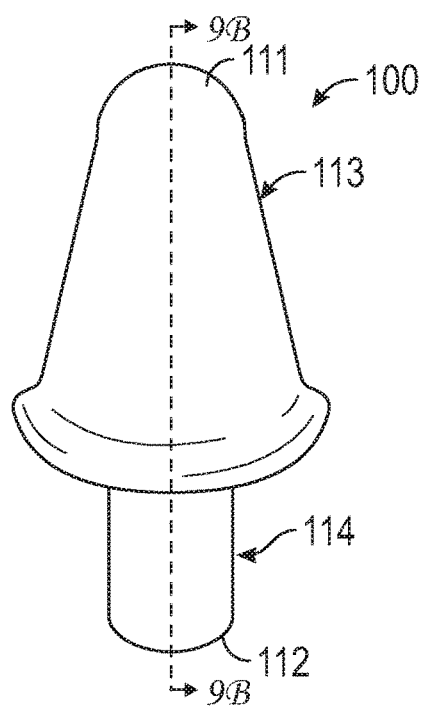
FIG. 9A is a perspective view of an exemplary earplug according to the present disclosure.
Figure 9B:
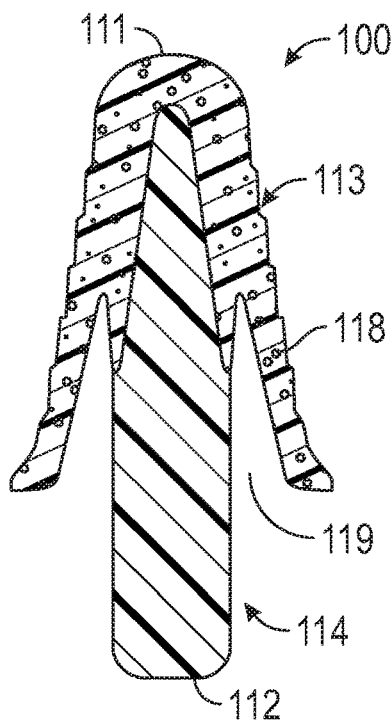
FIG. 9B is a cross-sectional view of the earplug of FIG. 9A.

Referring to FIGS. 9A-9B, an exemplary push-to-fit type earplug 100 is shown. In an exemplary embodiment, the earplug 100 includes a body made entirely of closed cell foam. The body has a first end 111 and a second end 112, and includes a sound attenuating portion 113 and a semi-rigid stem portion 114. The stem portion 114 is partially surrounded by sound attenuating portion 113, and is partially exposed to allow a user to grasp the stem portion 114 to handle the earplug 100 and to facilitate insertion of the earplug 100 into an ear canal of a user. In this embodiment, the stem portion 114 does not extend to the first end 111 and only the sound attenuating portion 113 is present at the first end 111. Optionally, the sound attenuating portions 113 may include a flange 118 extending outwardly and defining a flange cavity 119. The flange 118 may collapse inwardly into the flange cavity 119 upon insertion into an ear canal of a user. In many embodiments, at least the sound attenuating portion 113 is composed of foam compositions according to the present disclosure.

Figure 10A:
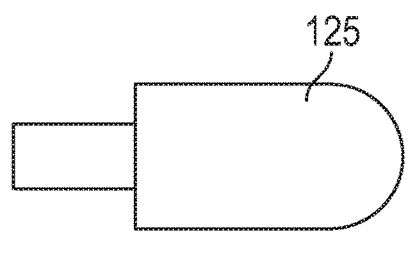
FIG. 10A is a side view of another exemplary earplug according to the present disclosure.
Figure 10B:
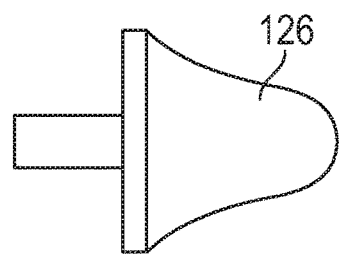
FIG. 10B is a side view of further exemplary earplug according to the present disclosure.
Figure 11A:
FIG. 11A is a side view of yet another exemplary earplug according to the present disclosure.
Figure 11B:
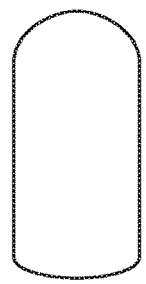
FIG. 11B is a side view of a still further exemplary earplug according to the present disclosure.

Referring to FIGS. 10A and 10B, in various other embodiments, for example, the sound attenuating portions 125, 126, respectively, may be hemisphere-shaped, bullet-shaped, or otherwise shaped to provide a desired fit or to suit a particular application. Referring to FIGS. 11A and 11B, in certain embodiments, the earplug does not include a stem, but rather has a cylindrical shape (i.e., FIG. 11A) or a cylindrical shape with a rounded end (i.e., FIG. 11B).

Figure 12:
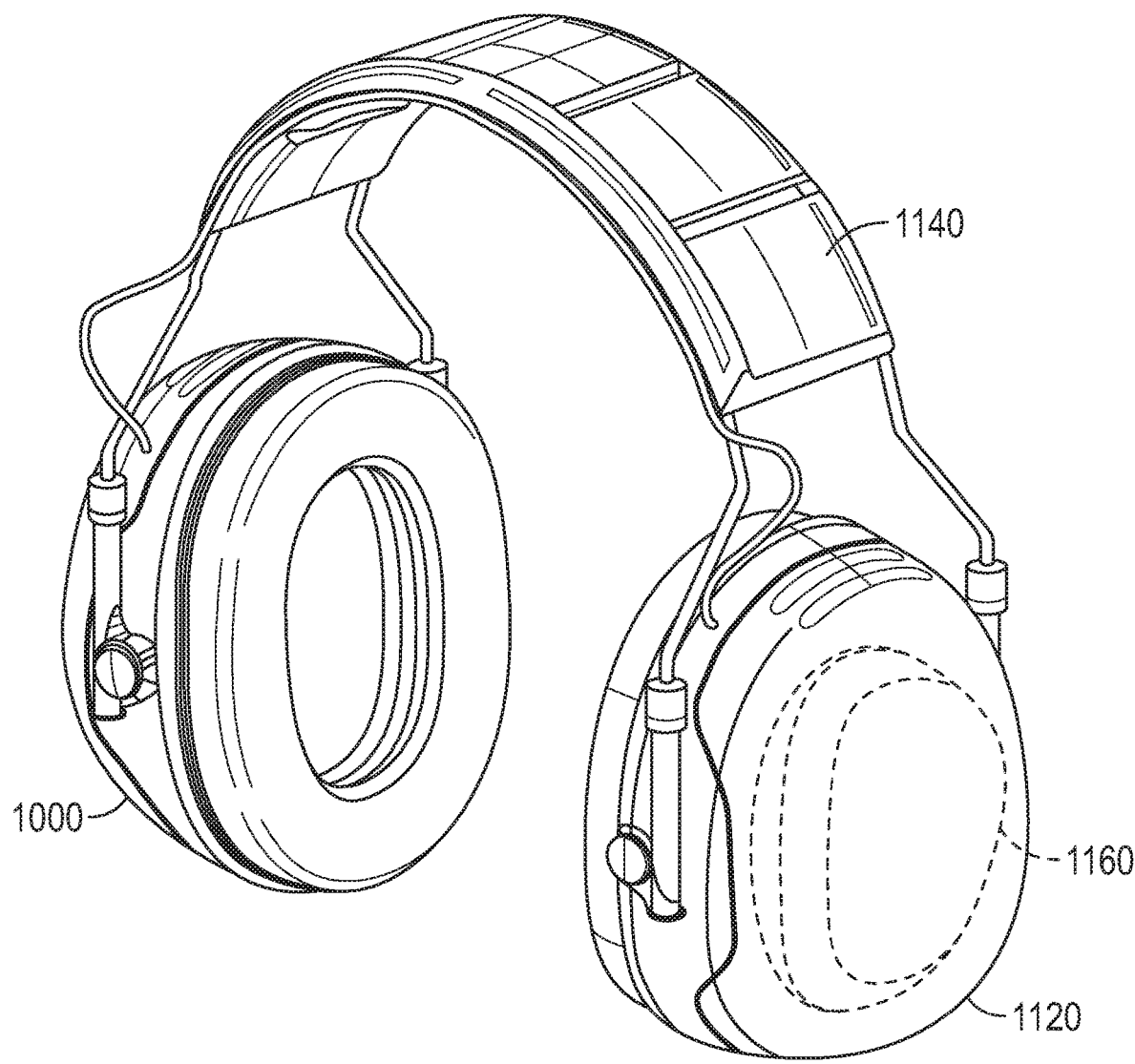
FIG. 12 is a perspective view of an exemplary earmuff according to the present disclosure.

Useful acoustic earmuffs include those that comprise (a) a connecting band having opposing first and second ends; and (b) a pair of earmuff cup assemblies connected to the opposing first and second ends of the connecting band, each earmuff cup assembly comprising at least one of the above-described foam compositions as sound barriers (and thus serving as a casing for the sound barrier). The connecting band can be, for example, a generally U-shaped band made of a flexible and/or resilient material (for example, two resilient wires held in substantially parallel alignment by a strip of flexible material such as a rubber or a plastic). The earmuff cup assembly can comprise, for example, an earcup (for example, a rigid earcup), the sound barrier, and, optionally, an earmuff cushion (for example, a polymer foam) and/or an earmuff cup liner (for example, an open celled polymer foam). The earmuff cup assemblies can be attached to the connecting band in essentially any desired manner. For instance, referring to FIG. 12, an exemplary earmuff includes a second protective muff 1120 connected to a first protective muff 1000 by a bridging portion 1140. The second protective muff 1120 is illustrated to house at least a portion of the foam composition 1160 contained in the earmuff.

Other hearing protection articles (for example, acoustic earplugs suitable for insertion in the human ear) and other types or designs of acoustic earmuffs also can be used in carrying out the process. The sound barrier can be directly or indirectly attached to or suspended within the casing of the hearing protection article by essentially any known or hereafter-developed method (for example, use of adhesives, mechanical fasteners, form-fitting, and/or the like) that does not unacceptably disrupt or alter the substantial periodicity of the sound barrier or its acoustical characteristics.

The hearing protection article can be used in the hearing protection or sound insulation process of the invention by interposing or placing the hearing protection device between an acoustic source (preferably, a source of audible acoustic frequencies) and an acoustic receiver in the form of a human ear (a receiver of audible acoustic frequencies; preferably, in a manner such that the receiver is completely covered by the device). Useful acoustic sources include industrial noise, construction noise, recreational noise, music, and the like (preferably, noises or other sounds having an audible component; more preferably, noises or other sounds having a frequency component in the range of about 63 Hz to about 16 kHz). The hearing protection article can be positioned between the source and the receiver such that a major face of the sound barrier of the article intercepts and thereby attenuates sound waves passing from the source to the receiver. In certain embodiments, the hearing protection article is used as an acoustic absorber.

Those skilled in the art will be familiar with a variety of ways in which such articles can be so positioned. Normal incidence of the sound waves (relative to a major face of the sound barrier of the device) is generally preferred, although field incidence conditions (random orientation) can also provide reasonably effective acoustical attenuation (for example, with increases of no more than about 5 dB in transmission, relative to normal incidence conditions, when a one-dimensional, multi-layer sound barrier is utilized).

The hearing protection process and article of the present disclosure can be used to achieve transmission loss across a relatively large portion of the audible range (with preferred embodiments providing a transmission loss that across the range of about 20 Hz to about 20 kHz. Such transmission losses can be achieved while maintaining phononic crystal structure dimensions on the order of centimeters or less (preferably, less than or equal to about 20 cm; more preferably, on the order of millimeters or less; most preferably, on the order of about 1 to about 3 mm). In select embodiments, the hearing protection article provides a transmission loss that is greater than or equal to 10 dB across the range of 0.1 k Hz to 10 kHz and has all dimensions less than or equal to 20 cm in size. The material stiffness, density and porosity of at least certain embodiments of the hearing protection article according to the present disclosure are useful for one or more hearing protection applications.

Various embodiments are provided that include foam compositions, articles, and methods of making and using same.

Embodiment 1 is a composite particle. The composite particle includes a chemical blowing agent particle encapsulated within a shell including an uncrosslinked thermoplastic material. The uncrosslinked thermoplastic material exhibits a complex viscosity of 3,700 Pascal seconds (Pa·s) or greater at a decomposition temperature of the chemical blowing agent particle.

Embodiment 2 is the composite particle of embodiment 1, wherein the chemical blowing agent is selected from a diazocompound, a sulfonyl hydrazide, a tetrazole, a nitrosocompound, an acyl sulfonyl hydrazide, hydrazones, thiatriazoles, azides, sulfonyl azides, oxalates, thiatrizene dioxides, isatoic anhydride, or combinations thereof.

Embodiment 3 is the composite particle of embodiment 1 or embodiment 2, wherein the chemical blowing agent is 1,1-azodicarboxamide, p-toluene sulfonyl hydrazide, or 5H-phenyl tetrazole.

Embodiment 4 is the composite particle of any of embodiments 1 to 3, wherein the chemical blowing agent is 1,1-azodicarboxamide.

Embodiment 5 is the composite particle of any of embodiments 1 to 3, wherein the chemical blowing agent is p-toluene sulfonyl hydrazide.

Embodiment 6 is the composite particle of any of embodiments 1 to 5, wherein the uncrosslinked thermoplastic material is selected from a starch, polyvinyl pyrollidinone (PVP), a copolymer of vinylpyrrolidone and vinyl acetate, a polypropylene-based elastomer, a styrene-isoprene-styrene copolymer, a (C1-C3)alkyl cellulose, a hydroxyl (C1-C3) alkylcellulose; carboxy methylcellulose, sodium carboxymethyl cellulose, a polyoxazoline, a silicone-based thermoplastic polymer, an olefin-based thermoplastic polymer, a phenoxy resin, a polyamide, or combinations thereof.

Embodiment 7 is the composite particle of any of embodiments 1 to 6, wherein the uncrosslinked thermoplastic material is selected from hydroxylated starch, carboxylated starch, methyl cellulose, propyl cellulose, ethyl cellulose, hypromellose, hydroxypropylmethyl cellulose, hydroxypropyl cellulose, hydroxyethyl cellulose, or combinations thereof.

Embodiment 8 is the composite particle of any of embodiments 1 to 7, wherein the uncrosslinked thermoplastic material is selected from hydroxypropyl starch, PVP, polyamide, or a combination thereof.

Embodiment 9 is the composite particle of any of embodiments 1 to 8, wherein the uncrosslinked thermoplastic material includes hydroxypropyl starch.

Embodiment 10 is the composite particle of any of embodiments 1 to 9, wherein the uncrosslinked thermoplastic material exhibits a complex viscosity of 5,000 Pa·s or greater at a decomposition temperature of the chemical blowing agent particle.

Embodiment 11 is the composite particle of any of embodiments 1 to 10, wherein the uncrosslinked thermoplastic material exhibits a complex viscosity of 6,000 Pa·s or greater at a decomposition temperature of the chemical blowing agent particle.

Embodiment 12 is the composite particle of any of embodiments 1 to 11, wherein the composite particle has a diameter of 1 to 60 micrometers, inclusive.

Embodiment 13 is a composition. The composition includes an uncrosslinked thermoplastic matrix material and a plurality of composite particles distributed in the uncrosslinked thermoplastic matrix material. The composition exhibits an elastic modulus of 0.5 megaPascals (MPa) or greater. The composite particles each include a chemical blowing agent particle encapsulated within a shell including an uncrosslinked thermoplastic material. The uncrosslinked thermoplastic material exhibits a complex viscosity of 3,700 Pa·s or greater at a decomposition temperature of the chemical blowing agent particle.

Embodiment 14 is the composition of embodiment 13, wherein the composition exhibits an elastic modulus of 1.0 MPa or greater.

Embodiment 15 is the composition of embodiment 13 or embodiment 14, wherein the uncrosslinked thermoplastic matrix material is selected from a polyorganosiloxane, a styrenic block copolymer, a polyolefin, a polyolefin copolymer, polyvinyl chloride (PVC), ethylene vinyl acetate, polyacrylate, polymethacrylate, an acrylate copolymer, and an acrylic block copolymer.

Embodiment 16 is the composition of any of embodiments 13 to 15, wherein the uncrosslinked thermoplastic matrix material includes a polyorganosiloxane.

Embodiment 17 is the composition of embodiment 13 or embodiment 14, wherein the uncrosslinked thermoplastic matrix material includes a polylactic acid (PLA). The composition further includes a polymer having a $T_g$ of 25 degrees Celsius or greater; a crosslinking agent; and a crosslink catalyst.

Embodiment 18 is the composition of embodiment 17, wherein the crosslink catalyst includes an alkyl or alkenyl ammonium, phosphonium, or imidazolium salt.

Embodiment 19 is the composition of embodiment 17 or embodiment 18, further including a plasticizer.

Embodiment 20 is the composition of any of embodiments 13 to 19, further including a crystallization nucleating agent, an antiblock additive, a cell stabilizer, a surfactant, or a combination thereof.

Embodiment 21 is the composition of any of embodiments 13 to 20, wherein the plurality of composite particles is present in an amount of 0.5 to 20 wt. %, inclusive, of the total composition.

Embodiment 22 is the composition of any of embodiments 13 to 21, wherein the plurality of composite particles is present in an amount of 10 to 17 wt. %, inclusive, of the total composition.

Embodiment 23 is the composition of any of embodiments 13 to 22, wherein the chemical blowing agent is selected from a diazocompound, a sulfonyl hydrazide, a tetrazole, a nitrosocompound, an acyl sulfonyl hydrazide, hydrazones, thiatriazoles, azides, sulfonyl azides, oxalates, thiatrizene dioxides, isatoic anhydride, or combinations thereof.

Embodiment 24 is the composition of any of embodiments 13 to 23, wherein the chemical blowing agent is 1,1-azodicarboxamide, p-toluene sulfonyl hydrazide, or 5H-phenyl tetrazole.

Embodiment 25 is the composition of any of embodiments 13 to 24, wherein the chemical blowing agent is 1,1-azodicarboxamide.

Embodiment 26 is the composition of any of embodiments 13 to 25, wherein the chemical blowing agent is p-toluene sulfonyl hydrazide.

Embodiment 27 is the composition of any of embodiments 13 to 26, wherein the uncrosslinked thermoplastic material is selected from a starch, polyvinyl pyrollidinone (PVP), a copolymer of vinylpyrrolidone and vinyl acetate, a polypropylene-based elastomer, a styrene-isoprene-styrene copolymer, a (C1-C3)alkyl cellulose, a hydroxyl (C1-C3) alkylcellulose, carboxy methylcellulose, sodium carboxymethyl cellulose, a polyoxazoline, a silicone-based thermoplastic polymer, an olefin-based thermoplastic polymer, a phenoxy resin, a polyamide, or combinations thereof.

Embodiment 28 is the composition of any of embodiments 13 to 27, wherein the uncrosslinked thermoplastic material is selected from hydroxylated starch, carboxylated starch, methyl cellulose, propyl cellulose, ethyl cellulose, hypromellose, hydroxypropylmethyl cellulose, hydroxypropyl cellulose, hydroxyethyl cellulose, or combinations thereof.

Embodiment 29 is the composition of any of embodiments 13 to 28, wherein the uncrosslinked thermoplastic material is selected from hydroxypropyl starch, PVP, a polyamide, a styrenic copolymer, or a combination thereof.

Embodiment 30 is the composition of any of embodiments 13 to 29, wherein the uncrosslinked thermoplastic material includes hydroxypropyl starch.

Embodiment 31 is the composition of any of embodiments 13 to 30, wherein the uncrosslinked thermoplastic material exhibits a complex viscosity of 5,000 Pa·s or greater at a decomposition temperature of the chemical blowing agent particle.

Embodiment 32 is the composition of any of embodiments 13 to 31, wherein the uncrosslinked thermoplastic material exhibits a complex viscosity of 6,000 Pa·s or greater at a decomposition temperature of the chemical blowing agent particle.

Embodiment 33 is the composition of any of embodiments 13 to 32, wherein the composite particle has a diameter of 1 to 60 micrometers, inclusive.

Embodiment 34 is a foam composition. The foam composition includes a closed cell foam thermoplastic matrix material and a plurality of composite particles distributed in the closed cell foam thermoplastic matrix material. The composite particles each include a chemical blowing agent particle encapsulated within a shell including an uncrosslinked thermoplastic material. The uncrosslinked thermoplastic material exhibits a complex viscosity of 3,700 Pa·s or greater at a decomposition temperature of the chemical blowing agent particle.

Embodiment 35 is the foam composition of embodiment 34, including 90% or greater closed cells.

Embodiment 36 is the foam composition of embodiment 34 or embodiment 35, including 95% or greater closed cells.

Embodiment 37 is the foam composition of any of embodiments 34 to 36, having 98% or greater closed cells.

Embodiment 38 is the foam composition of any of embodiments 34 to 37, having an average cell homogeneity of 3.0 or greater.

Embodiment 39 is the foam composition of any of embodiments 34 to 38, having an average cell homogeneity of 7.0 or greater.

Embodiment 40 is the foam composition of any of embodiments 34 to 39, having an average cell size of 350 micrometers or less.

Embodiment 41 is the foam composition of any of embodiments 34 to 40, having an average cell size of 250 micrometers or less.

Embodiment 42 is the foam composition of any of embodiments 34 to 41, having an average cell size of 150 micrometers or less.

Embodiment 43 is the foam composition of any of embodiments 34 to 42, having an average cell density of 11 cells per square millimeter or greater.

Embodiment 44 is the foam composition of any of embodiments 34 to 43, having an average cell density of 13 cells per square millimeter or greater.

Embodiment 45 is the foam composition of any of embodiments 34 to 44, having an average cell density of 15 cells per square millimeter or greater.

Embodiment 46 is the foam composition of any of embodiments 34 to 45, wherein the foam composition exhibits a maximum compressive force of 1,000 grams per square millimeter or less.

Embodiment 47 is the foam composition of any of embodiments 34 to 46, wherein the foam composition exhibits a maximum compressive force of 750 grams per square millimeter or less.

Embodiment 48 is the foam composition of any of embodiments 34 to 47, wherein the foam composition exhibits a maximum compressive force of 500 grams per square millimeter or less.

Embodiment 49 is the foam composition of any of embodiments 34 to 48, wherein the chemical blowing agent is selected from a diazocompound, a sulfonyl hydrazide, a tetrazole, a nitrosocompound, an acyl sulfonyl hydrazide, hydrazones, thiatriazoles, azides, sulfonyl azides, oxalates, thiatrizene dioxides, isatoic anhydride, or combinations thereof.

Embodiment 50 is the foam composition of any of embodiments 34 to 49, wherein the chemical blowing agent is 1,1-azodicarboxamide, p-toluene sulfonyl hydrazide, or 5H-phenyl tetrazole.

Embodiment 51 is the foam composition of any of embodiments 34 to 50, wherein the chemical blowing agent is 1,1-azodicarboxamide.

Embodiment 52 is the foam composition of any of embodiments 34 to 51, wherein the chemical blowing agent is p-toluene sulfonyl hydrazide.

Embodiment 53 is the foam composition of any of embodiments 34 to 52, wherein the uncrosslinked thermoplastic material is selected from a starch, polyvinyl pyrollidinone (PVP), a copolymer of vinylpyrrolidone and vinyl acetate, a polypropylene-based elastomer, a styrene-isoprene-styrene copolymer, a (C1-C3)alkyl cellulose, a hydroxyl (C1-C3)alkylcellulose, carboxy methylcellulose, sodium carboxymethyl cellulose, a polyoxazoline, a silicone-based thermoplastic polymer, an olefin-based thermoplastic polymer, a phenoxy resin, a polyamide, or combinations thereof.

Embodiment 54 is the foam composition of any of embodiments 34 to 53, wherein the uncrosslinked thermoplastic material is selected from hydroxylated starch, carboxylated starch, methyl cellulose, propyl cellulose, ethyl cellulose, hypromellose, hydroxypropylmethyl cellulose, hydroxypropyl cellulose, hydroxyethyl cellulose, or combinations thereof.

Embodiment 55 is the foam composition of any of embodiments 34 to 54, wherein the uncrosslinked thermoplastic material is selected from hydroxypropyl starch, PVP, a polyamide, a styrenic copolymer, or a combination thereof.

Embodiment 56 is the foam composition of any of embodiments 34 to 55, wherein the uncrosslinked thermoplastic material includes hydroxypropyl starch.

Embodiment 57 is the foam composition of any of embodiments 34 to 56, wherein the uncrosslinked thermoplastic material exhibits a complex viscosity of 5,000 Pa·s or greater at a decomposition temperature of the chemical blowing agent particle.

Embodiment 58 is the foam composition of any of embodiments 34 to 57, wherein the uncrosslinked thermoplastic material exhibits a complex viscosity of 6,000 Pa-s or greater at a decomposition temperature of the chemical blowing agent particle.

Embodiment 59 is the foam composition of any of embodiments 34 to 58, wherein the composite particle has a diameter of 1 to 60 micrometers, inclusive.

Embodiment 60 is the foam composition of any of embodiments 34 to 59, wherein the composition exhibits an elastic modulus of 1.0 MPa or greater.

Embodiment 61 is the foam composition of any of embodiments 34 to 60, wherein the thermoplastic matrix material is selected from a polyorganosiloxane, a styrenic block copolymer, a polyolefin, a polyolefin copolymer, polyvinyl chloride (PVC), ethylene vinyl acetate, and an acrylic block copolymer.

Embodiment 62 is the foam composition of any of embodiments 34 to 61, wherein the thermoplastic matrix material includes a polyorganosiloxane.

Embodiment 63 is the foam composition of any of embodiments 34 to 60, wherein the thermoplastic matrix material includes a polylactic acid (PLA) and the composition further includes:
 a polymer having a $T_g$ of 25 degrees Celsius or greater;
 a crosslinking agent; and
 a crosslink catalyst.

Embodiment 64 is the foam composition of embodiment 63, wherein the crosslink catalyst includes an alkyl or alkenyl ammonium, phosphonium, or imidazolium salt.

Embodiment 65 is the foam composition of embodiment 63 or embodiment 64, further including a plasticizer.

Embodiment 66 is the foam composition of any of embodiments 34 to 65, further including a crystallization nucleating agent, an antiblock additive, a cell stabilizer, a surfactant, or a combination thereof.

Embodiment 67 is the foam composition of any of embodiments 34 to 66, wherein the plurality of composite particles is present in an amount of 0.05 to 10 wt. %, inclusive, of the total composition.

Embodiment 68 is the foam composition of any of embodiments 34 to 67, wherein the plurality of composite particles is present in an amount of 0.05 to 2.5 wt. %, inclusive, of the total composition.

Embodiment 69 is a foam sheet. The foam sheet includes the foam composition of any of embodiments 34 to 68.

Embodiment 70 is a hearing protection article. The hearing protection article includes the foam composition of any of embodiments 34 to 68.

Embodiment 71 is the hearing protection article of embodiment 70, wherein the article includes an earplug.

Embodiment 72 is the hearing protection article of embodiment 70, wherein the article includes an earmuff Embodiment 73 is a tape. The tape includes a substrate and a foam composition according to any of embodiments 34 to 68 disposed on the substrate.

Embodiment 74 is a method of making a foam composition is provided. The method includes compressing a mixture and heating the compressed mixture, thereby forming the foam composition. The mixture includes an uncrosslinked thermoplastic matrix material and a plurality of composite particles distributed in the uncrosslinked thermoplastic matrix material. The mixture exhibits an elastic modulus of 0.5 megaPascals (MPa) or greater. The composite particles each include a chemical blowing agent particle encapsulated within a shell including an uncrosslinked thermoplastic material. The uncrosslinked thermoplastic material exhibits a complex viscosity of 3,700 Pa·s or greater at a decomposition temperature of the chemical blowing agent particle.

Embodiment 75 is the method of embodiment 74, wherein the mixture includes a plurality of pellets.

Embodiment 76 is the method of embodiment 74 or embodiment 75, wherein the mixture is compressed in a melt press.

Embodiment 77 is the method of any of embodiments 74 to 76, wherein the compressed mixture is heated in a mold.

Embodiment 78 is the method of any of embodiments 74 to 76, wherein the compressed mixture is heated in an oven.

Embodiment 79 is the method of any of embodiments 74 to 76, wherein the compressed mixture is heated at ambient pressure.

Embodiment 80 is the method of embodiment 74 or embodiment 75, wherein the mixture is compressed in an extruder.

Embodiment 81 is the method of embodiment 80, wherein the compressed mixture is heated in the extruder.

Embodiment 82 is the method of any of embodiments 74 to 81, wherein the compressed mixture is heated at a temperature ranging from 130 to 250 degrees Celsius, inclusive.

Embodiment 83 is a method of making a foam composition. The method includes casting a mixture in a mold and heating the cast mixture, thereby forming the foam composition. The mixture includes an uncrosslinked thermoplastic matrix material and a plurality of composite particles distributed in the uncrosslinked thermoplastic matrix material. The mixture exhibits an elastic modulus of 0.5 megaPascals (MPa) or greater. The composite particles each include a chemical blowing agent particle encapsulated within a shell including an uncrosslinked thermoplastic material. The uncrosslinked thermoplastic material exhibits a complex viscosity of 3,700 Pa·s or greater at a decomposition temperature of the chemical blowing agent particle.

Embodiment 84 is the method of any of embodiments 74 to 83, wherein the chemical blowing agent is selected from a diazocompound, a sulfonyl hydrazide, a tetrazole, a nitrosocompound, an acyl sulfonyl hydrazide, hydrazones, thiatriazoles, azides, sulfonyl azides, oxalates, thiatrizene dioxides, isatoic anhydride, or combinations thereof.

Embodiment 85 is the method of any of embodiments 74 to 84, wherein the chemical blowing agent is 1,1-azodicarboxamide, p-toluene sulfonyl hydrazide, or 5H-phenyl tetrazole.

Embodiment 86 is the method of any of embodiments 74 to 85, wherein the chemical blowing agent is 1,1-azodicarboxamide.

Embodiment 87 is the method of any of embodiments 74 to 86, wherein the chemical blowing agent is p-toluene sulfonyl hydrazide.

Embodiment 88 is the method of any of embodiments 74 to 87, wherein the uncrosslinked thermoplastic material is selected from a starch, polyvinyl pyrollidinone (PVP), a copolymer of vinylpyrrolidone and vinyl acetate, a polypropylene-based elastomer, a styrene-isoprene-styrene copolymer, a (C1-C3)alkyl cellulose, a hydroxyl (C1-C3)alkylcellulose, carboxy methylcellulose, sodium carboxymethyl cellulose, a polyoxazoline, a silicone-based thermoplastic polymer, an olefin-based thermoplastic polymer, a phenoxy resin, a polyamide, or combinations thereof.

Embodiment 89 is the method of any of embodiments 74 to 88, wherein the uncrosslinked thermoplastic material is selected from hydroxylated starch, carboxylated starch, methyl cellulose, propyl cellulose, ethyl cellulose, hypromellose, hydroxypropylmethyl cellulose, hydroxypropyl cellulose, hydroxyethyl cellulose, or combinations thereof.

Embodiment 90 is the method of any of embodiments 74 to 89, wherein the uncrosslinked thermoplastic material is selected from hydroxypropyl starch, PVP, a polyamide, a styrenic copolymer, or a combination thereof.

Embodiment 91 is the method of any of embodiments 74 to 90, wherein the uncrosslinked thermoplastic material includes hydroxypropyl starch.

Embodiment 92 is the method of any of embodiments 74 to 91, wherein the uncrosslinked thermoplastic material exhibits a complex viscosity of 5,000 Pa·s or greater at a decomposition temperature of the chemical blowing agent particle.

Embodiment 93 is the method of any of embodiments 74 to 92, wherein the uncrosslinked thermoplastic material exhibits a complex viscosity of 6,000 Pa·s or greater at a decomposition temperature of the chemical blowing agent particle.

Embodiment 94 is the method of any of embodiments 74 to 93, wherein the composite particle has a diameter of 1 to 60 micrometers, inclusive.

Embodiment 95 is the method of any of embodiments 74 to 94, wherein the mixture exhibits an elastic modulus of 1.0 MPa or greater.

Embodiment 96 is the method of any of embodiments 74 to 95, wherein the uncrosslinked thermoplastic matrix material is selected from a polyorganosiloxane, a styrenic block copolymer, a polyolefin, a polyolefin copolymer, polyvinyl chloride (PVC), ethylene vinyl acetate, and an acrylic block copolymer.

Embodiment 97 is the method of any of embodiments 74 to 96, wherein the uncrosslinked thermoplastic matrix material includes a polyorganosiloxane.

Embodiment 98 is the method of any of embodiments 74 to 95, wherein the uncrosslinked thermoplastic matrix material includes a polylactic acid (PLA). The mixture further includes a polymer having a $T_g$ of 25 degrees Celsius or greater; a crosslinking agent; and a crosslink catalyst.

Embodiment 99 is the method of embodiment 98, wherein the crosslink catalyst includes an alkyl or alkenyl ammonium, phosphonium, or imidazolium salt.

Embodiment 100 is the method of embodiment 98 or embodiment 99, wherein the mixture further includes a plasticizer.

Embodiment 101 is the method of any of embodiments 74 to 100, wherein the mixture further includes a crystallization nucleating agent, an antiblock additive, a cell stabilizer, a surfactant, or a combination thereof.

Embodiment 102 is the method of any of embodiments 74 to 101, wherein the plurality of composite particles is present in an amount of 0.5 to 20 wt. %, inclusive, of the total mixture.

Embodiment 103 is the method of any of embodiments 74 to 102, wherein the plurality of composite particles is present in an amount of 10 to 17 wt. %, inclusive, of the total mixture.

Embodiment 104 is the method of any of embodiments 74 to 103, wherein the foam composition includes a closed cell foam.

Embodiment 105 is the method of any of embodiments 74 to 104, wherein the foam composition has 90% or greater closed cells.

Embodiment 106 is the method of any of embodiments 74 to 105, wherein the foam composition has 95% or greater closed cells.

Embodiment 107 is the method of any of embodiments 74 to 106, wherein the foam composition has 98% or greater closed cells.

Embodiment 108 is the method of any of embodiments 74 to 107, wherein the foam composition has an average cell homogeneity of 3.0 or greater.

Embodiment 109 is the method of any of embodiments 74 to 108, wherein the foam composition has an average cell homogeneity of 7.0 or greater.

Embodiment 110 is the method of any of embodiments 74 to 109, wherein the foam composition has an average cell size of 350 micrometers or less.

Embodiment 111 is the method of any of embodiments 74 to 110, wherein the foam composition has an average cell size of 250 micrometers or less.

Embodiment 112 is the method of any of embodiments 74 to 111, wherein the foam composition has an average cell size of 150 micrometers or less.

Embodiment 113 is the method of any of embodiments 74 to 112, wherein the foam composition has an average cell density of 11 cells per square millimeter or greater.

Embodiment 114 is the method of any of embodiments 74 to 113, wherein the foam composition has an average cell density of 13 cells per square millimeter or greater.

Embodiment 115 is the method of any of embodiments 74 to 114, wherein the foam composition has an average cell density of 15 cells per square millimeter or greater.

Embodiment 116 is the method of any of embodiments 74 to 115, wherein the foam composition exhibits a maximum compressive force of 1,000 grams per square millimeter or less.

Embodiment 117 is the method of any of embodiments 74 to 116, wherein the foam composition exhibits a maximum compressive force of 750 grams per square millimeter or less.

Embodiment 118 is the method of any of embodiments 74 to 117, wherein the foam composition exhibits a maximum compressive force of 500 grams per square millimeter or less.

Embodiment 119 is a process. The process includes providing at least one hearing protection article according to the fifth aspect and interposing the hearing protection article between an acoustic source and an acoustic receiver in the form of a human ear.

Embodiment 120 is the process of embodiment 119, wherein the hearing protection article provides a transmission loss that is greater than or equal to 10 dB across the range of 0.1 k Hz to 10 kHz and has all dimensions less than or equal to 20 cm in size.

Embodiment 121 is the process of embodiment 119, wherein the hearing protection article is used as an acoustic absorber.

Embodiment 122 is the process of embodiment 119, wherein the hearing protection article further includes at least one casing that at least partially encloses the hearing protection article and is adapted for contact with the human ear.

Embodiment 123 is the composite particle of any of embodiments 1 to 12, further including a co-encapsulated metal oxide or metal salt, or combinations thereof.

Embodiment 124 is the composite particle of embodiment 123, wherein the metal oxide is selected from zinc oxide, calcium oxide, and barium-cadmium complex; and the metal salts are of the form $M(X)_2$, wherein M is selected from zinc, calcium, and barium-cadmium, and wherein X is an organic ligand containing a carboxylic acid moiety.

Embodiment 125 is the composite particle of embodiment 123 or embodiment 124 wherein the metal salt is zinc stearate, calcium stearate, barium-cadmium stearate, zinc 2-ethyl hexanoate, calcium 2-ethyl hexanoate, barium-cadmium 2-ethyl hexanoate, zinc acetate, calcium acetate, barium-cadmium acetate, zinc malonate, calcium malonate, barium-cadmium malonate, zinc benzoate, calcium benzoate, barium-cadmium benzoate, zinc salicylate, calcium salicylate, and barium-cadmium salicylate.

Embodiment 126 is the composite particle of any of embodiments 123 to 125, wherein the metal oxide, the metal salt, or combinations thereof, is present in an amount of 100 wt. % or less of the amount of the chemical blowing agent.

Embodiment 127 is the composite particle of any of embodiments 123 to 126, wherein the chemical blowing agent is 1,1-azodicarboxamide, p-toluene sulfonyl hydrazide, or 5H-phenyl tetrazole.

Embodiment 128 is the composite particle of any of embodiments 123 to 127, further including a co-encapsulated polyhydroxyl compound, an amine containing compound, or a carboxylic acid containing compound.

Embodiment 129 is the composite particle of embodiment 128, wherein the polyhydroxyl compound is selected from glycerol, ethylene glycol, diethylene glycol, triethylene glycol, or combinations thereof.

Embodiment 130 is the composite particle of embodiment 128 or embodiment 129, wherein the carboxylic acid containing compound is selected from stearic acid, 2-ethylhexanoic acid, acetic acid, palmitic acid, or combinations thereof.

Embodiment 131 is the composite particle of any of embodiments 128 to 130, wherein the amine containing compound is a primary amine.

Embodiment 132 is the composite particle of any of embodiments 128 to 131, wherein the chemical blowing agent is p-toluene sulfonyl hydrazide.

Embodiment 133 is the composition of any of embodiments 13 to 32, wherein the plurality of composite particles each further include a co-encapsulated metal oxide or metal salt, or mixtures thereof.

Embodiment 134 is the composition of embodiment 133, wherein the metal oxide is selected from zinc oxide, calcium oxide, and barium-cadmium complex; and the metal salts are of the form $M(X)_2$, wherein M is selected from zinc, calcium, and barium-cadmium, and wherein X is an organic ligand containing a carboxylic acid moiety.

Embodiment 135 is the composition of embodiment 133 or embodiment 134, wherein the metal salt is zinc stearate, calcium stearate, barium-cadmium stearate, zinc 2-ethyl hexanoate, calcium 2-ethyl hexanoate, barium-cadmium 2-ethyl hexanoate, zinc acetate, calcium acetate, barium-cadmium acetate, zinc malonate, calcium malonate, barium-cadmium malonate, zinc benzoate, calcium benzoate, barium-cadmium benzoate, zinc salicylate, calcium salicylate, or barium-cadmium salicylate.

Embodiment 136 is the composition of any of embodiments 133 to 135, wherein the metal oxide, the metal salt, or combinations thereof, is present in an amount of 100 wt. % or less of the amount of the chemical blowing agent.

Embodiment 137 is the composition of any of embodiments 133 to 136, wherein the chemical blowing agent is 1,1-azodicarboxamide or p-toluene sulfonyl hydrazide.

Embodiment 138 is the composition of any of embodiments 133 to 137, wherein the plurality of composite particles each further include a co-encapsulated polyhydroxyl compound, an amine containing compound, or a carboxylic acid containing compound.

Embodiment 139 is the composition of embodiment 138, wherein the polyhydroxyl compound is selected from glycerol, ethylene glycol, diethylene glycol, triethylene glycol, or combinations thereof.

Embodiment 140 is the composition of embodiment 138 or embodiment 139, wherein the carboxylic acid containing compound is selected from stearic acid, 2-ethylhexanoic acid, acetic acid, palmitic acid, or combinations thereof.

Embodiment 141 is the composition of any of embodiments 138 to 140, wherein the amine containing compound is a primary amine.

Embodiment 142 is the composition of any of embodiments 138 to 141, wherein the chemical blowing agent is p-toluene sulfonyl hydrazide.

Embodiment 143 is the foam composition of any of embodiments 34 to 68, wherein the plurality of composite particles each further include a co-encapsulated metal oxide or metal salt, or mixtures thereof.

Embodiment 144 is the foam composition of embodiment 143, wherein the metal oxide is selected from zinc oxide, calcium oxide, and barium-cadmium complex; and the metal salts are of the form $M(X)_2$, wherein M is selected from zinc, calcium, and barium-cadmium, and wherein X is an organic ligand containing a carboxylic acid moiety.

Embodiment 145 is the foam composition of embodiment 143 or embodiment 144, wherein the metal salt is zinc stearate, calcium stearate, barium-cadmium stearate, zinc 2-ethyl hexanoate, calcium 2-ethyl hexanoate, barium-cadmium 2-ethyl hexanoate, zinc acetate, calcium acetate, barium-cadmium acetate, zinc malonate, calcium malonate, barium-cadmium malonate, zinc benzoate, calcium benzoate, barium-cadmium benzoate, zinc salicylate, calcium salicylate, or barium-cadmium salicylate.

Embodiment 146 is the foam composition of any of embodiments 143 to 145, wherein the metal oxide, the metal salt, or combinations thereof, is present in an amount of 100 wt. % or less of the amount of the chemical blowing agent.

Embodiment 147 is the foam composition of any of embodiments 143 to 146, wherein the chemical blowing agent is 1,1-azodicarboxamide, p-toluene sulfonyl hydrazide, or 5H-phenyl tetrazole.

Embodiment 148 is the foam composition of any of embodiments 143 to 147, wherein the plurality of composite particles each further include a co-encapsulated polyhydroxyl compound, an amine containing compound, or a carboxylic acid containing compound.

Embodiment 149 is the foam composition of embodiment 148, wherein the polyhydroxyl compound is selected from glycerol, ethylene glycol, diethylene glycol, triethylene glycol, or combinations thereof.

Embodiment 150 is the foam composition of embodiment 148 or embodiment 149, wherein the carboxylic acid containing compound is selected from stearic acid, 2-ethylhexanoic acid, acetic acid, palmitic acid, or combinations thereof.

Embodiment 151 is the foam composition of any of embodiments 148 to 150, wherein the amine containing compound is a primary amine.

Embodiment 152 is the foam composition of any of embodiments 148 to 151, wherein the chemical blowing agent is p-toluene sulfonyl hydrazide.

Embodiment 153 is the method of any of embodiments 74 to 125, wherein the plurality of composite particles each further include a co-encapsulated metal oxide or metal salt, or mixtures thereof.

Embodiment 154 is the method of embodiment 153, wherein the metal oxide is selected from zinc oxide, calcium oxide, and barium-cadmium complex; and the metal salts are of the form $M(X)_2$, wherein M is selected from zinc, calcium, and barium-cadmium, and wherein X is an organic ligand containing a carboxylic acid moiety.

Embodiment 155 is the method of embodiment 153 or embodiment 154, wherein the metal salt is zinc stearate, calcium stearate, barium-cadmium stearate, zinc 2-ethyl hexanoate, calcium 2-ethyl hexanoate, barium-cadmium 2-ethyl hexanoate, zinc acetate, calcium acetate, barium-cadmium acetate, zinc malonate, calcium malonate, barium-cadmium malonate, zinc benzoate, calcium benzoate, barium-cadmium benzoate, zinc salicylate, calcium salicylate, or barium-cadmium salicylate.

Embodiment 156 is the method of any of embodiments 153 to 155, wherein the metal oxide, the metal salt, or combinations thereof, is present in an amount of 100 wt. % or less of the amount of the chemical blowing agent.

Embodiment 157 is the foam composition of any of embodiments 153 to 156, wherein the chemical blowing agent is 1,1-azodicarboxamide or p-toluene sulfonyl hydrazide.

Embodiment 158 is the method of any of embodiments 153 to 157, wherein the plurality of composite particles each further include a co-encapsulated polyhydroxyl compound, an amine containing compound, or a carboxylic acid containing compound.

Embodiment 159 is the method of embodiment 158, wherein the polyhydroxyl compound is selected from glycerol, ethylene glycol, diethylene glycol, triethylene glycol, or combinations thereof.

Embodiment 160 is the method of embodiment 158 or embodiment 159, wherein the carboxylic acid containing compound is selected from stearic acid, 2-ethylhexanoic acid, acetic acid, palmitic acid, or combinations thereof.

Embodiment 161 is the method of any of embodiments 158 to 160, wherein the amine containing compound is a primary amine.

Embodiment 162 is the method of any of embodiments 158 to 161, wherein the chemical blowing agent is p-toluene sulfonyl hydrazide.

The following Examples are set forth to describe additional features and embodiments of the invention. All parts are by weight unless otherwise indicated.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims. Unless otherwise noted, amounts of material are listed by weight, or by weight percent ("wt-%").

TABLE 1

Materials List

| Material | Description | Source |
| --- | --- | --- |
| I4032D PLA | Semicrystalline polylactic acid (PLA) (2 wt.-% D-lactide; weight average molecular weight weight ≈ 200,000 g/mol); obtained under the trade designation INGEO 4032D | Natureworks, LLC (Minnetonka, MN, USA) |
| I4060 PLA | Amorphous polylactic acid (PLA) obtained under the trade designation INGEO 4060 | Natureworks, LLC (Minnetonka, MN, USA) |
| VK70 PVAc | Polyvinyl acetate (PVAc) ($T_g$ = 42° C.; weight average molecular weight ≈ 400,000 g/mol); obatined under the trade designation VINAVIL K70 | Vinavil (Milan, Italy) |
| CA4 Plasticizer | Acetyl tributyl citrate, a plasticizer obtained under the trade designation CITROFLEX A4 | Vertellus Performance Materials (Bayonne, NJ, USA) |
| ECO Nuc. Agent | Zinc phenylphosphonate, a crystallization nucleation agent obtained under the trade designation ECOPROMOTE | Nissan Chemical Industrials, Ltd (Tokyo, Japan) |
| S511 | Slip/antiblock additive in PLA masterbatch obtained under the trade designation SUKANO S511 | Sukano (Schindellegi, Switzerland) |
| AZO | 1,1-Azodicarbamide, a chemical blowing agent | Sigma-Aldrich (St. Louis, MO, USA) |
| PTSH | Para-toluenesulfonyl hydrazide, a chemical blowing agents | Sigma-Aldrich (St. Louis, MO, USA) |
| IA | Isatoic anhydride, a chemical blowing agent | Sigma-Aldrich (St. Louis, MO, USA) |
| PT | 5-Phenyltetrazole, a chemical blowing agent | TCI chemicals (Portland, OR, USA) |
| E930 | Thermally expandable microspheres obtained under the trade designation EXPANCEL 930DU120 | Akzo Nobel (Duluth, GA) |
| DCP | Dicumyl peroxide, a crosslinking agent | Simga-Aldrich (St. Louis, MO, USA) |
| J4368 | Crosslinking agent obtained under the trade designation JONCRYL ADR 4368 | BASF (Ludwigshafen, Germany) |
| DTMAB | Dodecyltrimethylammonium bromide, a crosslinking catalyst | TCI chemicals (Portland, OR, USA) |
| TOAB | Tetraoctylammonium bromide, a crosslinking catalyst | Alfa Aesar (Haverhill, MA, USA) |
| CTAB | Cetyltrimethylammonium bromide, a crosslinking catalyst | EMD Millipore Corp (Billerica, MA, USA) |
| Erucamide | Cell stabilizing agent (erucamide) obtained under the trade designation CRODAMIDE ER | Croda Polymer Additives (Goole, UK) |

TABLE 1-continued

Materials List

| Material | Description | Source |
|---|---|---|
| talc | Magnesium silicate monohydrate, a cell nucleating agent | Alfa Aesar (Haverhill, MA, USA) |
| PVP K30 | Polyvinyl pyrrollidone K30 | TCI chemicals (Portland, OR, USA) |
| LRS780 | Hydroxypropyl starch obtained under the trade designation LYCOAT RS780 | Roquette Freres (Lestrem, France) |
| M310 | Anionic polyamide dispersion obatined under the trade designation MICHEM EMULSION D310 | Michelman, Inc. (Cincinnati, Ohio, USA |
| LDPE | Low density polyethylene wax dispersion obtained under the trade designation SYNCERA LD7410 | Paramelt (Heerhugowaard, The Netherlands) |
| V989 | High Tg acrylic emulsion obtained under the trade designation VANCRYL 989 | Allnex (Frankfurt, Germany) |
| EDA | Ethylene diamine | Sigma-Aldrich (St. Louis, MO, USA) |
| EVA360 | Ethylene vinyl acetate (EVA) ($T_m$ = 78° C.; melt flow rate (190° C./2.17 kg) – 2 g/10 min); obtained under the trade designation ELVAX 360 | Dupont Company (Wilmington, DE, USA) |
| D3140 | Styrene-isoprene-styrene 5 to 8 arm star block copolymer | Kraton (Houston, TX, USA) |
| H5127 | Thermoplastic rubber with a high vinyl content obtained under the trade designation HYBRAR 5127 | Kurarary America (Houston, TX, USA) |
| D1119 | Clear, linear triblock copolymer SIS with styrene content of 22% | Kraton (Houston, TX, USA) |
| D1113 | Clear, linear triblock copolymer SIS with 16% styrene | Kraton (Houston, TX, USA) |
| Mineral oil | Mineral oil | Swan (Smyrna, TN, USA) |
| nZnO | Zinc Oxide nanoparticles (ZnO, 99.8%, 10-30 nm), modulator of blowing agent decomposition temperature | SkySpring Nanomaterials (Houston, TX, USA) |
| $Zn(OAc)_2$ | Zinc acetate (anhydrous, 99.98%), granular, modulator of blowing agent decomposition | Alfa Aesar (Haverhill, MA, USA) |
| $Cd(OAc)_2$ | Cadmium acetate (anhydrous), modulator of blowing agent decomposition | Strem Chemicals (Newburyport, MA, USA) |
| Urea | Modulator of blowing agent decomposition | Alfa Aesar (Haverhill, MA, USA) |

Test Methods

Scanning Electron Microscropy (SEM)

The cell structure of the flexible PLA foams was imaged by SEM using a JEOL JSM-6010LA SEM (JEOL Ltd., Tokyo, JP). Samples were prepared by cooling the foam with dry ice, then using a #10 scalpel to cut a thin slice of the PLA foamed article. The slice was mounted on a JEOL SEM stage and sputter coated with Au/Pd for 30 seconds in a Denton Vacuum Desk V coating system (Denton Vacuum, LLC, Moorestown, N.J.). The images were analyzed using Image-Pro Premier 9.1 image analysis software (Media Cybernetics, Inc., Rockfille, Md.) to obtain average cell diameter, and cell density (cells/mm$^2$).

cell homogeneity=1/σ where σ is the standard deviation of the average cell diameter in units of inverse millimeters.

Dynamic Mechanical Analysis

A sheet of polymer or blend of polymers, previously pressed to a height of 1 mm in a Carver press (Carver, Inc., Wabash, Ind., model #2699) between two aluminum sheets with polytetrafluoroethylene liners, was cut into 10 mm×6 mm strips and placed in a DMA (Q800, TA Instruments, New Castle, Del.). The chamber was equilibrated to −30° C., then the temperature was raised at 5° C./min to 70° C. During the heating step, the sample was subjected to cyclic tension at a frequency of 1 Hz.

Complex Viscosity Measurements

Complex viscosity was measured using a Discovery HR-2 stress controlled rheometer by TA Instruments (New Castle, Del.), using 25-mm diameter parallel plates. The samples were loaded onto the plates at 100° C., filling the plates to a gap of approximately 1 mm. The samples were heated from 100° C. to 250° C. at a rate of 5° C./min. During the heating step, the samples were subjected to rotational shear oscillations at a frequency of 1 Hz and an initial strain amplitude of 0.025%. The strain amplitude was allowed to adjust automatically between a range of 0.001% strain and 10% strain, in order to maintain the rheometer torque in the range of 0.1 g·cm to 20 g·cm.

Cyclic Compression

Cyclic compression measurements were conducted with a 6 mm spherical probe on a TA XT Plus Texture Analyzer. Foam samples with dimensions of 4 inch by 2 inch by 0.25 inch (10.16 cm by 5.08 cm by 0.64 cm) were prepared in aluminum molds using methods described below. These samples were then compressed along the small dimension using the described method in the Texture Analyzer. Three locations were tested at equivalent positions in each sample. Each location was tested three times with 5 hysteresis cycles of 50% strain. These data were averaged and the standard deviation was taken.

Sample Preparation

Preparation of Polymer Prefoam Resins

Polymer resins were compounded in a Brabender twin-screw mixer (C. W. Brabender Instruments, Inc., South Hackensack, N.J., model ATR Plasti-Corder) at 110° C. and 100 revolutions per minute (RPM) by mixing polymer resins with crosslinking agents and/or chemical blowing agent and/or crosslinking catalysts and/or cell stabilizers and/or nucleating agents.

Preparation of Polymer Prefoam Sheets

Compounded prefoam resins were pressed between two aluminum sheets with polytetrafluoroethylene liners and one 1 mm shim in a Carver press (Carver, Inc., Wabash, Ind., model #2699). The Carver press was set to 265° F. (129° C.). The resin was allowed to soften for 3 minutes (min) and then pressed at 6 metric tons for 1 min.

Foaming in an Oven

A 0.7 inch (1.78 centimeters (cm)) by 0.04 inch (0.1 cm) disk of melt-pressed polymer prefoam resin was placed on a Teflon liner and placed in an oven set between 125-250° C. Samples were allowed to foam for 0-30 min.

Foaming in a Cylindrical Mold

A section of melt-pressed polymer prefoam sheet was inserted into a cylindrical aluminum mold with dimensions of 0.75 inch (1.9 cm) deep and 0.5 inch (1.3 cm) in diameter. The mold was placed in a dual heating/cooling Wabash Press (Wabash Metal Products, Wabash, Ind., model #20-122TM2 WCB) and heated at 190° C. for 5-10 min, then immediately cooled to room temperature using the water cooled cooling press.

Foaming in a Rectangular Mold

A section of melt-pressed polymer prefoam sheet was inserted into a rectangular aluminum mold with dimensions of 4 inch (10.2 cm) by 2 inch (5.1 cm) by 0.2 inch (0.5 cm). The mold was heated at 190° C. in a heating press for 10-15 min, then immediately cooled to room temperature using a cooling press.

Spray Drying to Produce Encapsulated Chemical Blowing Agents

A slurry of polymer and chemical blowing agent was dried with a customized Model 48 mixed flow spray dryer fabricated by Spray Drying Systems, Inc. (headquartered in Eldersburg, Md.). The spray dryer is 4 foot (ft) (1.2 meter) in diameter and has 8 ft (2.4 meter) straight sides. Room air (approximately 21° C. and 50% humidity) was provided as the bulk drying gas, which was then heated via an electric heater and carried through the drying chamber (entered through the top and exited through the bottom) and finally to a cyclone and a baghouse before being exhausted. The cyclone separated the product solids from the gas stream (down to 1 micron in diameter); the solids were discarded. The drying gas flow rate was unknown and changed with temperature and inlet humidity, though it was provided with a 1 HP AirTech Inc. (Rutherford, N.J.) blower (3450 RPM, 60 Hz, 230/460 V, 2.8/1.4 A). The bulk drying gas temperature at the chamber inlet was 72-86° C., while the outlet temperature was 66-50° C. The slurry was provided at 17 (±3) grams per minute (g/min) via a dual-hose 505DU peristaltic pump (Watson Marlow, Wilmington, Mass.) using a MASTERFLEX (Vernon Hills, Ill.) 96420 Platinum-cured silicone tubing line. The slurry was atomized vertically upward utilizing internally mixed two-fluid pressure spray atomizing nozzles (available from Spraying Systems Co. (Wheaton, Ill.) under the trade designations "FLUID CAP 2850" and "AIR CAP 1891125"). The atomizing gas was nitrogen (20 psi) (137.9 kilopascals (kPa)), provided at 3.35 (±0.1) standard cubic feet per minute (SCFM) (approximately 94.9 standard liters per minute).

Preparative Example 1 (PE-1)

A twin screw extruder from APV Chemical Machinery (Saginaw, Mich.) (screw diameter: 30 mm; ratio of screw length to diameter: 30; extrusion throughput rate: 20 pounds per hour (9 kilograms/hour); Zone 1: 250° F. (121° C.); Zones 2 and 3: 390° F. (199° C.); Zones 4 and 5: 350° F. (177° C.)) and an underwater pelletizer from Gala Industries (Eagle Rock, Va.) were used to prepare pre-compounded and free-flowing PLA pellets (formulation listed in Table 2). The PE-1 pre-compounded PLA pellets were used as the base resin to prepare foam samples.

TABLE 2

| Formulation of PE-1 | |
| --- | --- |
| Components | Composition (wt. -%) |
| I4060 PLA | 30 |
| I 4032 PLA | 7.8 |
| VK70 PVAc | 35 |
| CA4 Plasticizer | 25 |
| ECO Nuc. Agent | 0.2 |
| S511 | 2 |

Preparative Example 2 (PE-2)

1250 grams (g) of AZO powders were added to a solution of 1250 g of LRS780 in 7500 g of water to give a 25 wt-% solid suspension. The suspension was further mixed with a high shear mixer (T50 digital Ultra Turrax, IKA) at 2000 RPM for 5 min. This polymer mixture was then spray dried (method described above) to put a polymer shell around the particles. 1905 g of free-flowing powders were obtained (at 76.2% yield). The resulting composite particles contained 50 wt-% of AZO.

Preparative Example 3 (PE-3)

750 g of AZO powders were added to a solution of 1750 g of LRS780 in 10 kilograms (kg) of water to give a 20 wt-% solid suspension. The suspension was further mixed with a high shear mixer (T50 digital Ultra Turrax, IKA) at 2000 RPM for 5 min. This polymer mixture was then spray dried (method described above) to put a polymer shell around the particles. 1701 g of free-flowing powders were obtained (at 68.0% yield). The resulting composite particles contained 30 wt-% of AZO.

Preparative Example 4 (PE-4)

1500 g of AZO powders were added to a solution of 1500 g PVP in 9000 g of water to give a 25 wt-% solid suspension.

The suspension was further mixed with a high shear mixer (T50 digital Ultra Turrax, IKA) at 2000 RPM for 5 min. This polymer mixture was then spray dried (method described above) to put a polymer shell around the particles. A free-flowing powder was obtained (at 78.0% yield). The resulting composite particles contained 50 wt-% of AZO.

The SEM images FIG. 1 of composite particles of each of PE-2, PE-3, and PE-4 show that the spray dried particles appear to be fully coated by the polymer encapsulant as indicated by the smooth surface of the particles and the lack of cracks or holes in the shell. The histograms of FIG. 1 show that the starting AZO powder has a monomodal size distribution, but that the spray dried composite particles have a bimodal size distribution.

Preparative Example 5 (PE-5)

A solution of starch in water (25 wt-% solids) was mixed using a high shear mixer (T50 digital Ultra Turrax, IKA) at 2000 RPM for 5 min. The polymer solution was spray dried using a Buchi Mini-Probe B-190 (Buchi Corporation, New Castle, Del.) at a flow rate of 10 RPM and an inlet temperature set at 160° C. (outlet temperature measurement of 75-80° C.). The composite particles were collected in the cyclone and used without further purification.

Preparative Example 6 (PE-6)

A solution of PVP in water (2 wt-5% solids) was mixed using a high shear mixer (T50 digital Ultra Turrax, IKA) at 2000 RPM for 5 min. The polymer solution was spray dried using a Buchi Mini-Probe B-190 (Buchi Corporation, New Castle, Del.) at a flow rate of 10 RPM and an inlet temperature set at 160° C. (outlet temperature measurement of 75-80° C.). The composite particles were collected in the cyclone and used without further purification.

Preparative Example 7 (PE-7)

100 g of AZO powders were added to a dispersion of 417 g MED 310 (24% solid in water dispersion) and extra 300 g of water to give a 25 wt-% solid suspension. The suspension was further mixed with a high shear mixer (T50 digital Ultra Turrax, IKA) at 2000 RPM for 5 min. The polymer solution was spray dried using a Buchi Mini-Probe B-190 (Buchi Corporation, New Castle, Del.) at a flow rate of 10 RPM and an inlet temperature set at 160° C. (outlet temperature measurement of 75-80° C.). A free-flowing powder was obtained (at 36.2% yield). The resulting composite particles contained 50 wt-% of AZO.

Preparative Example 8 (PE-8)

100 g of AZO powders were added to a dispersion of 200 g V989 (50% solid in water dispersion) and extra 500 g of water to give a 25 wt-% solid suspension. The suspension was further mixed with a high shear mixer (T50 digital Ultra Turrax, IKA) at 2000 RPM for 5 min. The polymer solution was spray dried using a Buchi Mini-Probe B-190 (Buchi Corporation, New Castle, Del.) at a flow rate of 10 RPM and an inlet temperature set at 160° C. (outlet temperature measurement of 75-80° C.). A free-flowing powder was obtained (at 45.0% yield). The resulting composite particles contained 50 wt-% of AZO.

Preparative Example 9 (PE-9)

100 g of AZO powders were added to a dispersion of 250 g LDPE (40% solid in water dispersion) and extra 450 g of water to give a 25 wt-% solid suspension. The suspension was further mixed with a high shear mixer (T50 digital Ultra Turrax, IKA) at 2000 RPM for 5 min. The polymer solution was spray dried using a Buchi Mini-Probe B-190 (Buchi Corporation, New Castle, Del.) at a flow rate of 10 RPM and an inlet temperature set at 160° C. (outlet temperature measurement of 75-80° C.). A free-flowing powder was obtained (at 45.8% yield). The resulting composite particles contained 50 wt-% of AZO.

Preparative Example 10 (PE-10)

100 g of PTSH powders were added to a solution of 100 g starch in 600 g of water to give a 25 wt-% solid suspension. The suspension was further mixed with a high shear mixer (T50 digital Ultra Turrax, IKA) at 2000 RPM for 5 min. The polymer solution was spray dried using a Buchi Mini-Probe B-190 (Buchi Corporation, New Castle, Del.) at a flow rate of 10 RPM and an inlet temperature set at 160° C. (outlet temperature measurement of 75-80° C.). A free-flowing powder was obtained (at 39.8% yield). The resulting composite particles contained 50 wt-% of PTSH.

Preparative Example 11 (PE-11)

100 g of PTSH powders were added to a dispersion of 417 g MED 310 (24% solid in water dispersion) and extra 300 g of water to give a 25 wt-% solid suspension. The suspension was further mixed with a high shear mixer (T50 digital Ultra Turrax, IKA) at 2000 RPM for 5 min. The polymer solution was spray dried using a Buchi Mini-Probe B-190 (Buchi Corporation, New Castle, Del.) at a flow rate of 10 RPM and an inlet temperature set at 160° C. (outlet temperature measurement of 75-80° C.). A free-flowing powder was obtained (at 51.0% yield). The resulting composite particles contained 50 wt-% of PTSH.

Preparative Example 12 (PE-12)

100 g of PTSH powders were added to a dispersion of 200 g V989 (50% solid in water dispersion) and extra 500 g of water to give a 25 wt-% solid suspension. The suspension was further mixed with a high shear mixer (T50 digital Ultra Turrax, IKA) at 2000 RPM for 5 min. The polymer solution was spray dried using a Buchi Mini-Probe B-190 (Buchi Corporation, New Castle, Del.) at a flow rate of 10 RPM and an inlet temperature set at 160° C. (outlet temperature measurement of 75-80° C.). A free-flowing powder was obtained (at 51.0% yield). The resulting composite particles contained 50 wt-% of PTSH.

Preparative Example 13 (PE-13)

50 grams (g) of AZO and 50 g of nZnO powders were added to a solution of 100 g of LRS780 in 600 g of water to give a 25 wt-% solid suspension. The suspension was further mixed with a high shear mixer (T50 digital Ultra Turrax, IKA) at 2000 RPM for 5 min. This polymer mixture was then spray dried (method described above) to put a polymer shell around the powders. A free-flowing powder was obtained (at 45% yield). The resulting composite particles contained 25 wt-% of AZO.

Preparative Example 14 (PE-14)

40 grams (g) of PTSH powder and 60 g of urea crystals were added to a solution of 100 g of LRS780 in 600 g of water to give a 25 wt-% solid suspension. The suspension was further mixed with a high shear mixer (T50 digital Ultra Turrax, IKA) at 2000 RPM for 5 min. This polymer mixture was then spray dried (method described above) to put a polymer shell around the powders. A free-flowing powder was obtained (at 2.5% yield). The resulting composite particles contained 20 wt-% of PTSH.

Preparative Example 15 (PE-15)

A polydimethylsiloxane polyoxamide copolymer was prepared like the method of Example 16 of U.S. Pat. No. 7,501,184 (Leir et al.), in which 1 part of ethylene diamine was reacted with 272.58 parts of a compound of Formula I (prepared in accordance with the procedure of Preparative Example 5 of U.S. Pat. No. 7,501,184) in a sealed container at ambient temperature until a solid was formed.

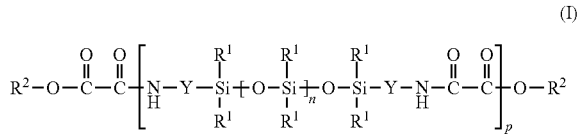

In Formula I, each $R^1$ is independently an alkyl, haloalkyl, aralkyl, alkenyl, aryl, or aryl substituted with an alkyl, alkoxy, or halo. Each $R^2$ is independently an alkyl, haloalkyl, aryl, or aryl substituted with an alkyl, alkoxy, halo, or alkoxycarbonyl. Each Y is independently an alkylene, aralkylene, or a combination thereof. The subscript n is independently an integer of 0 to 1500 and the subscript p is an integer of 1 to 10.

Preparative Example 16 (PE-16)

2 grams (g) of AZO and 2 g of $Zn(OAc)_2$ crystals were added to a solution of 20 g LRS780 in 80 g water to give a 23 wt-% solids suspension. The suspension was further mixed with a high shear mixer (T50 digital Ultra Turrax, IKA) at 4000 rpm for 2 min. The polymer mixture was then spray dried using a Buchi Mini-Probe B-190 (Buchi Corporation, New Castle, Del.) at a flow rate of 10 rpm and an inlet temperature set at 135° C. (outlet temperature measurement of 75-80° C.). A free-flowing powder was obtained (at 35.4% yield). The resulting capsule contained 9_wt-% AZO.

Preparative Example 17 (PE-17)

2 grams (g) of AZO and 3 g of $Cd(OAc)_2$ crystals were added to a solution of 20 g LRS780 in 80 g water to give a 23 wt-% solids suspension. The suspension was further mixed with a high shear mixer (T50 digital Ultra Turrax, IKA) at 4000 rpm for 2 min. The polymer mixture was then spray dried using a Buchi Mini-Probe B-190 (Buchi Corporation, New Castle, Del.) at a flow rate of 10 rpm and an inlet temperature set at 150° C. (outlet temperature measurement of 75-80° C.). A free-flowing powder was obtained (at 37.5% yield). The resulting capsule contained 10 wt-% AZO.

Preparative Example 18 (PE-18)

10 grams (g) of IA were suspended in 56.3 g LRS780 in 393.7 g water to give a 14.4 wt-% solids suspension. The suspension was further mixed with a high shear mixer (T50 digital Ultra Turrax, IKA) at 5000 rpm for 2 min. The polymer mixture was then spray dried using a Buchi Mini-Probe B-190 (Buchi Corporation, New Castle, Del.) at a flow rate of 10 rpm and an inlet temperature set at 160° C. (outlet temperature measurement of 75-80° C.). A free-flowing powder was obtained (at 45.6% yield). The resulting capsule contained 14.4 wt-% IA.

Preparative Example 19 (PE-19)

500 grams (g) of PT were suspended in a solution of 2000 g LRS780 in 14.17 kilograms water to give a 15 wt-% solids suspension. The suspension was further mixed with a high shear mixer (T50 digital Ultra Turrax, IKA) at 2000 rpm for 5 min. This polymer mixture was then spray dried (method described above) to put a polymer shell around the particles. 1021 g of free-flowing powders were obtained (at 40.8% yield). The resulting capsule contained 5.1 wt-% of PT.

Preparative Example 20 (PE-20)

2 grams (g) of AZO were added to a solution of 40 g LRS780 in 160 g water to give a 20.8 wt-% solids suspension. The suspension was further mixed with a high shear mixer (T50 digital Ultra Turrax, IKA) at 4600 rpm for 2 min. The polymer mixture was then spray dried using a Buchi Mini-Probe B-190 (Buchi Corporation, New Castle, Del.) at a flow rate of 10 rpm and an inlet temperature set at 150° C. (outlet temperature measurement of 75-80° C.). A free-flowing powder was obtained (at 33.0% yield). The resulting capsule contained 5 wt-% AZO.

Foaming in an Oven

Comparative Examples 1 to 4 (CE-1 to CE-4)

For Comparative Examples 1 to 4 (CE-1 to CE-4), a disk of polymer prefoam resin was prepared according to the formulations listed in Table 3 (values signify parts per hundred). The disks of polymer prefoam resin were then foamed in an oven at 210, 230, or 250° C. Table 4 summarizes the cell size, cell density, and cell homogeneity measurements for samples of CE-1 to CE-4 foamed at each temperature.

Examples 5 to 7 (EX-5 to EX-7)

For Examples 5 to 7 (EX-5 to EX-7), a disk of polymer prefoam resin was prepared according to the formulations listed in Table 3 (values signify parts per hundred). The disks of polymer prefoam resin were then foamed in an oven at 210, 230, or 250° C. Table 4 summarizes the cell size, cell density, and cell homogeneity measurements for samples of EX-5 to EX-7 foamed at each temperature.

TABLE 3

Formulations for the polymer prefoam resin disks (e.g., compressed mixtures) of
Comparative Examples 1 to 4, 39, and 42 (CE-1 to CE-4, CE-39, and CE-42) and Examples 5 to 7,
40, 41, and 43 (EX-5 to EX-7, EX-40, EX-41, and EX-43) in parts per hundred

| MATERIAL | CE-1 | CE-2 | CE-3 | CE-4 | CE-39 | CE-42 | EX-5 | EX-6 | EX-7 | EX-40 | EX-41 | EX-43 |
|---|---|---|---|---|---|---|---|---|---|---|---|---|
| PE-1 | 93.4 | 88.4 | 88.4 | 88.4 | 97.4 | 96.4 | 88.4 | 88.4 | 81.7 | 88.4 | 88.4 | 88.4 |
| AZO | 5 | 5 | 5 | | | | | | | | | |
| IA | | | | | 1 | | | | | | | |
| PT | | | | | | 2 | | | | | | |
| PE-2 | | | | | | | 10 | | | | | |
| PE-3 | | | | | | | | | 16.7 | | | |
| PE-4 | | | | | | | | 10 | | | | |
| PE-5 | | | | 5 | | | | | | | | |
| PE-6 | | 5 | | | | | | | | | | |
| PE-9 | | | | | 10 | | | | | | | |
| PE-18 | | | | | | | | | | 10 | | |
| PE-19 | | | | | | | | | | | | 10 |
| PE-20 | | | | | | | | | | | 10 | |
| J4368 | 0.4 | 0.4 | 0.4 | 0.4 | 0.4 | 0.4 | 0.4 | 0.4 | 0.4 | 0.4 | 0.4 | 0.4 |
| DTMAB | 0.2 | 0.2 | 0.2 | 0.2 | 0.2 | 0.2 | 0.2 | 0.2 | 0.2 | 0.2 | 0.2 | 0.2 |
| Erucamide | 1 | 1 | 1 | 1 | 1 | 1 | 1 | 1 | 1 | 1 | 1 | 1 |

Table 4 summarizes the analysis of CE-1 to CE-4, EX-5 to EX-7, CE-39, EX-40, EX-41, CE-42, and EX-43 final foam structures when foamed in an oven at various temperatures. Use of composite particles in which AZO, which releases nitrogen gas, was encapsulated led to lower cell sizes and increased cell density and homogeneity as compared to AZO alone under all temperatures analyzed (CE-1 versus EX-5-EX-7). Furthermore, encapsulation of AZO in starch shells led to lower cell size and increased cell density and homogeneity as compared to mixing AZO with solid starch particles (PE-5) at all temperatures tested (EX-6, EX-7, and EX-41, versus CE-3). Additionally, encapsulation of AZO in PVP shells also led to lower cell size and increased cell density and homogeneity as compared to mixing AZO with solid PVP particles PE-6 at 210° C., but an equivalent effect was seen at 230 and 250° C. (EX-5 versus CE-2). Therefore, the changes in foam structure observed after encapsulating AZO in PVP or starch shells is due to more than just enhanced cell nucleation. When the high temperature blowing agent PT, which also releases nitrogen gas, was used as a blowing agent similar effects were seen to the AZO blowing agent. The observed cells are smaller in size and present at a higher cell density when PT is encapsulated in a starch shell (EX-43) than when PT is used alone (CE-42). When IA was used as a blowing agent, the evolved carbon dioxide gas was unable to effectively nucleate cells throughout the resin and the gas instead diffused out of the resin (CE-39). In this case, some cells are observed due to gas getting trapped between the resin and the base of the oven. On the other hand, when IA was encapsulated with starch (EX-41), cell nucleation and bubble growth was seen through the cross section of the foam.

TABLE 4

Analysis of CE-1 to CE-4, CE-39, and CE-42 and EX-5
to EX-7, EX-40, EX-41, and EX-43 structures of final
foam compositions when foamed in an
oven at various temperatures.

| Temp, ° C. | Sample | Foaming time, min | Cell size, μm | Cell density, cells/mm² | Cell homogeneity |
|---|---|---|---|---|---|
| 210 | CE-1 | 9 | | cells merged | |
| | CE-2 | 9 | 387 | 7.3 | 4.2 |
| | CE-3 | 9 | 555 | 3.9 | 4.0 |
| | CE-4 | 9 | | cells merged | |
| | EX-5 | 9 | 340 | 11 | 7.2 |
| | EX-6 | 9 | 248 | 11.7 | 5.6 |
| | EX-7 | 9 | 328 | 11.4 | 6.9 |
| 230 | CE-1 | 5 | | cells merged | |
| | CE-2 | 5 | 286 | 27.7 | 7.4 |
| | CE-3 | 5 | 572 | 5.9 | 4.1 |
| | CE-39 | 5 | | gas diffused out | |
| | EX-5 | 5 | 310 | 15.7 | 5.3 |
| | EX-6 | 5 | 255 | 15.8 | 5.1 |
| | EX-7 | 5 | 293 | 12.1 | 5.6 |
| | EX-40 | 5 | 306 | 3.1 | 9.4 |
| | EX-41 | 5 | 270 | 9.4 | 9.3 |
| 250 | CE-1 | 2.5 | 277 | 9.1 | 3.9 |
| | CE-2 | 2.5 | 225 | 18.3 | 9.6 |
| | CE-3 | 2.5 | 422 | 6.7 | 3.4 |
| | EX-5 | 2.5 | 237 | 19.9 | 5.4 |
| | EX-6 | 2.5 | 184 | 21.4 | 6.1 |
| | EX-7 | 2.5 | 218 | 26.8 | 5.1 |
| 270 | CE-42 | 4.5 | 435 | 2.4 | 2.9 |
| | EX-43 | 4.5 | 139 | 8.7 | 20 |

Images of foam compositions produced in an oven at 210° C. for 9 min corresponding to data in Table 4 are provided in FIGS. 2A-2F: 2A is CE-1, 2B is CE-2, 2C is EX-5, 2D is CE-3, 2E is EX-6, 2F is EX-7, and 2G is CE-4. It has been discovered that altering the ratio of core AZO to shell polymer can alter the distribution of cells from bimodal to monomodal (See, e.g., the images of EX-6 (FIG. 2E) versus EX-7 (FIG. 2F)).

Images of foam compositions produced in an oven at 230° C. for 5 min corresponding to data in Table 4 are provided in FIGS. 3A-3F: 3A is CE-1, 3B is CE-2, 3C is EX-5, 3D is CE-3, 3E is EX-6, and 3F is EX-7. Foaming at 230° C. for 5 min was also observed to alter the distribution of cells from bimodal to monomodal by altering the ratio of core AZO to shell polymer (See, e.g., the images of EX-6 (FIG. 3E) versus EX-7 (FIG. 3F)).

Examples 8 and 9 (EX-8 and EX-9) and
Comparative Examples 10 and 11 (CE-10 and
CE-11)

For Examples 8 and 9 (EX-8 and EX-9) and Comparative Examples 10 and 11 (CE-10 and CE-11), a disk of polymer prefoam resin was prepared according to the formulations listed in Table 5 (values signify parts per hundred). The disks of polymer prefoam resin (e.g., compressed mixtures) were then foamed in an oven at 230° C. Table 6 summarizes the cell size, cell density, and cell homogeneity measurements for samples of EX-8, EX-9, CE-10, and CE-11 foamed at 230° C.

TABLE 5

Formulations for the polymer prefoam resin disks
(e.g., compressed mixtures) of Examples 8 and 9
(EX-8 and EX-9) and Comparative Examples 10
and 11 (CE-10 and CE-11) in parts per hundred

| MATERIAL | EX-8 | EX-9 | CE-10 | CE-11 |
|---|---|---|---|---|
| PE-1 | 89.4 | 79.4 | 93.4 | 88.4 |
| AZO | | | 5 | 5 |
| PE-2 | 10 | 10 | | |
| J4368 | 0.4 | 0.4 | 0.4 | 0.4 |
| DTMAB | 0.2 | 0.2 | 0.2 | 0.2 |
| talc | | 10 | | 10 |

Table 6 summarizes the effect of the nucleating agent talc on foam structure. Talc is a foam cell nucleating agent that has previously been disclosed to reduce cell size and increase cell density and homogeneity when used with AZO in blends of PLA, PVAc, and a plasticizer (CE-10 versus CE-11). No additional effect from the presence of the talc was seen when the AZO blowing agent is encapsulated with starch (EX-8 versus EX-9) and the samples were subsequently foamed in an oven for 5 min at 230° C.

TABLE 6

The effect of the nucleating agent talc on
foam composition structure.

| Sample | cell size, $\mu m$ | cell density, cell/mm$^2$ | cell homogeneity |
|---|---|---|---|
| CE-10 | 1295 | 1 | 1.4 |
| CE-11 | 450 | 6.2 | 5.8 |
| EX-8 | 267 | 15.6 | 5.6 |
| EX-9 | 235 | 13.7 | 5.1 |

Images of foam compositions produced in an oven at 230° C. for 5 min corresponding to data in Table 4 are provided in FIGS. 4A-4D: 4A is CE-10, 4B is CE-11, 4C is EX-8, and 4D is EX-9.

Examples 12 and 13 (EX-12 and EX-13) and
Comparative Example 14 (CE-14)

For Examples 12 and 13 (EX-12 and EX-13) and Comparative Example 14 (CE-14), a disk of polymer prefoam resin was prepared according to the formulations listed in Table 7 (values signify parts per hundred). The disks of polymer prefoam resin (e.g., compressed mixtures) were then foamed in an oven at 230° C. Table 8 summarizes the cell size, cell density, and cell homogeneity measurements for samples of EX-12, EX-13, and CE-14 foamed at 230° C.

TABLE 7

Formulations for the polymer prefoam resin disks (e.g., compressed
mixtures) of Examples 12 and 13 (EX-12 and EX-13)
and Comparative Example 14 (CE-14) in parts per hundred

| MATERIAL | EX-12 | EX-13 | CE-14 |
|---|---|---|---|
| PE-1 | 88.4 | 88.4 | 89 |
| PE-2 | 10 | 10 | 10 |
| J4368 | 0.4 | 0.4 | |
| TOAB | 0.2 | | |
| CTAB | | 0.2 | |
| Erucamide | 1 | 1 | 1 |

TABLE 8

The effect of cross-linking catalyst on foam composition structure.

| Sample | Catalyst | Foaming time, min | Cell size, $\mu m$ | Cell density, cell/mm$^2$ | Cell homogeneity |
|---|---|---|---|---|---|
| EX-6 | DTMAB | 5 | 255 | 15.8 | 5.1 |
| | | 6.5 | 310 | 8.9 | 4.5 |
| EX-12 | TOAB | 5 | 271 | 11.8 | 5.8 |
| | | 6.5 | 337 | 12.4 | 5.2 |
| EX-13 | CTAB | 5 | 200 | 11.0 | 5.0 |
| | | 6.5 | 272 | 7.9 | 5.6 |
| CE-14 | — | 5 | | cells merged | |
| | | 6.5 | | foam collapsed | |

Foaming Ina Cylindrical Mold

Comparative Example 15 (CE-15) and Examples
16 (EX-16)

Figure 5A:
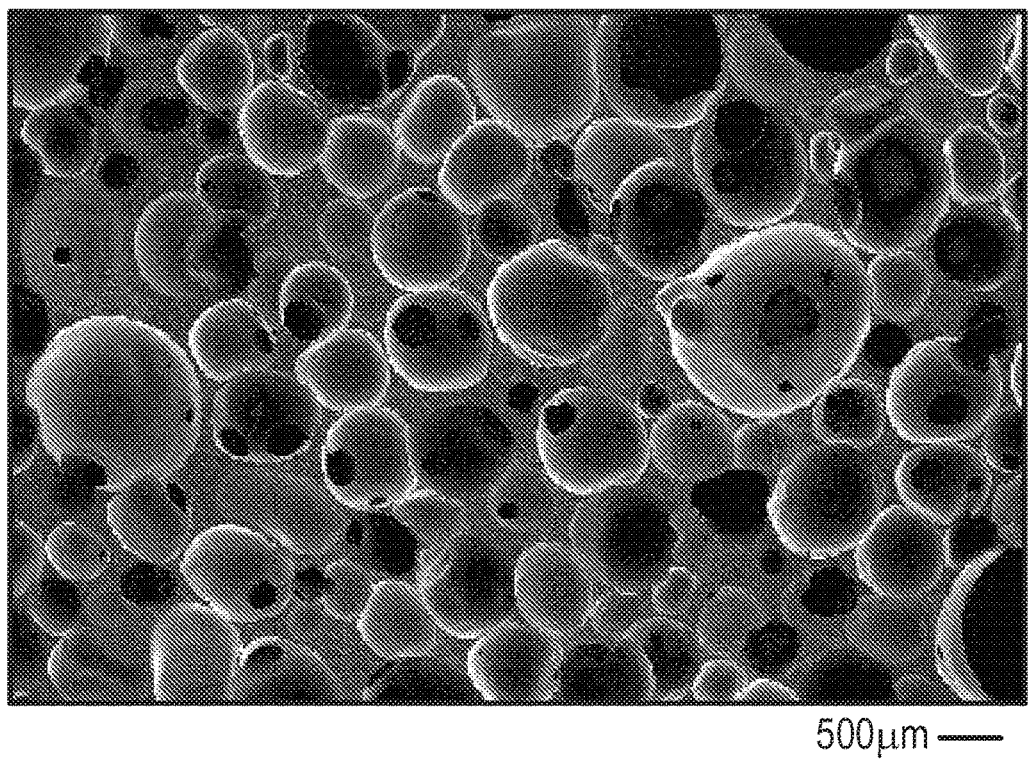
FIG. 5A is an SEM image of the foam composition of Comparative Example 15 foamed at 190° C.
Figure 5B:
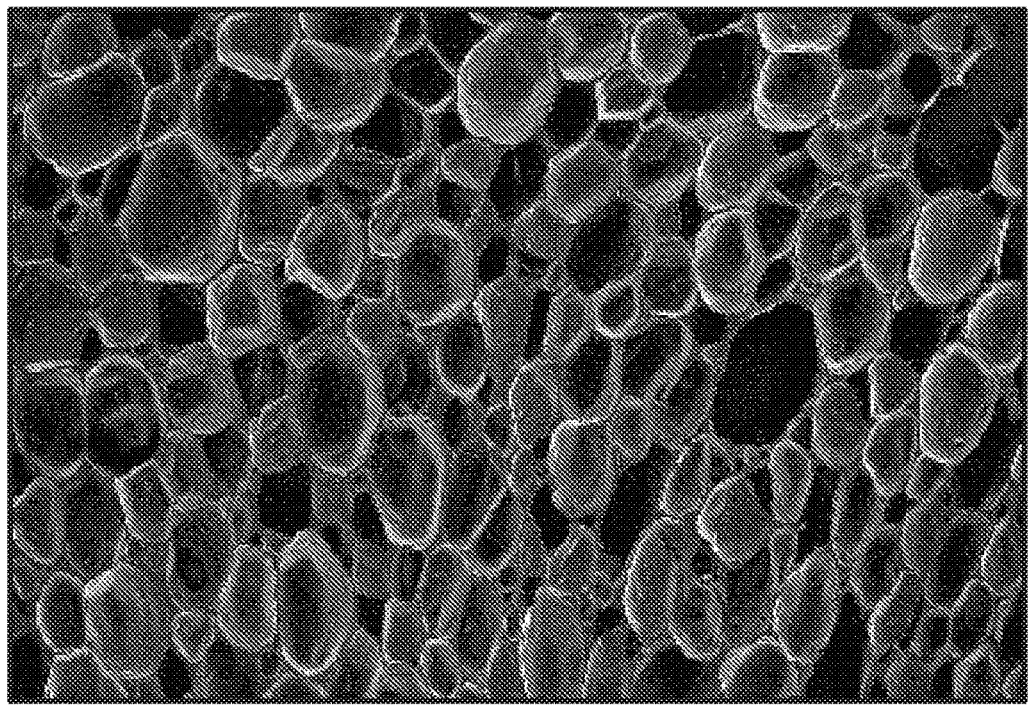
FIG. 5B is an SEM image of the foam composition of Example 16 foamed at 190° C.

For Comparative Example 15 (CE-15) and Example 16 (EX-16), a disk of polymer prefoam resin was prepared according to the formulations listed in Table 9 (values signify parts per hundred). The CE-15 disks of polymer prefoam resin were then foamed in a cylindrical mold at 190° C. for 8 minutes. The EX-16 disks of polymer prefoam resin were then foamed in a cylindrical mold at 190° C. for 10 minutes. Table 11 summarizes effect of encapsulation of AZO on the minimum prefoam resin needed to fill aluminum molds when foamed at 190° C. Table 12 summarizes the cell size, cell density, and cell homogeneity measurements for samples of CE-15 and EX-16 with the minimum amount of material needed to fill the cylindrical mold when foamed at 190° C. according to Table 11. Foam composition EX-16 has a smaller average cells size with higher cell homogeneity and cell density than CE-15 at half the overall foam density. FIG. 5 shows images of foam compositions produced in a cylindrical mold at 190° C. corresponding to the data in Table 12: FIG. 5A is CE-15 and FIG. 5B is EX-16.

TABLE 9

Formulations for the polymer prefoam resin disks
(e.g., compressed mixtures) of Comparative Example
15 (CE-15) and Example 17 (EX-16) in parts per hundred

| MATERIAL | CE-15 | EX-16 |
|---|---|---|
| PE-1 | 93.4 | 89.4 |
| AZO | 5 | |
| PE-2 | | 10 |
| J4368 | 0.4 | 0.4 |

TABLE 9-continued

Formulations for the polymer prefoam resin disks
(e.g., compressed mixtures) of Comparative Example
15 (CE-15) and Example 17 (EX-16) in parts per hundred

| MATERIAL | CE-15 | EX-16 |
|---|---|---|
| DTMAB | 0.2 | 0.2 |
| Erucamide | 1 | 1 |

Foaming Ina Rectangular Mold

Comparative Examples 17 to 20 (CE-17 to CE-20)
and Examples 21 and 22 (EX-21 and EX-22)

For Comparative Examples 17 to 20 (CE-17 to CE-20) and Examples 21 and 22 (EX-21 and EX-22), a sheet of polymer prefoam resin was prepared according to the formulations listed in Table 10 (values signify parts per hundred). A 4 g slice of the polymer prefoam resin for each sample was then foamed in an rectangular mold at 190° C. for the time indicated in Table 13. Table 11 summarizes effect of encapsulation of AZO on the minimum prefoam resin needed to fill aluminum molds when foamed at 190° C.

TABLE 10

Formulations for the polymer prefoam resin sheets (e.g., compressed
mixtures) of Comparative Examples 17 to 20 (CE-17 to CE-20) and
Examples 21 and 22 (EX-21 and EX-22) in parts per hundred

| MATERIAL | CE-17 | CE-18 | CE-19 | CE-20 | EX-21 | EX-22 |
|---|---|---|---|---|---|---|
| PE-1 | 93.4 | 88.4 | 88.4 | 88.4 | 88.4 | 88.4 |
| AZO | 5 | 5 | 5 | 5 | | |
| PE-2 | | | | | | 10 |
| PE-4 | | | | | 10 | |
| PE-5 | | | | 5 | | |
| PE-6 | | 5 | | | | |
| PVP K30 | | | 5 | | | |
| J4368 | 0.4 | 0.4 | 0.4 | 0.4 | 0.4 | 0.4 |
| DTMAB | 0.2 | 0.2 | 0.2 | 0.2 | 0.2 | 0.2 |
| Erucamide | 1 | 1 | 1 | 1 | 1 | 1 |

Table 11 summarizes the effect of encapsulation of AZO on minimum prefoam resin needed to fill aluminum molds. The amount of prefoam resin need to fill a 2.52 mL cyclindrical chamber and 26 mL rectangular prism was reduced by half, leading to a reducing of foam density from 0.3 to 0.16 g/mL when using eCBAs versus AZO alone.

TABLE 11

Effect of encapsulation of AZO on minimum prefoam
resin needed to fill aluminum molds.

| Volume of mold, mL$^3$ | Sample | mass added to mold, g | foam fills mold? |
|---|---|---|---|
| 2.5 (cylinder) | CE-15 | 0.75 | yes |
| | | 0.4 | no |
| | EX-16 | 0.75 | yes |
| | | 0.4 | yes |
| 26 (rectangle) | CE-17 | 8 | yes |
| | | 4 | no |
| | EX-21 | 8 | yes |
| | | 4 | yes |

TABLE 12

Characterization of the foam composition structure
of CE-15 and EX-16 when foamed in
a cylindrical aluminum mold using the minimum
amount of each composition needed to fill the mold.

| Sample | cell size, μm | cell density, cell/mm$^2$ | cell homogeneity |
|---|---|---|---|
| CE-15 | 475 | 4.1 | 5.3 |
| EX-16 | 314 | 8.8 | 6.7 |

Table 13 summarizes the effect of encapsulation of AZO in PVP or starch on foam structure when foamed in a 26 mL rectangular aluminum mold. The amount of prefoam resin used (4 g) was the minimum material able to completely fill the mold using the encapsulated blowing agents (final density 0.16 g/mL). This was not enough material to uniformly fill the mold with AZO alone (CE-17), but all samples were analyzed at 4 g resin loadings for comparison.

Encapsulation of the blowing agent in either PVP (EX-21) or starch (EX-22) led to smaller and more homogeneous cells than AZO alone and a higher cell density. Also, encapsulation of AZO in PVP or starch led to smaller and more homogeneous cells than AZO alone and a higher cell density than mixing PVP (CE-18) or starch (CE-20) particles with AZO, respectively. Effects were further decreased if PVP (CE-19) was used as a polymer additive as compared to AZO encapsulated in PVP.

The use of AZO encapsulated in PVP accelerated foaming as compared to AZO alone (EX-21 vs CE-17). On the other hand, AZO encapsulated in starch slightly retarded foaming time (EX-22 vs CE-17). Simply mixing PVP particles, PVP polymer, or starch particles had no effect on foaming time.

TABLE 13

Effect of encapsulation of AZO in PVP
or starch on foam composition structure
when foamed in a 26 mL rectangular
aluminum mold.

| Sample | Cell size, μm | Cell homo-geneity | Cell density, cells/mm$^2$ | Time to fill mold, minutes |
|---|---|---|---|---|
| CE-17 | 1332 | 1.8 | n/a | 6.5 |
| EX-21 | 115 | 8.9 | 33.9 | 5.5 |
| CE-18 | 259 | 5.0 | 8.6 | 6.5 |
| CE-19 | 442 | 3.8 | 3.8 | 6.5 |
| EX-22 | 261 | 6.0 | 12.9 | 7.5 |
| CE-20 | 309 | 3.0 | 4.8 | 6.5 |

Foaming Other Resins

Comparative Example 23 (CE-23)

A 12 g slice of polymer prefoam resin (e.g., compressed mixture) comprising 95 parts polydimethylsiloxane polyoxamide copolymer (PE-15) and 5 parts AZO was foamed in a rectangular mold at 190° C. for 10 min.

Example 24 (EX-24)

A 12 g slice of polymer prefoam resin (e.g., compressed mixture) comprising 90 parts polydimethylsiloxane polyoxamide copolymer (PE-15) and 10 parts AZO-in-PVP particles (PE-4) was foamed in a rectangular mold at 190° C. for 10 min.

Figure 6A:
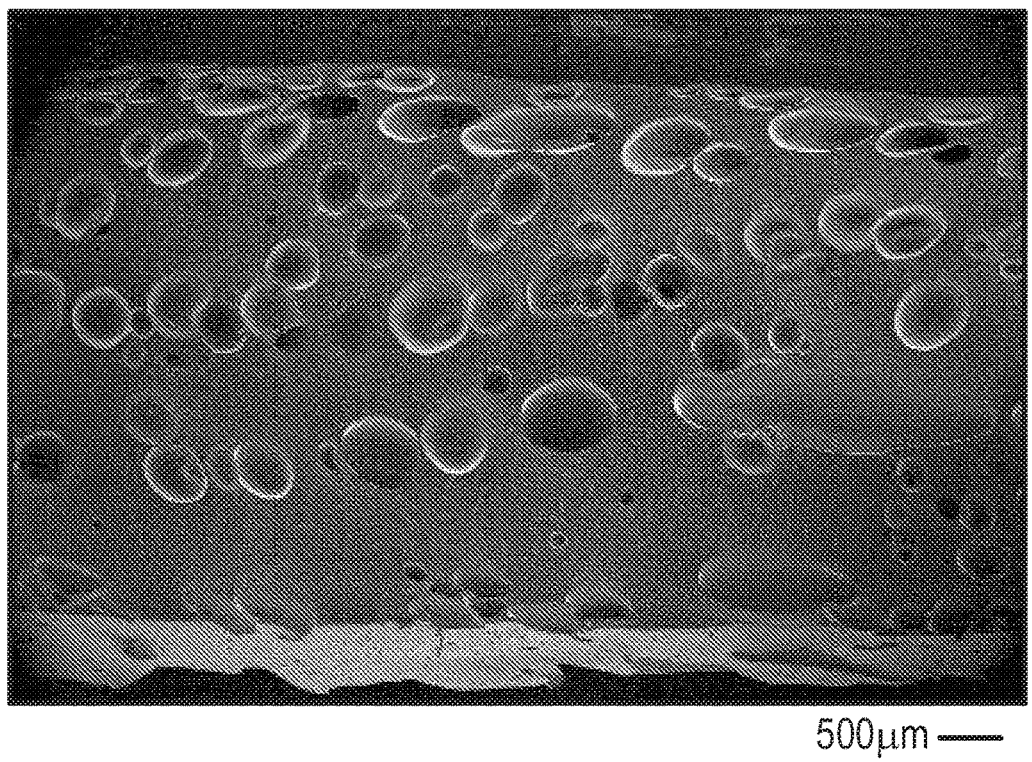
FIG. 6A is an SEM image of the foam composition of Comparative Example 23 foamed at 190° C.
Figure 6B:
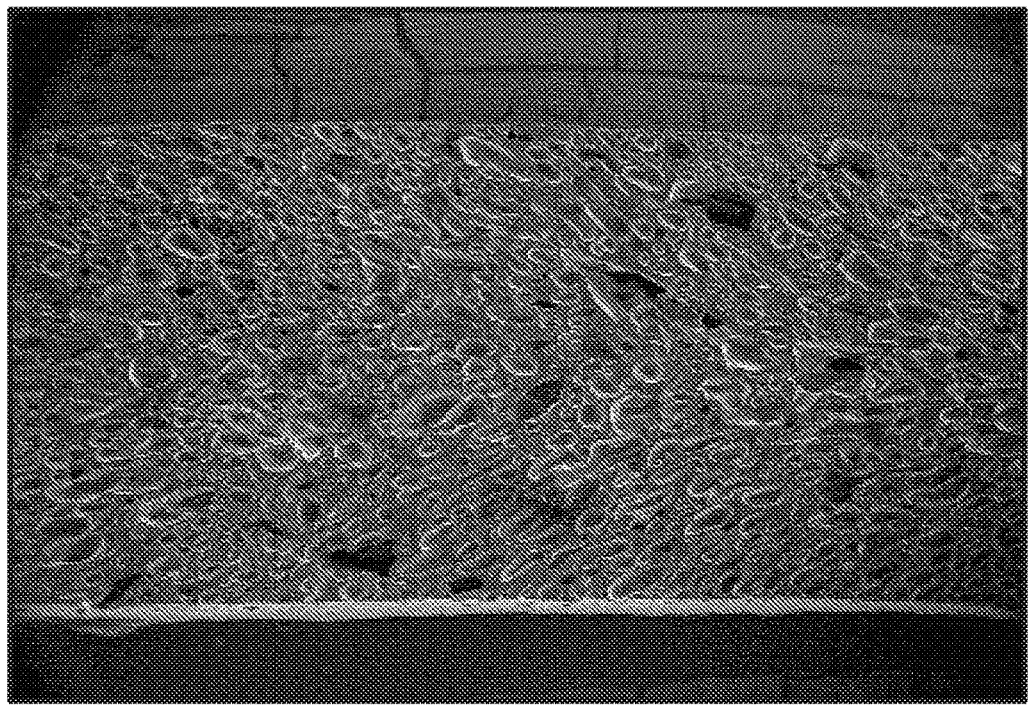
FIG. 6B is an SEM image of the foam composition of Example 24 foamed at 190° C.

Table 14 shows that the encapsulation of the chemical blowing agent azodicarboxamide leads to foams with smaller, more homogeneous cells at a higher cell density when used to foam polydimethylsiloxane polyoxamide copolymer than when azodicarboxamide is used neat. FIG. 6 shows images of foam compositions produced using polydimethylsiloxane polyoxamide copolymer as the polymer matrix in a rectangular mold at 190° C. for 10 min: FIG. 6A is CE-23 and FIG. 6B is EX-24.

TABLE 14

Characterization of the foam structure of CE-23 and EX-24

| Sample | Cell size, μm | Cell density, cells/mm$^2$ | Cell homogeneity |
|---|---|---|---|
| CE-23 | 382 | 2.8 | 5.6 |
| EX-24 | 110 | 33.8 | 11.4 |

Comparative Examples 25 and 26 (CE-25 and CE-26) and Example 27 (EX-27)

For Comparative Examples 25 and 26 (CE-25 and CE-26) and Example 27 (EX-27), a sheet of polymer prefoam resin was prepared according to the formulations listed in Table 15 (values signify parts per hundred). A 5 g slice of the polymer prefoam resin (e.g., compressed mixture) for each sample (except CE-25, which used a 4.5 g slice) was then foamed in a rectangular mold at 190° C. for 10 minutes. Table 16 summarizes the cell size, cell density, and cell homogeneity measurements for samples of CE-25, CE-26, and EX-27 foamed at 190° C.

TABLE 15

Formulations for the polymer prefoam resin sheets (e.g., compressed mixtures) of Comparative Examples 25 and 26 (CE-25 and CE-26) and Example 27 (EX-27) in parts per hundred

| MATERIAL | CE-25 | CE-26 | EX-27 |
|---|---|---|---|
| H5127 | 85.5 | 81 | 81 |
| D3140 | 9.5 | 9 | 9 |
| AZO | 5 | | |
| PE-2 | | | 10 |
| PE-8 | | 10 | |

Table 16 shows the cell size analysis of styrenic block copolymers foamed with AZO or AZO encapsulated with V989 or starch in an aluminum mold at 190° C. At this temperature, the starch shell (EX-27) has a high enough viscosity to alter cell size and cell density, whereas the V989 shell (EX-26) cannot prevent the diffusion of gas throughout the matrix and leads to a similar foam composition structure as AZO (EX-25) alone.

TABLE 16

Characterization of the foam composition structure of EX-27, CE-25, and CE-26

| Sample | Cell size, μm | Cell density, cells/mm$^2$ | Cell homogeneity |
|---|---|---|---|
| EX-27 | 268 | 9 | 3.6 |
| CE-25 | 438 | 5.1 | 5.5 |
| CE-26 | 381 | 6.4 | 6.5 |

Comparative Examples 28 and 29 (CE-28 and CE-29) and Examples 30 and 31 (EX-30 and EX-31)

For Comparative Examples 28 and 29 (CE-28 and CE-29) and Examples 30 and 31 (EX-30 and EX-31), a sheet of polymer prefoam resin (e.g., compressed mixture) was prepared according to the formulations listed in Table 17 (values signify parts per hundred). A 12 g slice of the polymer prefoam resin for each sample was then foamed in an rectangular mold at 175° C. for 14 minutes. Table 18 summarizes the cell size, cell density, and cell homogeneity measurements for samples of CE-28, CE-29, EX-30, and EX-31 foamed at 175° C.

TABLE 17

Formulations for the polymer prefoam resin sheets (e.g., compressed mixtures) of Comparative Examples 28 and 29 (CE-28 and CE-29) and Examples 30 and 31 (EX-30 and EX-31) in parts per hundred

| MATERIAL | CE-28 | CE-29 | EX-30 | EX-31 |
|---|---|---|---|---|
| D1119 | 56.8 | 53.8 | 53.8 | 53.8 |
| D1113 | 19.1 | 18.1 | 18.1 | 18.1 |
| Mineral oil | 19.1 | 18.1 | 18.1 | 18.1 |
| PTSH | 5 | 5 | | |
| PE-5 | | 5 | | |
| PE-10 | | | 10 | |
| PE-11 | | | | 10 |

Table 18 shows cell size analysis for a styrenic blend foamed with PTSH or PTSH encapsulated in starch or M310. At this temperature, both the starch shell (EX-30) and the M310 shell (EX-31) have a high enough viscosity to alter the foam cell size and cell density as compared to AZO (CE-28) alone. In use of solid starch particle as a nucleating agent in combination with PTSH (CE-29), rather than PTSH-in-starch or PTSH-in-M310 particles, does not greatly alter for the cell structure and leads to a blackened, charred foam.

TABLE 18

Characterization of the foam composition structure of CE-28, CE-29, EX-30, and EX-31

| Sample | Cell size, μm | Cell density, cells/mm$^2$ | Cell homogeneity | Color observations |
|---|---|---|---|---|
| CE-28 | 558 | 1.3 | 2.1 | browned |
| EX-30 | 363 | 2.6 | 2.8 | tan |
| EX-31 | 385 | 2.1 | 2.8 | off white |
| CE-29 | 503 | 1.8 | 2.3 | black |

Comparative Examples 32 and 33 (CE-32 and CE-33) and Examples 34 and 35 (EX-34 and EX-35

For Comparative Examples 32 and 34 (CE-32 and CE-33) and Examples 34 and 35 (EX-34 and EX-35), a disk of polymer prefoam resin (e.g., compressed mixture) was prepared according to the formulations listed in Table 19 (values signify parts per hundred). The disk was then foamed in an oven at 175 or 185° C. for 6 or 8 minutes, respectively. Table 20 summarizes the cell size, cell density, and cell homogeneity measurements for samples of CE-32, CE-33, EX-34, and EX-35 foamed at 175 and 185° C.

TABLE 19

Formulations for the polymer prefoam resin disks of Comparative Examples 32 and 33 (CE-32 and CE-33) and Examples 34 and 35 (EX-34 and EX-35) in parts per hundred

| MATERIAL | CE-32 | CE-33 | EX-34 | EX-35 |
|---|---|---|---|---|
| EVA360 | 96.4 | 93.4 | 93.4 | 93.4 |
| DCP | 1.6 | 1.6 | 1.6 | 1.6 |
| PTSH | 3 | 3 | | |
| TALC | | 3 | | |
| PE-10 | | | | 6 |
| PE-12 | | | 6 | |

Figure 8A:
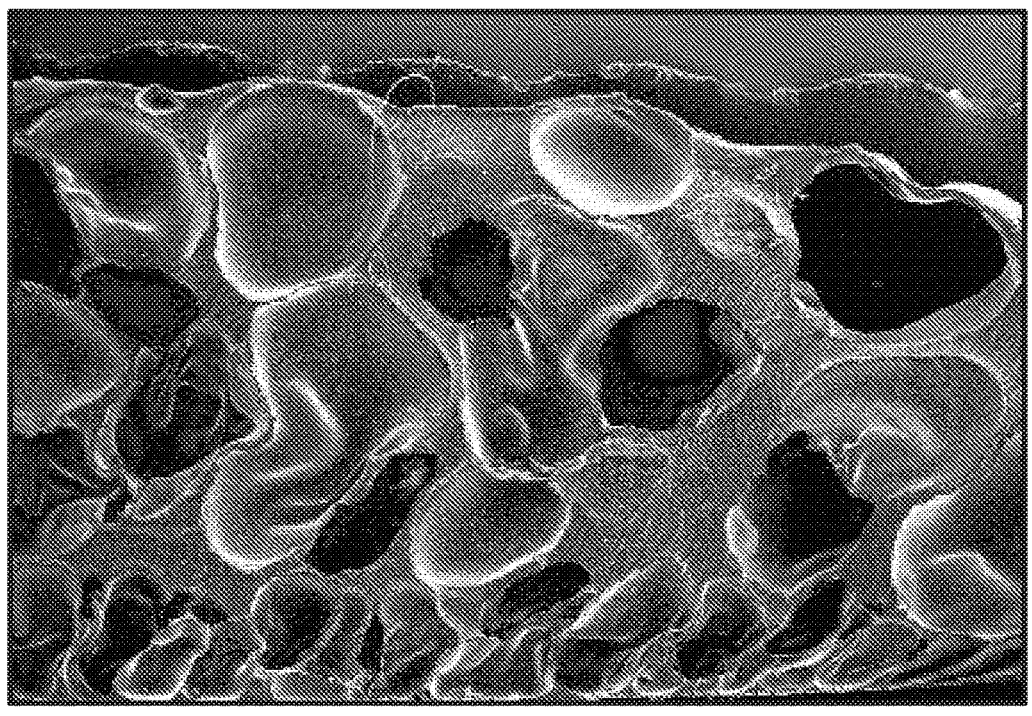
FIG. 8A is an SEM image of the foam composition of Comparative Example 32 foamed at 175° C.
Figure 8B:
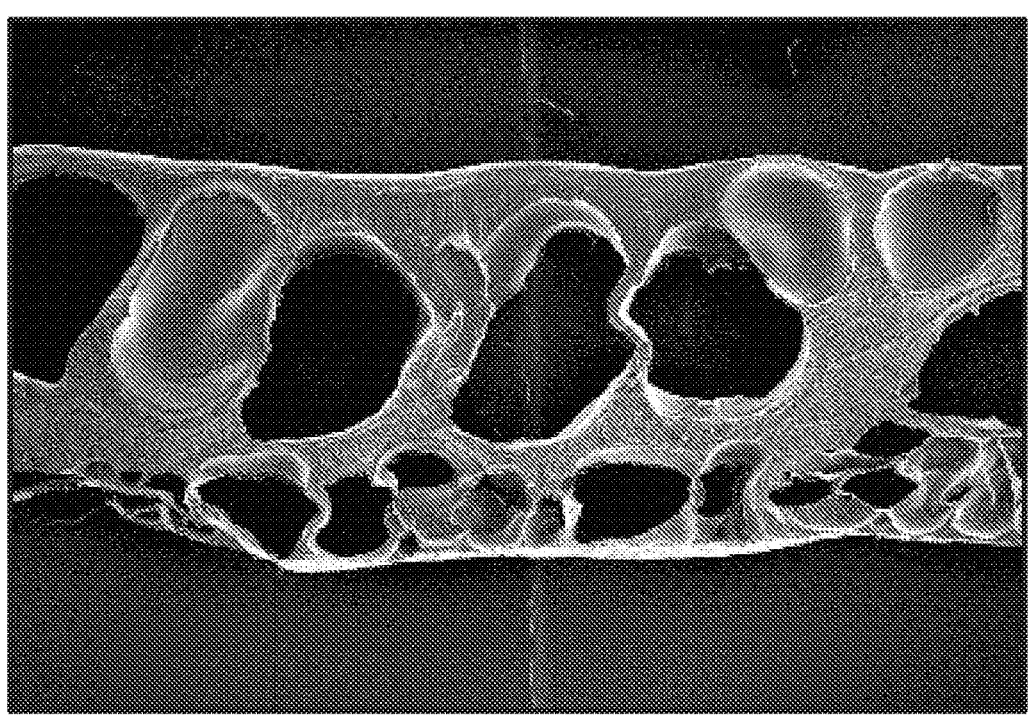
FIG. 8B is an SEM image of the foam composition of Comparative Example 33 foamed at 175° C.
Figure 8C:
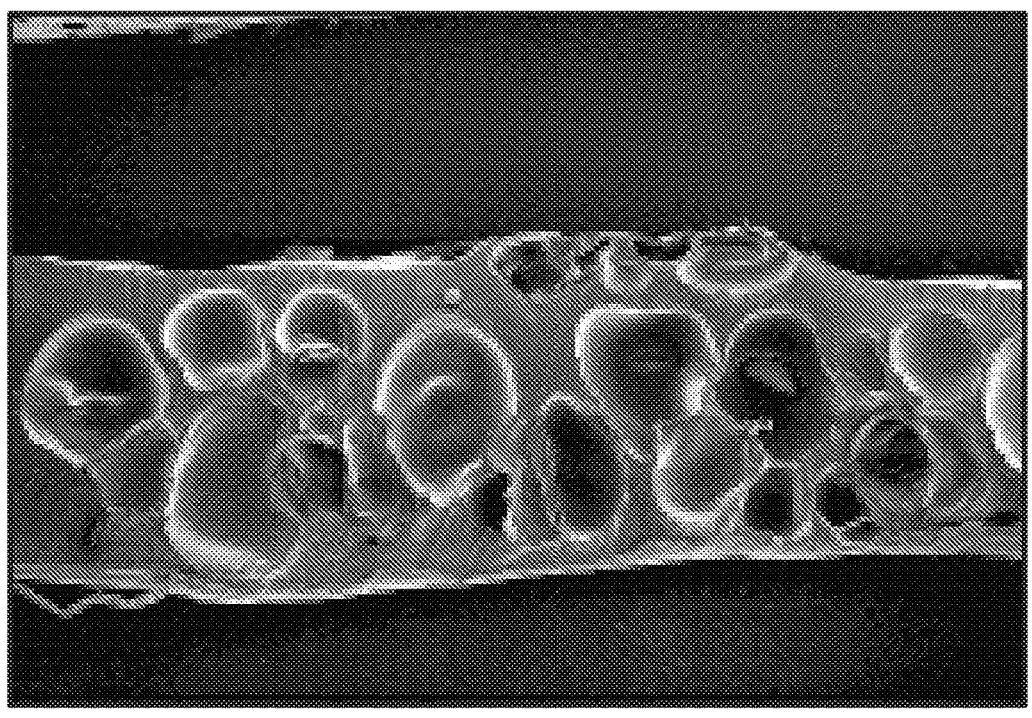
FIG. 8C is an SEM image of the foam composition of Example 34 foamed at 175° C.
Figure 8D:
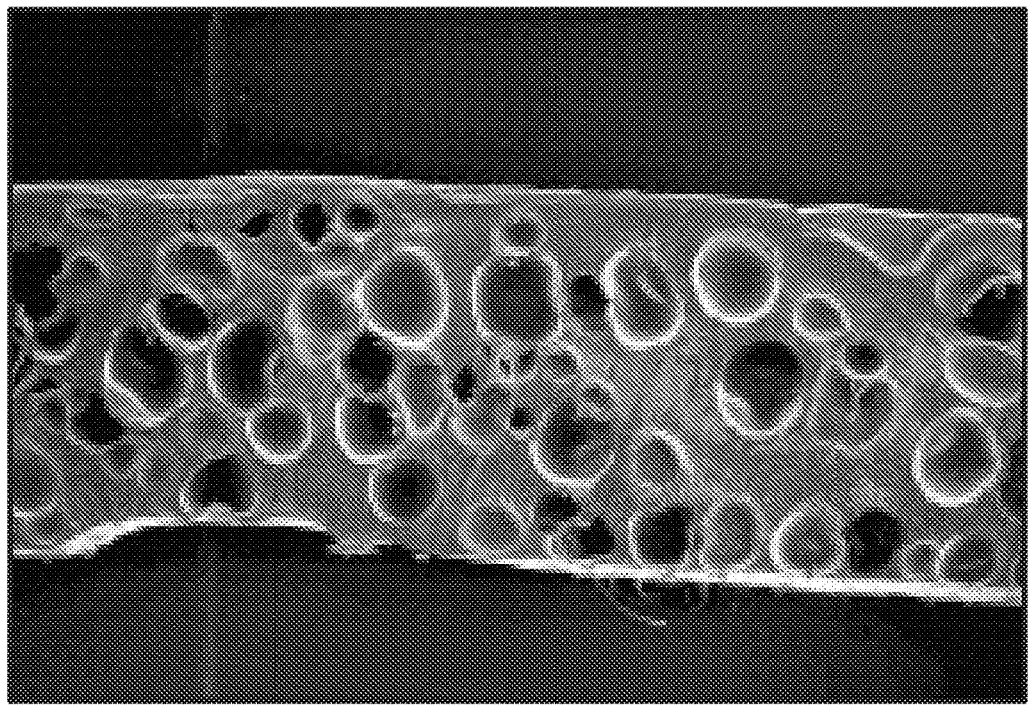
FIG. 8D is an SEM image of the foam composition of Example 35 foamed at 175° C.

Table 20 shows cell size analysis for EVA360 foamed with PTSH or PTSH encapsulated in starch or V989. At these temperatures, the starch shell (EX-35) had a high enough viscosity to alter the foam cell size and cell density as compared to PTSH (CE-32) alone. FIG. 8 shows images of foams produced in an oven at 175° C. for 8 min, corresponding to data in Table 20: FIG. 8A is CE-32; FIG. 8B is CE-33; FIG. 8C is EX-34; and FIG. 8D is EX-35.

TABLE 20

Characterization of the foam composition structure of CE-32, CE-33, EX-34, and EX-35

| Sample | Cell size, μm | Cell density, cells/mm² | Cell homogeneity |
|---|---|---|---|
| CE-32 | 771 | 1.8 | 2.6 |
| CE-33 | 522 | 2.5 | 3.0 |
| EX-34 | 468 | 3.1 | 4.2 |
| EX-35 | 316 | 5.5 | 7.2 |

Complex Viscosity of the Particle Shells

Figure 7:
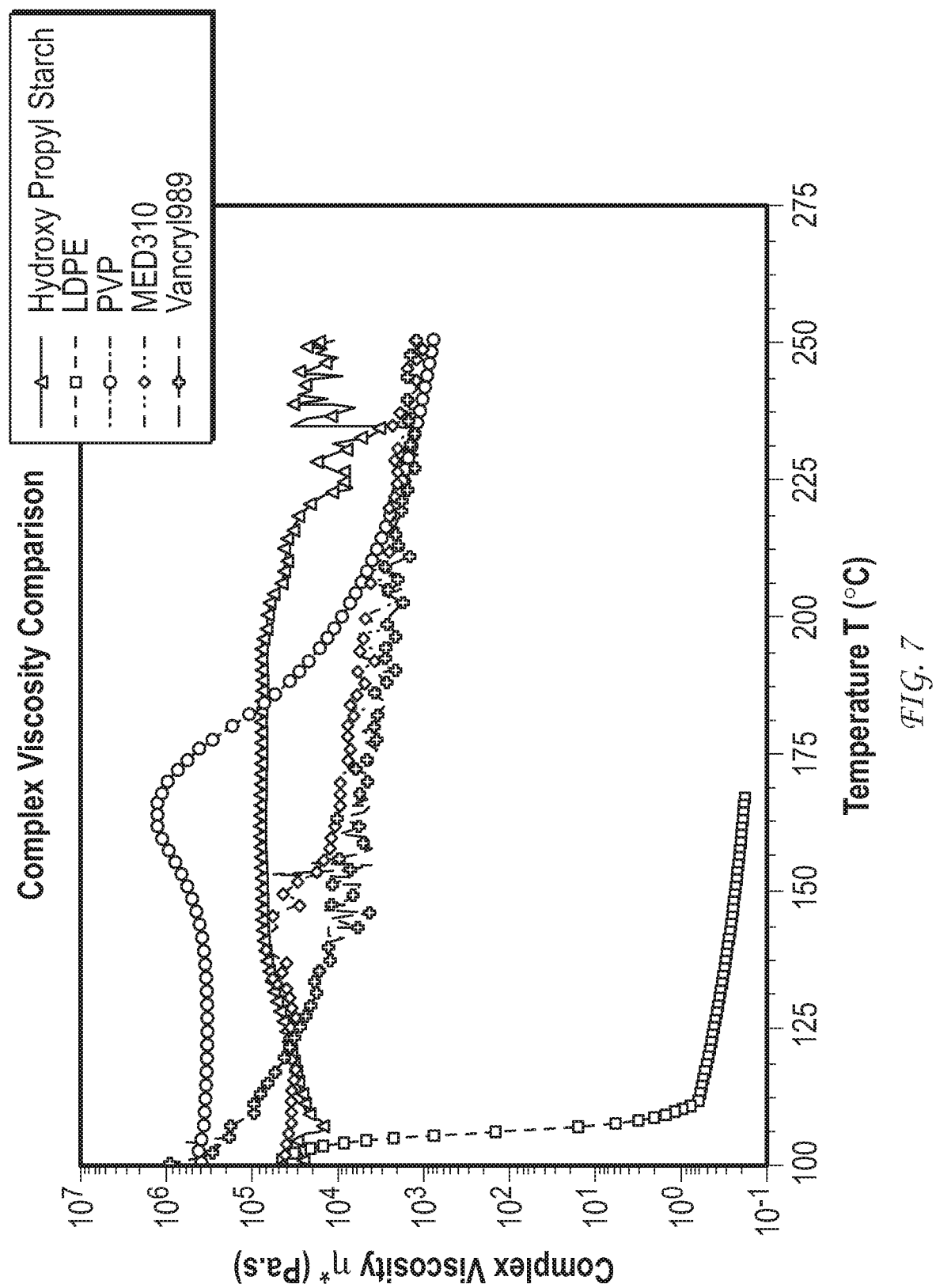
FIG. 7 is a graph of complex viscosity versus temperature for uncrosslinked thermoplastic materials.

A graph of complex viscosity versus temperature for various uncrosslinked thermoplastic resins used to encapsulate chemical blowing agents to prepare composite particles is provided in FIG. 7.

Compressive Properties of Foams Made from Blends of Pla, Pvac, and Plasticiser Obtained Using Various Foaming Agents

Examples 36 and 37 (EX-36 and EX-37) and Comparative Example 38 (CE-38)

For Examples 36 and 37 (EX-36 and EX-37) and Comparative Example 38 (CE-38), a sheet of polymer prefoam resin (e.g., compressed mixture) was prepared according to the formulations listed in Table 21 (values signify parts per hundred). A 8 g slice of the polymer prefoam resin for each EX-36 sample was then foamed in a rectangular mold at 190° C. for 5 minutes. A 5 g slice of the polymer prefoam resin for each EX-37 sample was then foamed in a rectangular mold at 190° C. for 8.5 minutes. A 5 g slice of the polymer prefoam resin for each CE-38 sample was then foamed in a rectangular mold at 190° C. for 4 minutes. Table 22 summarizes the max compressive force needed to compress the foam sample.

TABLE 21

Formulations for the polymer prefoam resin sheets (e.g., compressed mixtures) of Examples 36 and 37 (EX-36 and EX-37) and Comparative Example 38 (CE-38) in parts per hundred

| MATERIAL | CE-38 | EX-36 | EX-37 |
|---|---|---|---|
| PE-1 | 90 | 94.4 | 89.4 |
| E930 | 10 | | |
| PE-2 | | | 10 |
| AZO | | 5 | |
| J4368 | | 0.4 | 0.4 |
| DTMAB | | 0.2 | 0.2 |

Table 22 shows cyclic compression testing on foams of PLA-based polymers blends foamed using AZO only, AZO-in-starch, or E930. Less total material was needed to fill the molds using AZO-in-starch or E930 than AZO only.

TABLE 22

Compression testing on EX-36, EX-37, and CE-38

| | Sample | | EX-36 | EX-37 | CE-38 |
|---|---|---|---|---|---|
| Max Compressive Force, g/mm² | Cycle 1 | avg | 674 | 370 | 1444 |
| | | st dev | 161 | 96 | 594 |
| | Cycle 2 | avg | 657 | 350 | 1322 |
| | | st dev | 145 | 89 | 549 |
| | Cycle 3 | avg | 608 | 342 | 1264 |
| | | st dev | 141 | 86 | 517 |
| | Cycle 4 | avg | 597 | 337 | 1235 |
| | | st dev | 135 | 85 | 503 |
| | Cycle 5 | avg | 589 | 333 | 1210 |
| | | st dev | 132 | 83 | 496 |

Thermogravimetric Analysis (TGA) of Co-Encapsulated Composite PARTICLES

The decomposition profiles of the composite particles were determined using a TGA Q500 (TA Instruments, New Castle, Del.) using a temperature ramp rate of 10° C./min from 40 to 600° C. The run was tared by placing a standard aluminum differential scanning calorimetry (DSC) pan in a platinum TGA pan. Then, 5-10 mg of each sample was added to a tared pan for analysis. The $T_{start}$ (i.e., onset temperature of thermal decomposition) and $T_{max}$ (i.e., temperature at which thermal decomposition occurs at a maximum rate) were determined using TA Instruments Universal Analysis software. $T_{start}$ is defined as the first temperature above 100° C. where the Derivative Weight (%/° C.) was 0.02%/° C. $T_{max}$ is defined as the first local maximum temperature above $T_{start}$. When the profile has smooth curves, the first local maximum temperature above $T_{start}$ is where the $2^{nd}$ Derivative Weight (%/° C.²)=0.

TABLE 23

The effect of co-encapsulating blowing agent accelerators. Co-encapsulating ZnO with AZO (PE-13) lowered the $T_{max}$ of the particle as compared to encapsulating AZO alone (PE-2). Co-encapsulating urea with PTSH (PE-14) lowered the $T_{max}$ of the particle as compared to encapsulating PTSH alone (PE-10).

| Sample | $T_{start}$ [° C.] | $T_{max}$ [° C.] |
|---|---|---|
| PE-2 | 184 | 224 |
| PE-13 | 183 | 215 |
| PE-10 | 131 | 182 |
| PE-14 | 124 | 152 |
| PE-16 | 153 | 203 |
| PE-17 | 150 | 200 |

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed:

1. A composite particle comprising: a chemical blowing agent particle encapsulated within a shell comprising an uncrosslinked thermoplastic material, wherein the uncrosslinked thermoplastic material exhibits a complex viscosity of 3,700 Pascal seconds (Pa·s) or greater at a decomposition temperature of the chemical blowing agent particle and wherein the uncrosslinked thermoplastic material has a glass transition temperature below the decomposition temperature of the chemical blowing agent.

2. The composite particle of claim 1, wherein the chemical blowing agent is selected from a diazocompound, a sulfonyl hydrazide, a tetrazole, a nitrosocompound, an acyl sulfonyl hydrazide, hydrazones, thiatriazoles, azides, sulfonyl azides, oxalates, thiatrizene dioxides, or combinations thereof.

3. The composite particle of claim 1, wherein the uncrosslinked thermoplastic material is selected from a starch, polyvinyl pyrollidinone (PVP), a copolymer of vinylpyrrolidone and vinyl acetate, a polypropylene-based elastomer, a styrene-isoprene-styrene copolymer, a (C1-C3)alkyl cellulose, a hydroxyl (C1-C3)alkylcellulose; carboxy methylcellulose, sodium carboxymethyl cellulose, a polyoxazoline, a silicone-based thermoplastic polymer, an olefin-based thermoplastic polymer, a phenoxy resin, a polyamide, or combinations thereof.

4. The composite particle of claim 1, wherein the uncrosslinked thermoplastic material is selected from hydroxypropyl starch, PVP, a polyamide, a styrenic copolymer, or a combination thereof.

5. A composition comprising: an uncrosslinked thermoplastic matrix material and a plurality of composite particles distributed in the uncrosslinked thermoplastic matrix material, wherein the composition exhibits an elastic modulus of 0.5 megaPascals (MPa) or greater, and wherein the plurality of composite particles each comprises:
   a. a chemical blowing agent particle encapsulated within a shell comprising an uncrosslinked thermoplastic material, wherein the uncrosslinked thermoplastic material exhibits a complex viscosity of 3,700 Pa·s or greater at a decomposition temperature of the chemical blowing agent particle and wherein the uncrosslinked thermoplastic material has a glass transition temperature below the decomposition temperature of the chemical blowing agent.

6. The composition of claim 5, wherein the uncrosslinked thermoplastic matrix material is selected from a polyorganosiloxane, a styrenic block copolymer, a polyolefin, a polyolefin copolymer, polyvinyl chloride (PVC), ethylene vinyl acetate, polyacrylate, polymethacrylate, an acrylate copolymer, and an acrylic block copolymer.

7. The composition of claim 5, wherein the uncrosslinked thermoplastic matrix material comprises a polylactic acid (PLA) and the composition further comprises:
   a. a polymer having a $T_g$ of 25 degrees Celsius or greater;
   b. a crosslinking agent;
   c. a crosslink catalyst; and
   d. a plasticizer.

8. The composite particle of claim 1, further comprising a co-encapsulated metal oxide or metal salt, polyhydroxyl compound, an amine containing compound, a carboxylic acid containing compound, or combinations thereof.

9. A foam composition comprising: a closed cell foam thermoplastic matrix material and a plurality of composite particles distributed in the closed cell foam thermoplastic matrix material, wherein the plurality of composite particles each comprises:
   a chemical blowing agent particle encapsulated within a shell comprising an uncrosslinked thermoplastic material, wherein the uncrosslinked thermoplastic material exhibits a complex viscosity of 3,700 Pa·s or greater at a decomposition temperature of the chemical blowing agent particle and wherein the uncrosslinked thermoplastic material has a glass transition temperature below the decomposition temperature of the chemical blowing agent.

10. The foam composition of claim 9, comprising 95% or greater closed cells.

11. The foam composition of claim 9, comprising an average cell homogeneity of 3.0 or greater.

12. The foam composition of claim 9, comprising an average cell size of 350 micrometers or less.

13. The foam composition of claim 9, wherein the foam composition exhibits a maximum compressive force of 1,000 grams per square millimeter or less.

14. A foam sheet comprising the foam composition of claim 9.

15. A hearing protection article comprising the foam composition of claim 9.

16. A tape comprising:
   a. a substrate; and
   b. a foam composition of claim 9 disposed on the substrate.

17. A process comprising (a) providing at least one hearing protection article of claim 15; and (b) interposing the hearing protection article between an acoustic source and an acoustic receiver in the form of a human ear.

18. A method of making a foam composition, the method comprising:
   a. compressing a mixture, the mixture comprising an uncrosslinked thermoplastic matrix material and a plurality of composite particles distributed in the uncrosslinked thermoplastic matrix material, wherein the mixture exhibits an elastic modulus of 0.5 megaPascals (MPa) or greater, and wherein the plurality of composite particles each comprises:
      i. a chemical blowing agent particle encapsulated within a shell comprising an uncrosslinked thermoplastic material, wherein the uncrosslinked thermoplastic material exhibits a complex viscosity of 3,700 Pa·s or greater at a decomposition temperature of the chemical blowing agent particle and wherein the uncrosslinked thermoplastic material has a glass transition temperature below the decomposition temperature of the chemical blowing agent; and
   b. heating the compressed mixture, thereby forming the foam composition.

19. The method of claim 18, wherein step a. occurs in an extruder, and optionally step b. also occurs in the extruder.

20. A method of making a foam composition, the method comprising:
- a. casting a mixture in a mold, the mixture comprising an uncrosslinked thermoplastic matrix material and a plurality of composite particles distributed in the uncrosslinked thermoplastic matrix material, wherein the mixture exhibits an elastic modulus of 0.5 megaPascals (MPa) or greater, and wherein the plurality of composite particles each comprises:
  - i. a chemical blowing agent particle encapsulated within a shell comprising an uncrosslinked thermoplastic material, wherein the uncrosslinked thermoplastic material exhibits a complex viscosity of 3,700 Pa·s or greater at a decomposition temperature of the chemical blowing agent particle and wherein the uncrosslinked thermoplastic material has a glass transition temperature below the decomposition temperature of the chemical blowing agent; and
- b. heating the cast mixture, thereby forming the foam composition.

* * * * *